United States Patent [19]
Reed et al.

[11] 4,195,231
[45] Mar. 25, 1980

[54] COMBINED CYCLE ELECTRIC POWER PLANT HAVING AN IMPROVED DIGITAL/ANALOG HYBRID GAS TURBINE CONTROL SYSTEM

[75] Inventors: Terry J. Reed, North Huntingdon; Jack R. Smith, Pittsburgh; Roy W. Kiscaden, Springfield, all of Pa.

[73] Assignee: Westinghouse Electric Corp., Pittsburgh, Pa.

[21] Appl. No.: 495,726

[22] Filed: Aug. 8, 1974
(Under 37 CFR 1.47)

[51] Int. Cl.² .............................................. H02P 9/04
[52] U.S. Cl. .............................. 290/40 R; 60/39.18 R; 364/494
[58] Field of Search ........................... 290/40; 415/17; 235/151.21; 60/39.18 R; 364/492, 494, 495

[56] References Cited
U.S. PATENT DOCUMENTS

| | | | |
|---|---|---|---|
| 3,533,236 | 10/1970 | Cottington | 290/40 |
| 3,709,626 | 1/1973 | Eggenberger | 415/17 |
| 3,866,109 | 2/1975 | Reed et al. | 290/40 R |

Primary Examiner—Gene Z. Rubinson
Assistant Examiner—John W. Redman
Attorney, Agent, or Firm—E. F. Possessky

[57] ABSTRACT

A digital computer system provides automatic control for a steam turbine and two gas turbines in a combined cycle electric power plant during startup and load modes of operation. The gas turbine automatic control system provides speed, load and blade path temperature control functions in developing an output fuel control signal for application to each gas turbine fuel valve control. An analog control for each gas turbine selectively provides startup and temperature and load control functions as a backup for the automatic gas turbine control, and further provides gas turbine overspeed, surge and other limit controls continuously. An operator panel functions with the analog and digital controls to provide an operator interface with the plant, and an interface circuit ties the digital and analog controls together for bumpless transfer between manual and automatic modes of operation. A sequencer is provided for each gas turbine and it provides gas turbine startup sequence control, gas turbine trip protection and other functions in both the automatic and the backup modes of operation. A gas turbine monitor develops temperature and vibration signals for the sequencer and the fuel controls.

8 Claims, 58 Drawing Figures

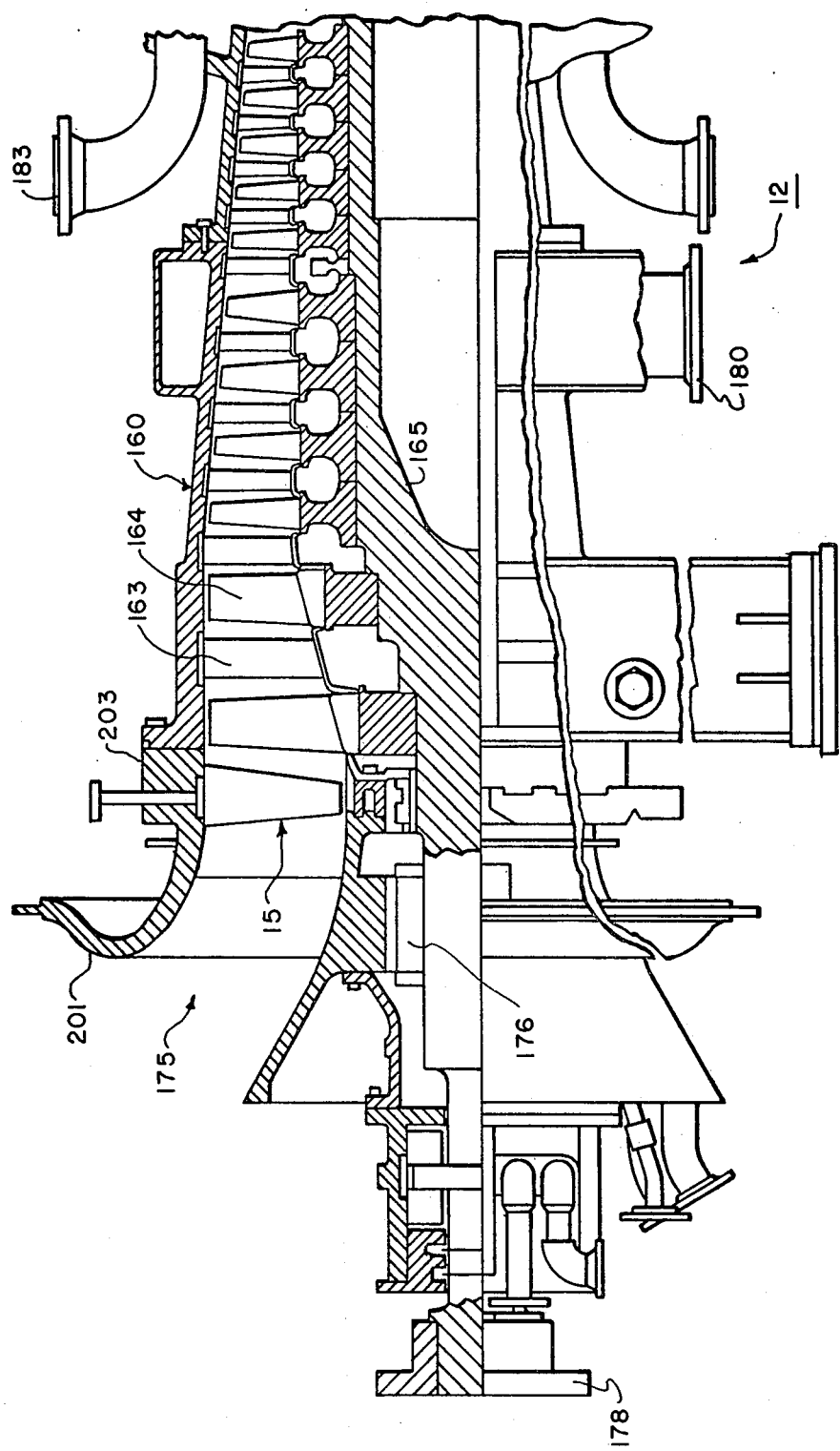

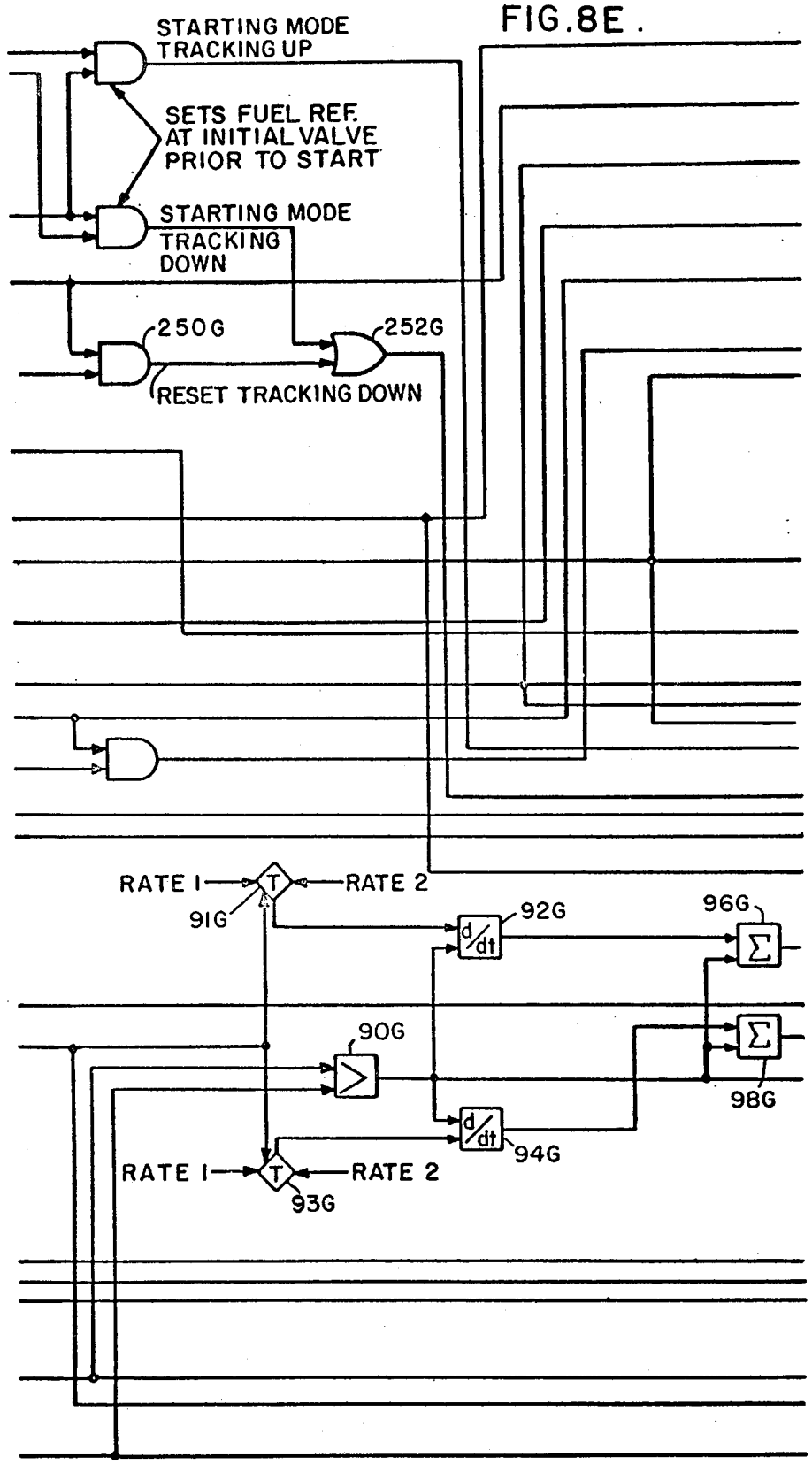

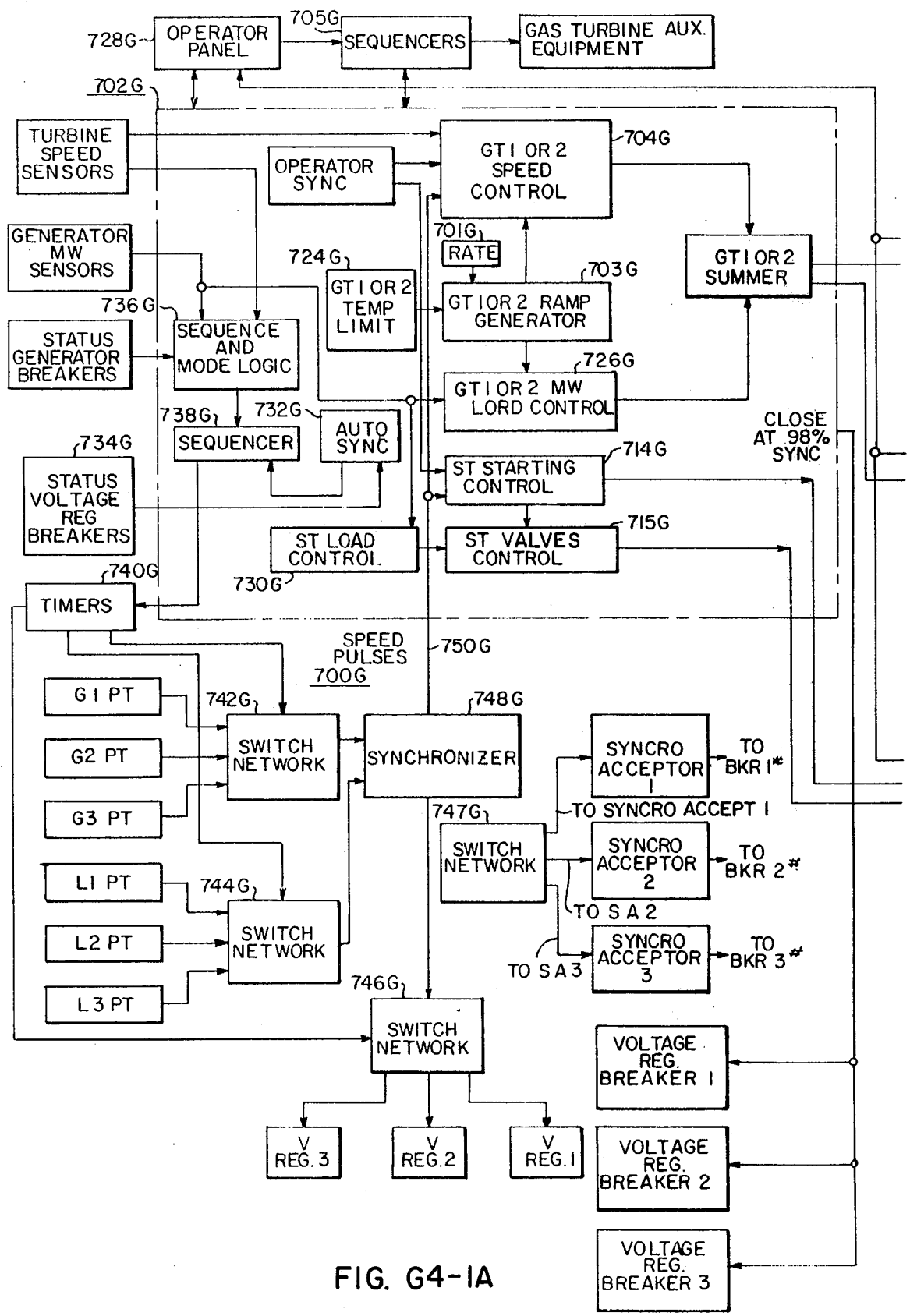
FIG. G4-1A

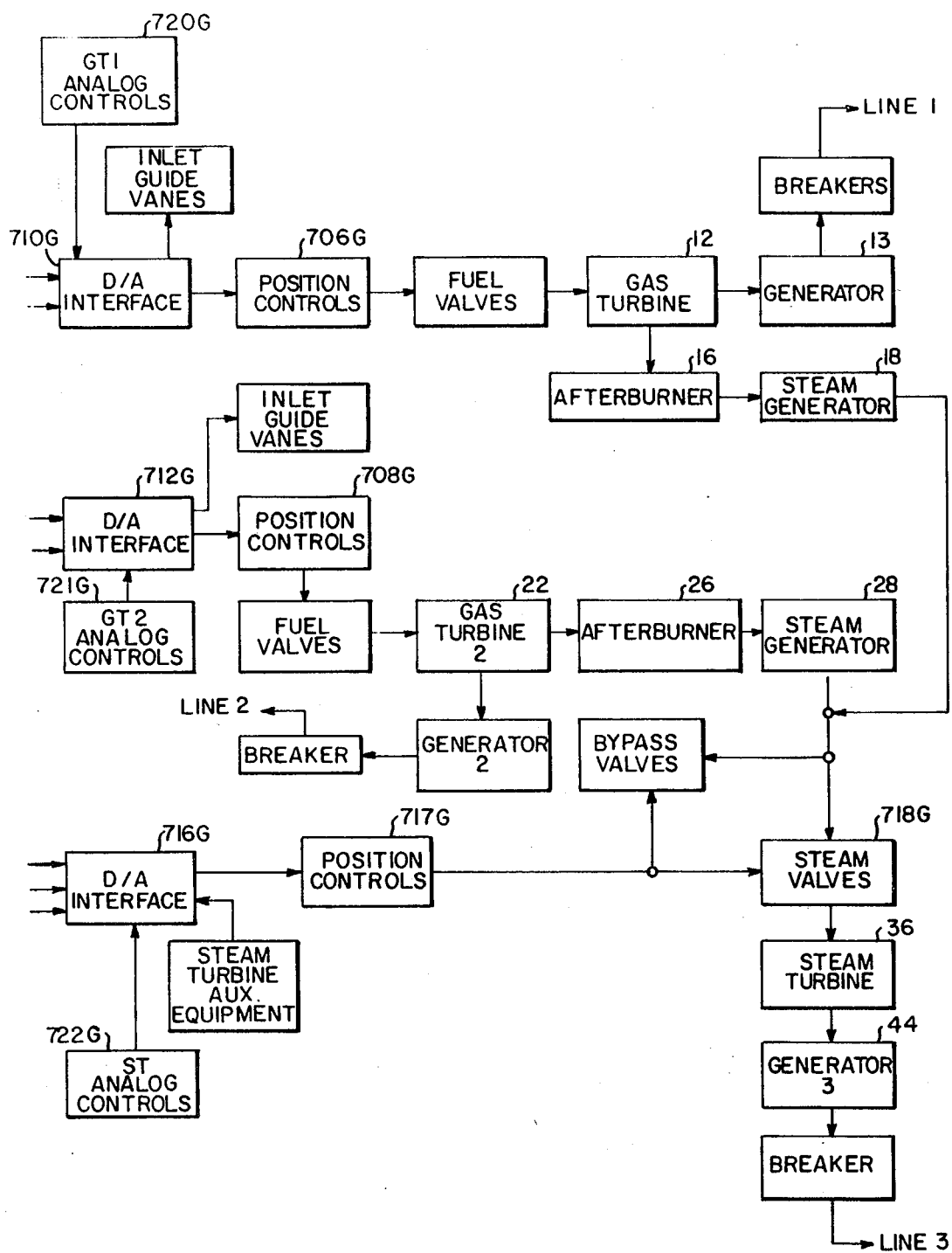
FIG. G4-1B

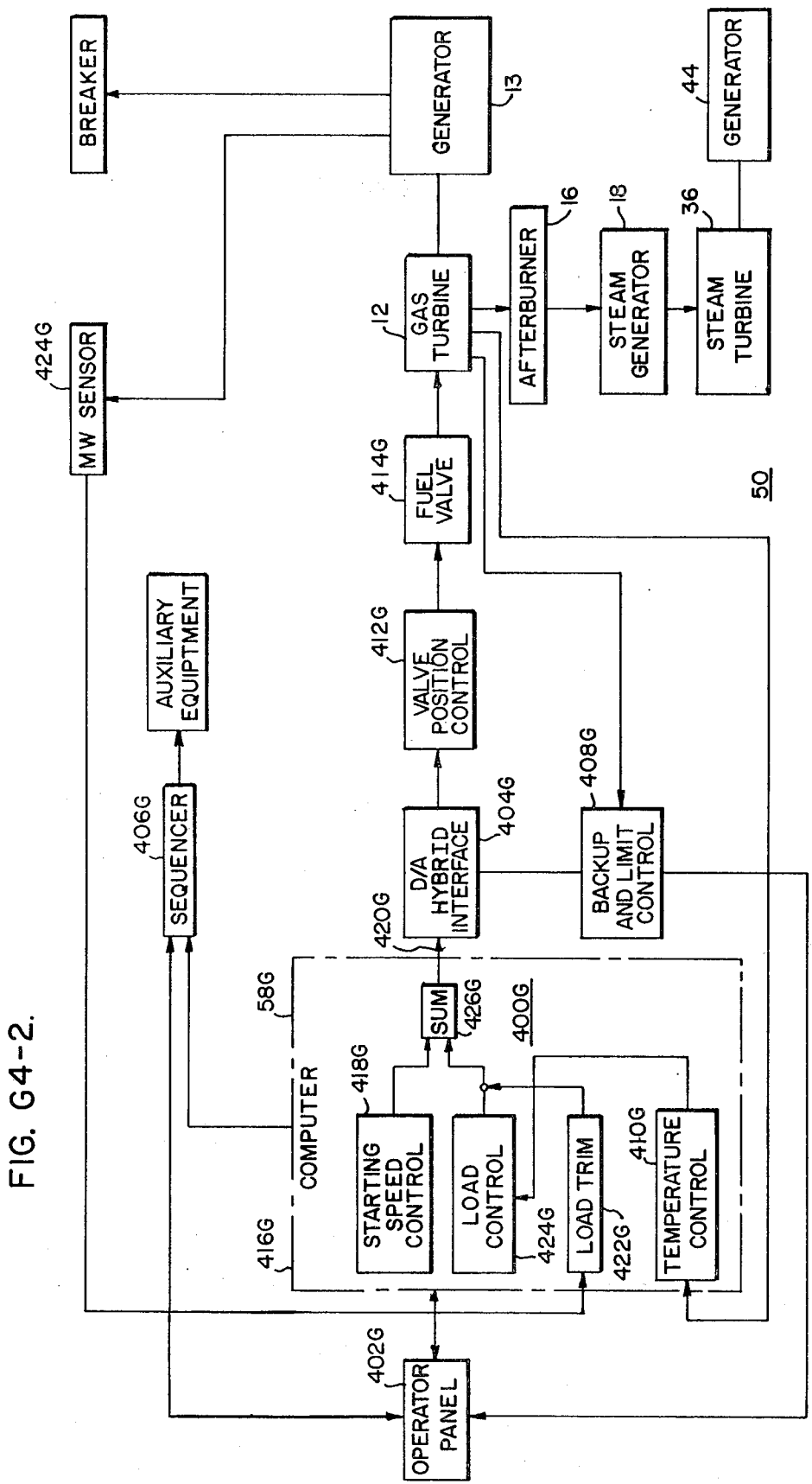
FIG. G4-2.

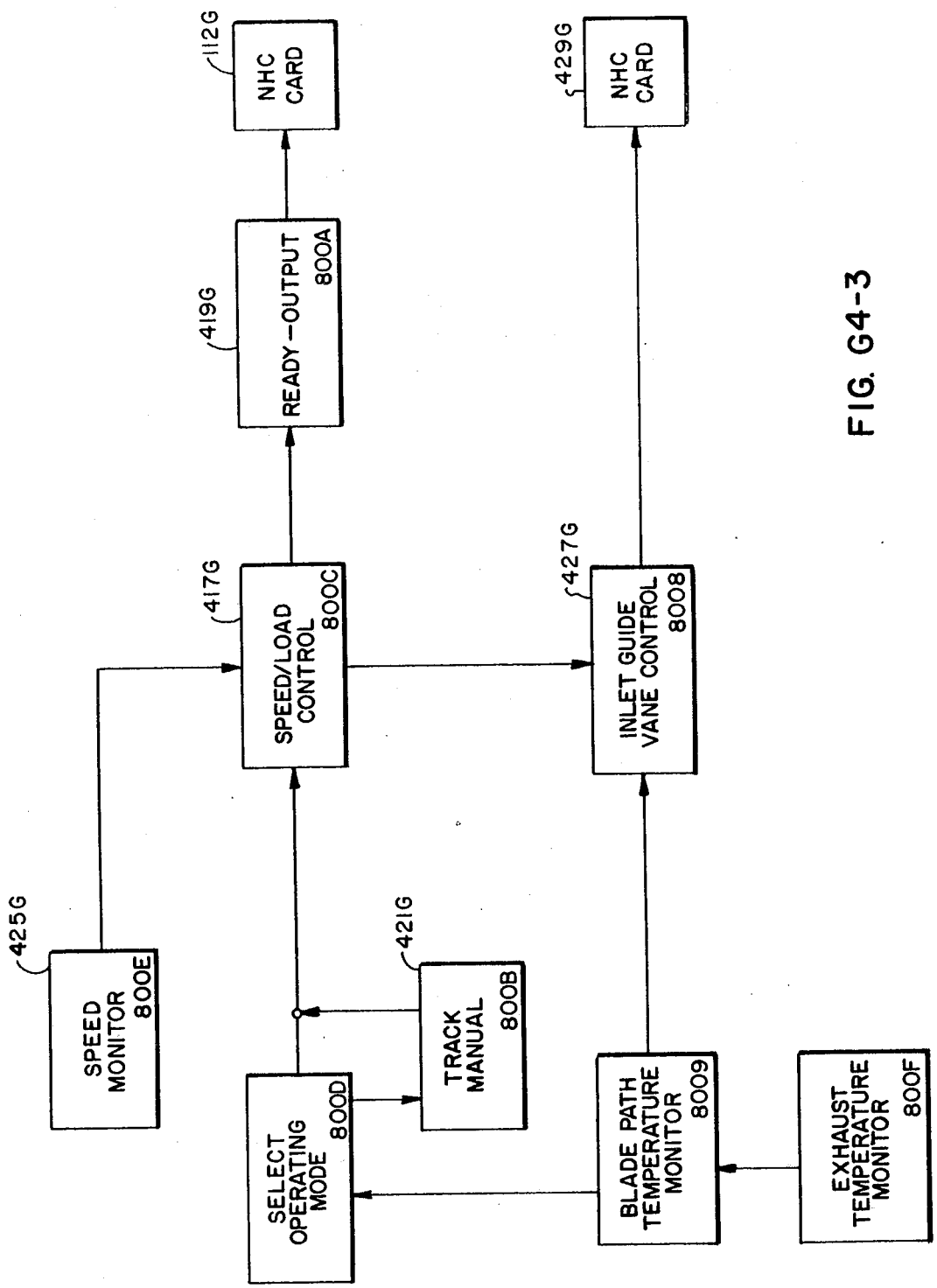
FIG. G4-3

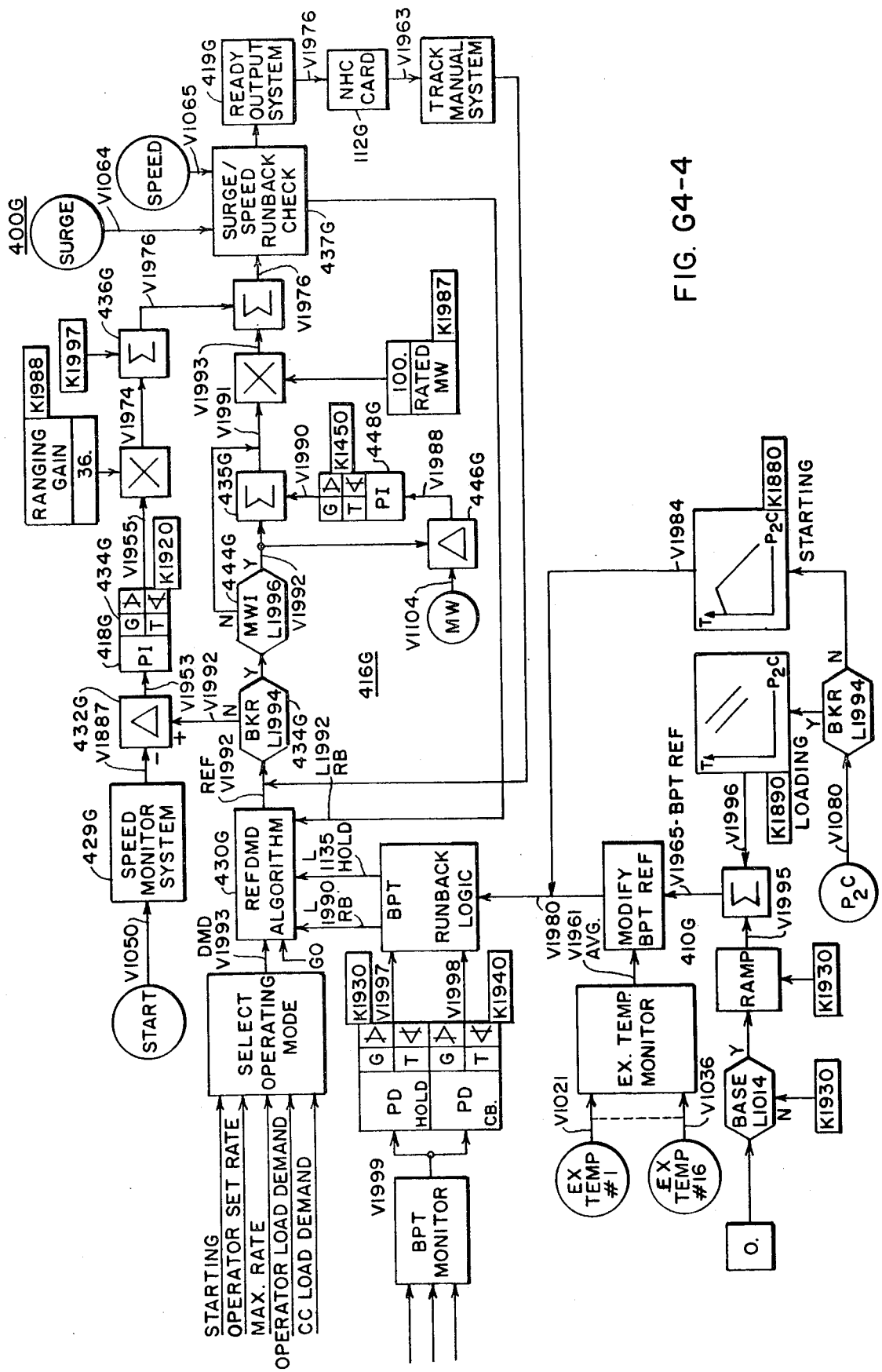
FIG. G4-4

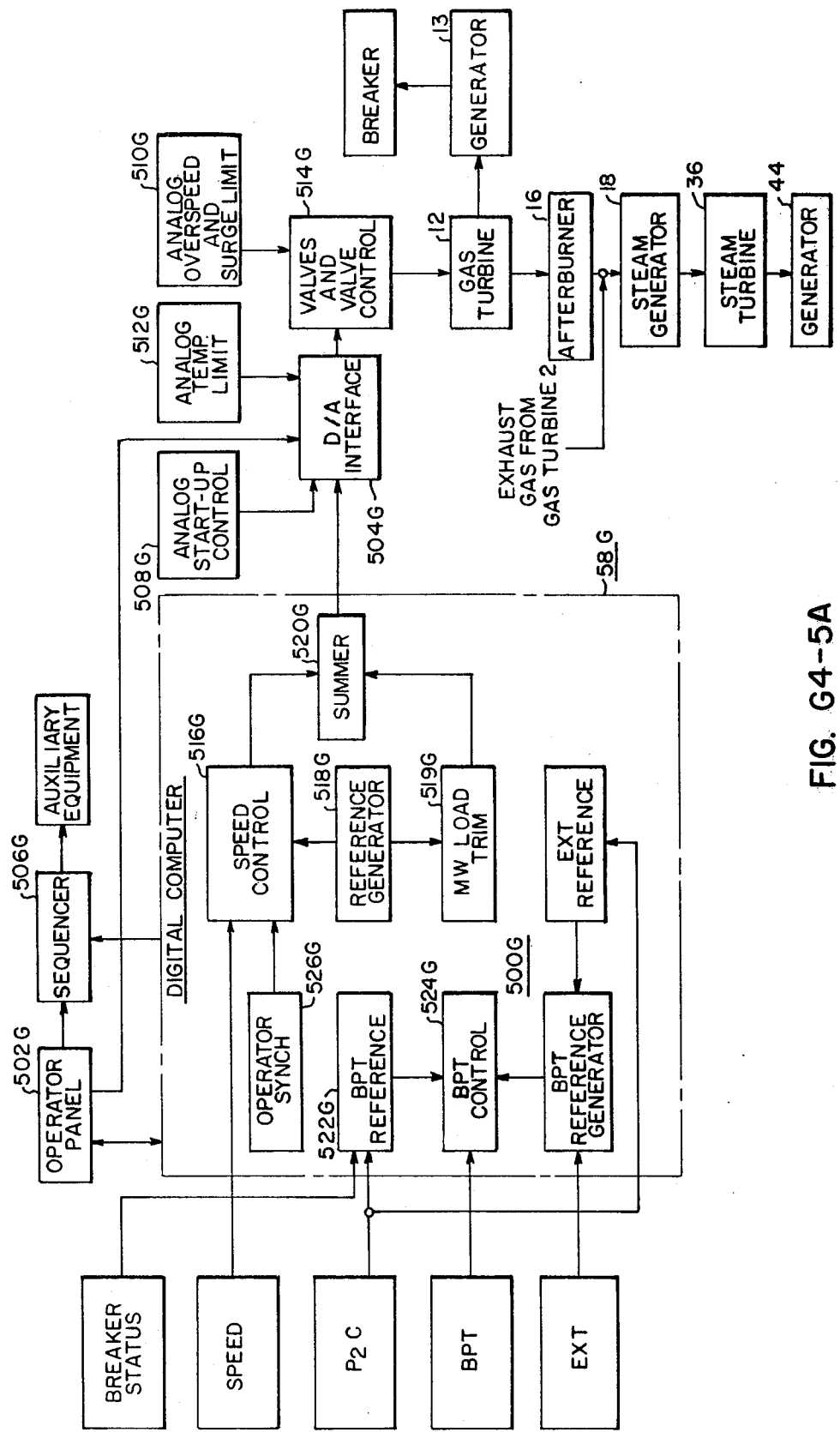
FIG. G4-5A

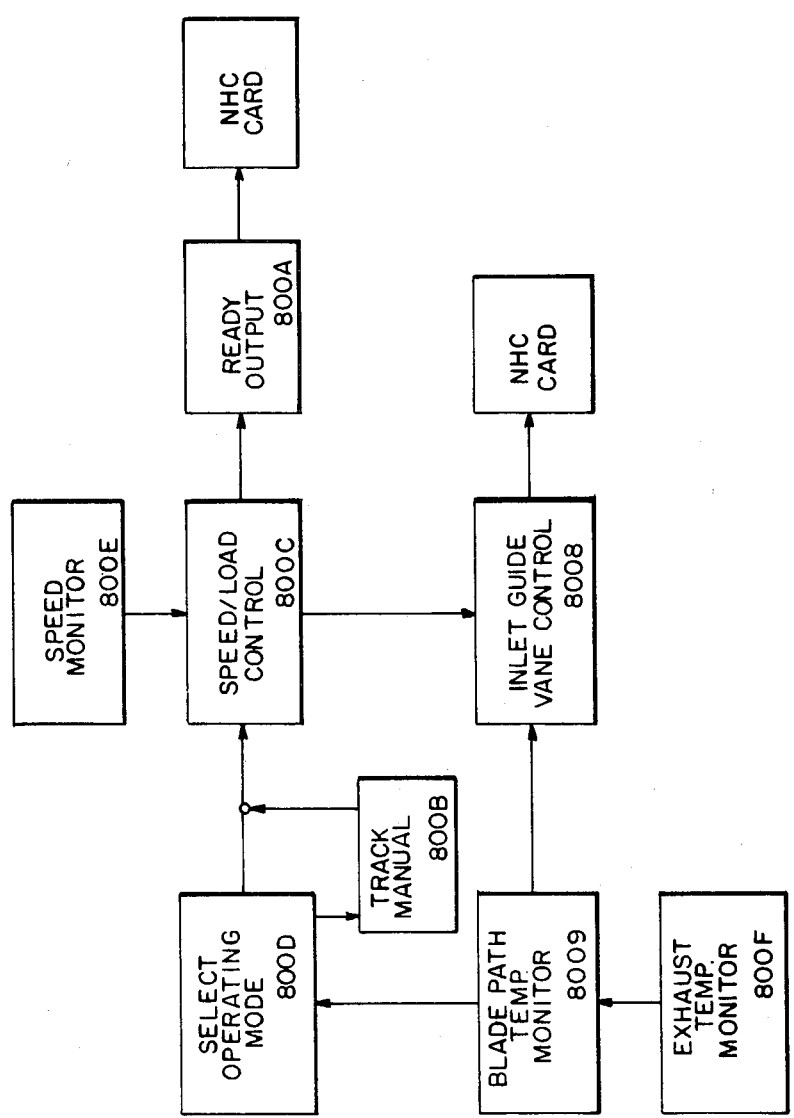
FIG. G4-5B

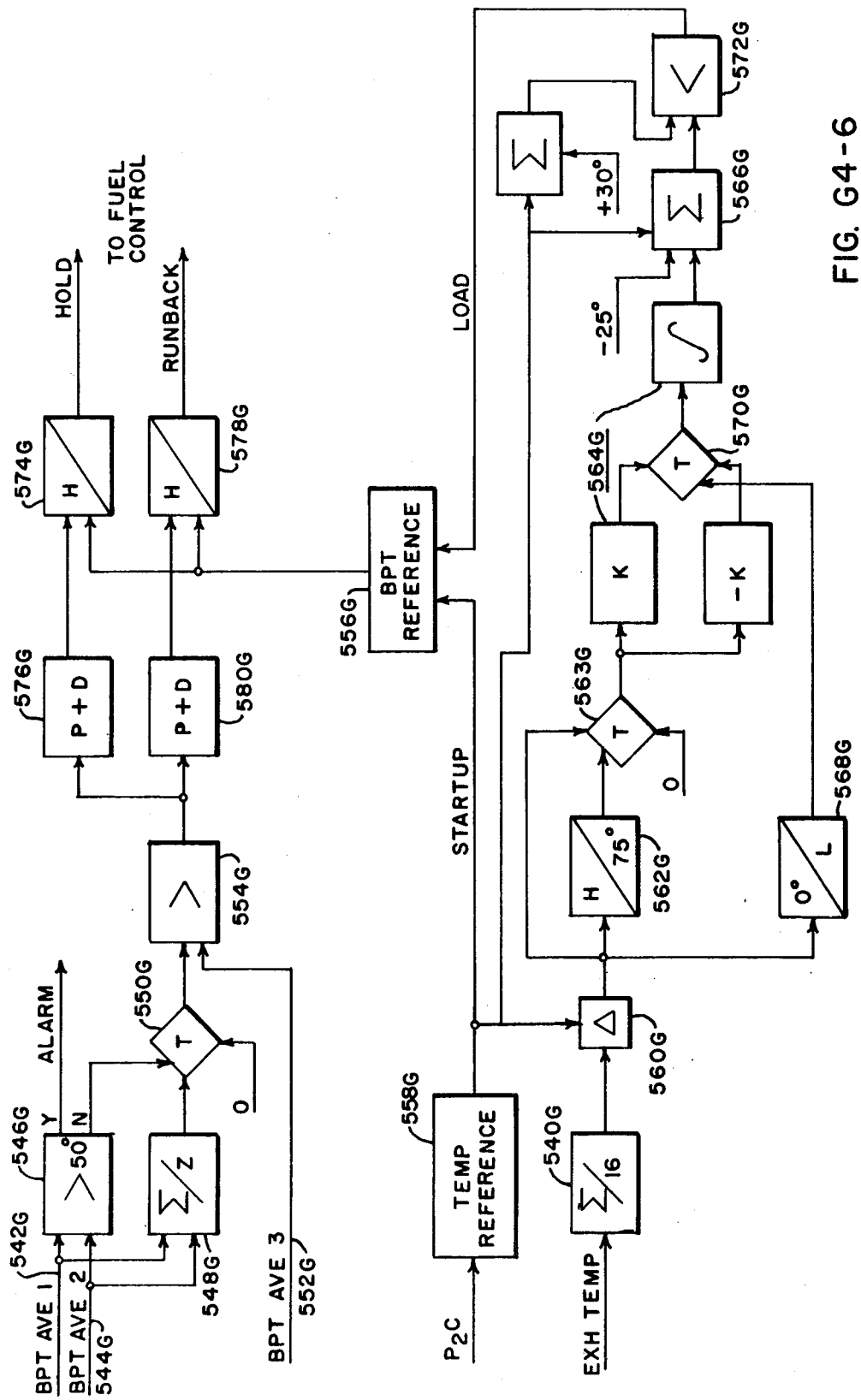
FIG. G4-6

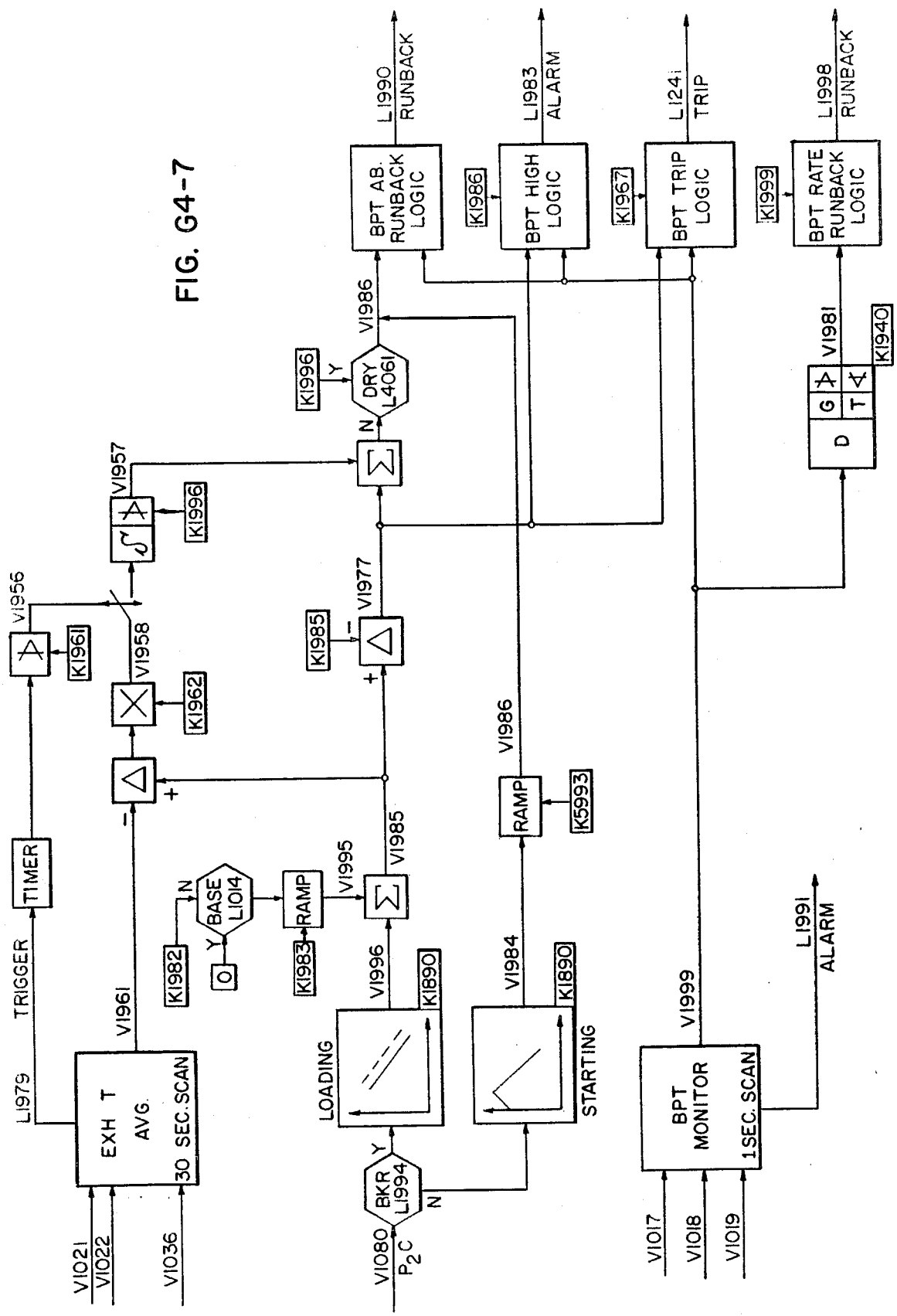
FIG. G4-7

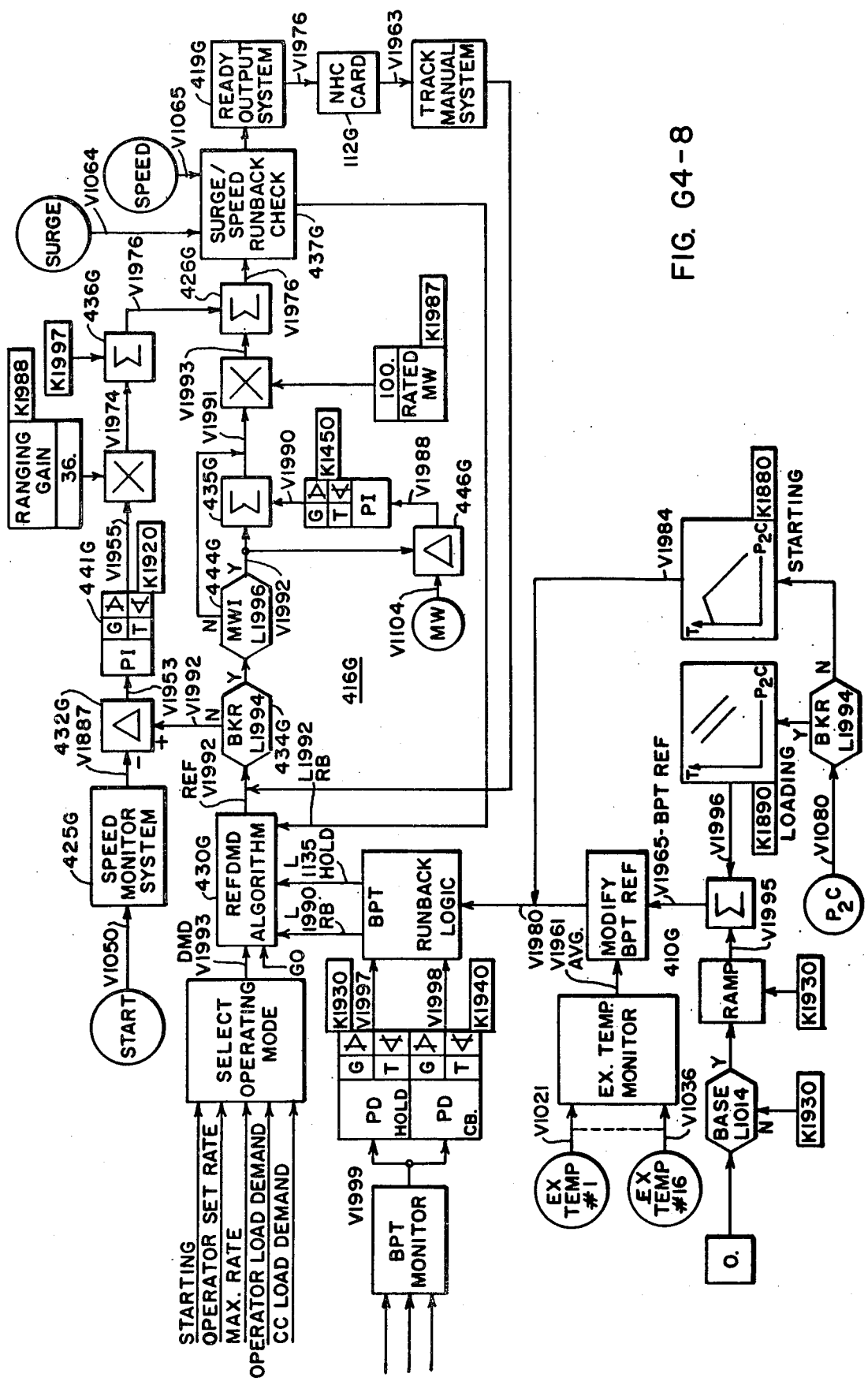
FIG. G4-8

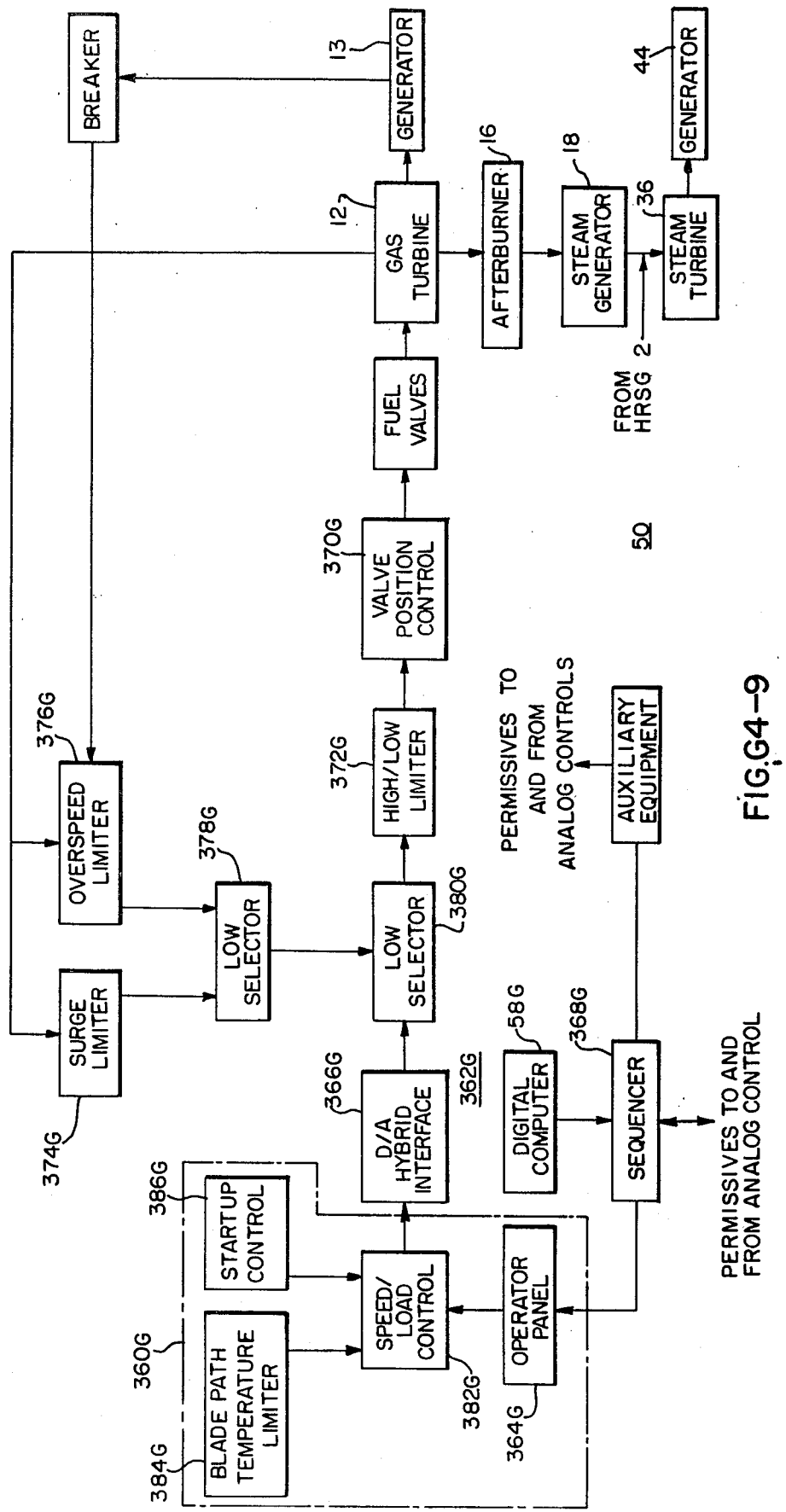
FIG.G4-9

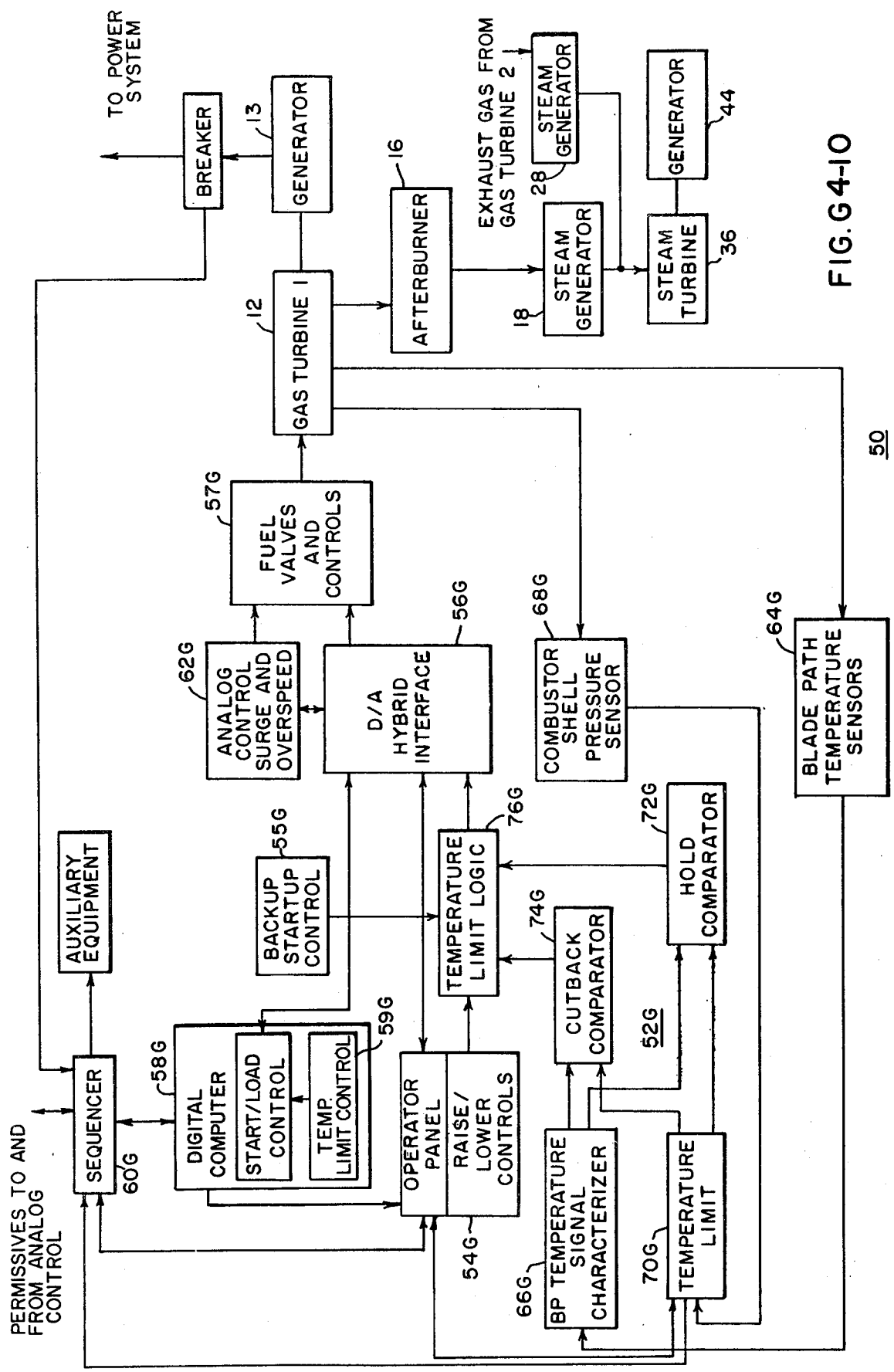
FIG. G4-10

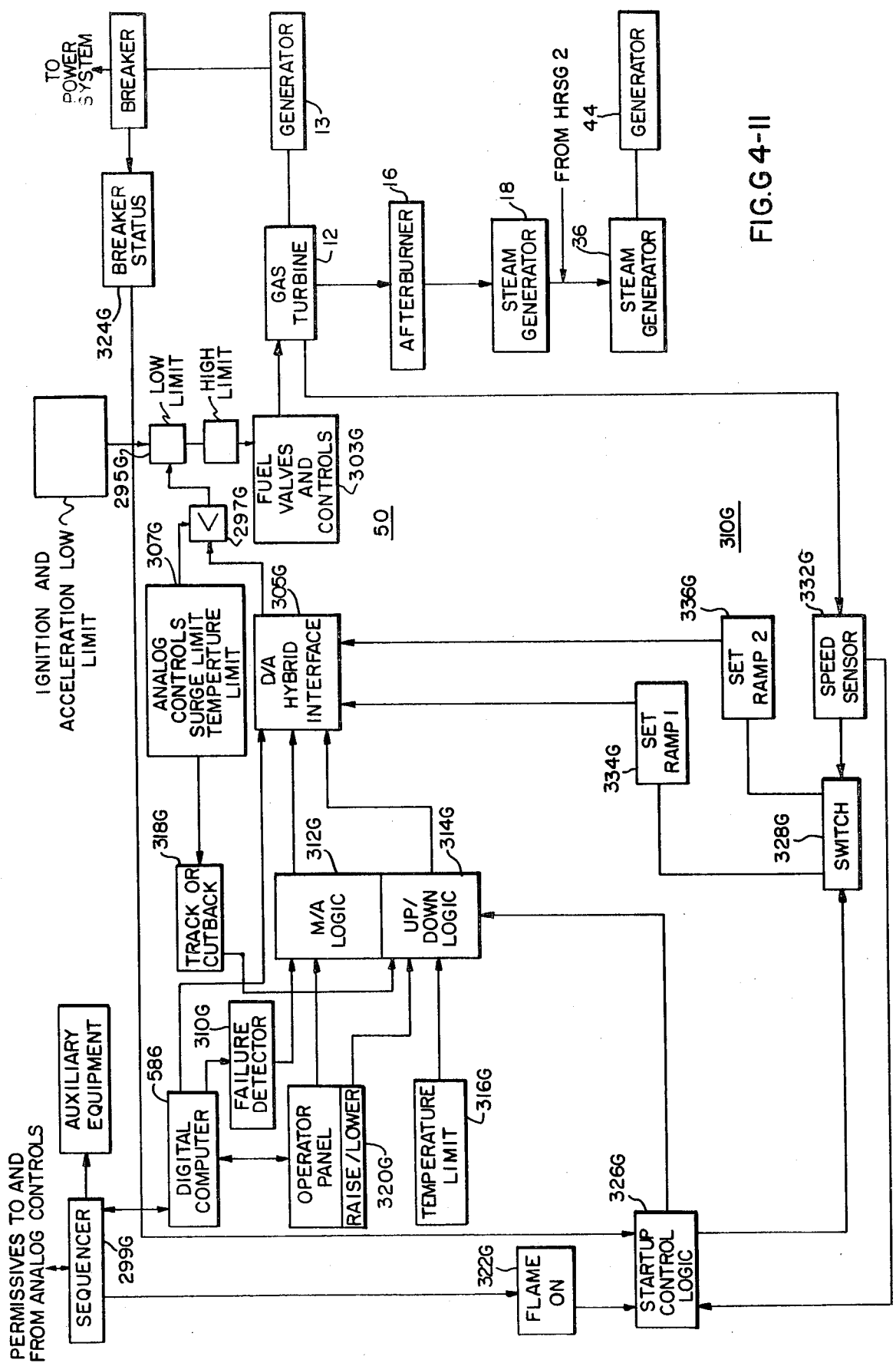
FIG.G4-11

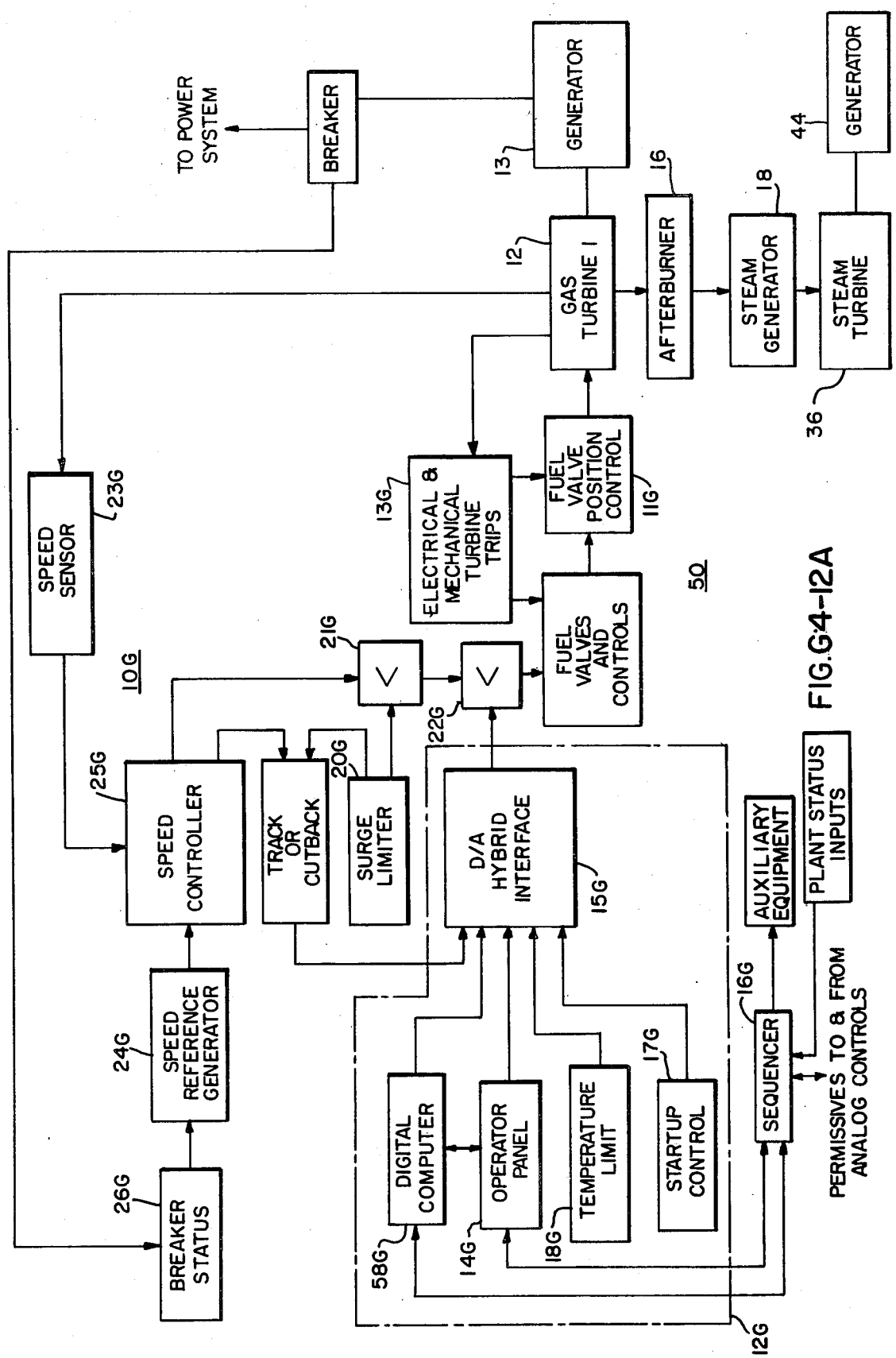
FIG.G4-12A

FIG.G4-12B
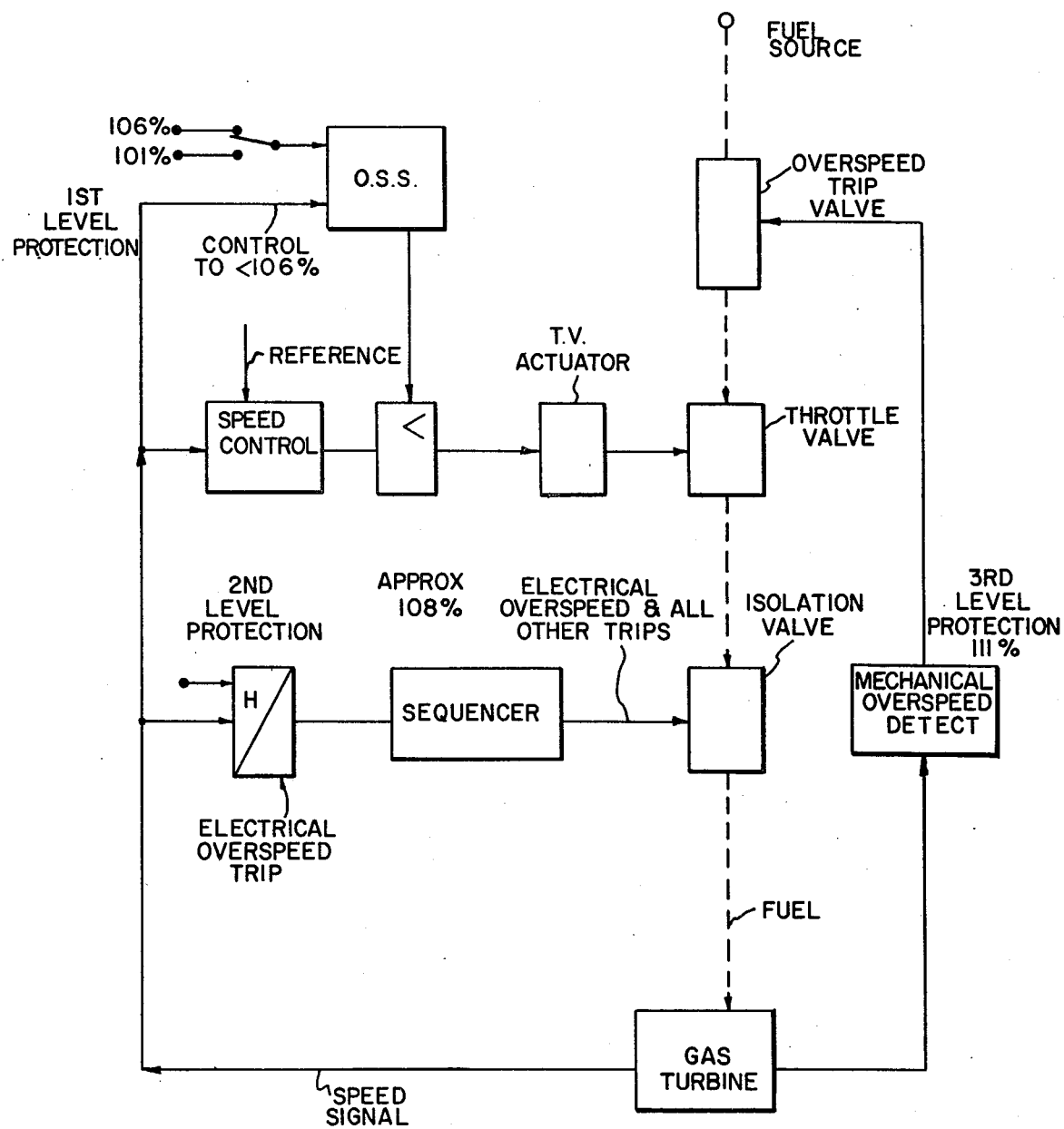

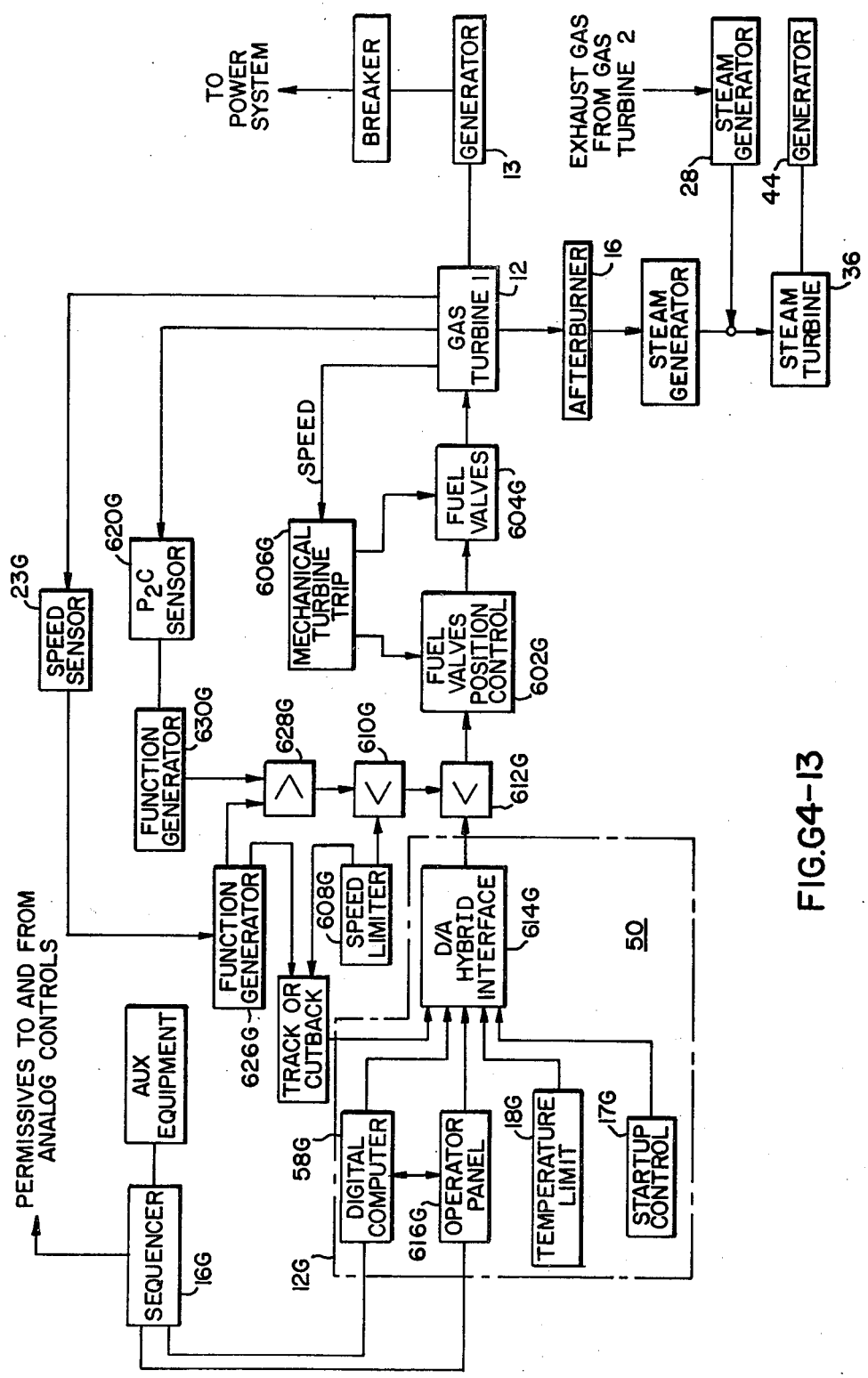
FIG.G4-13

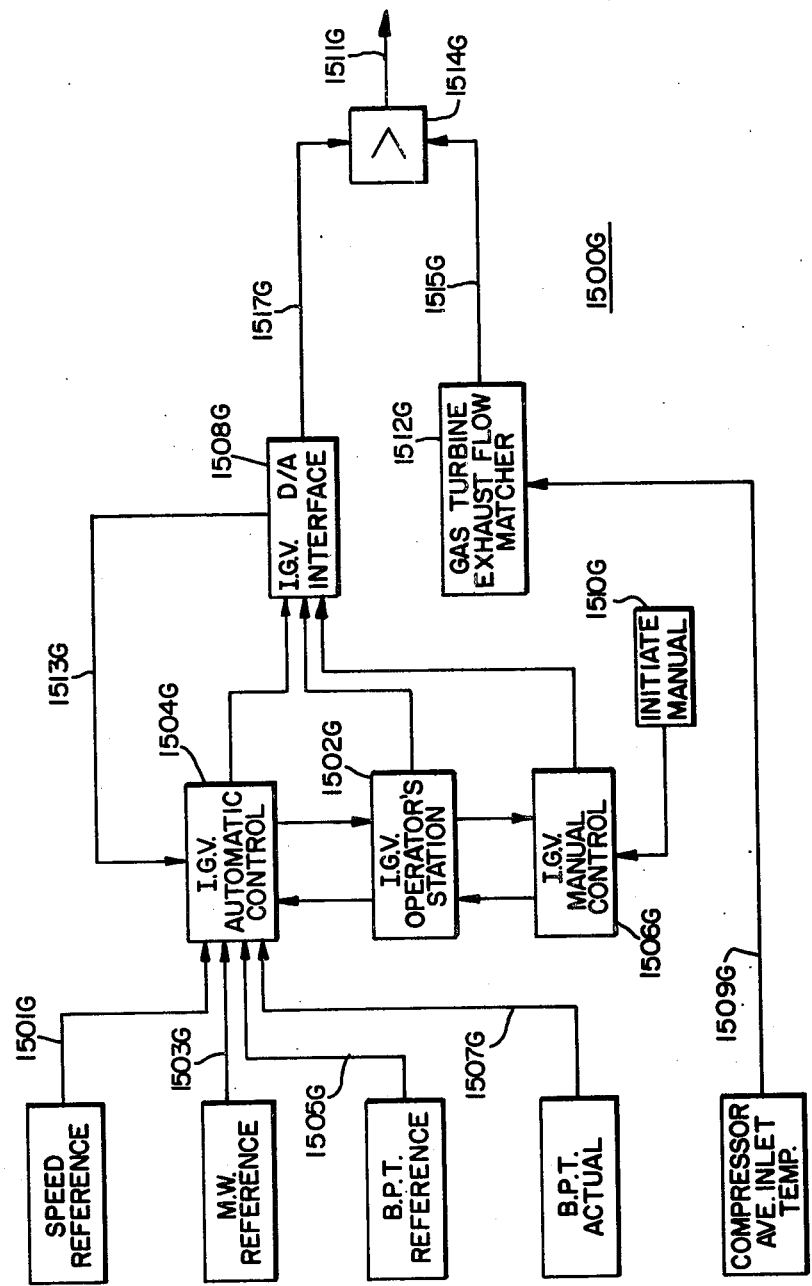
FIG.G4-14

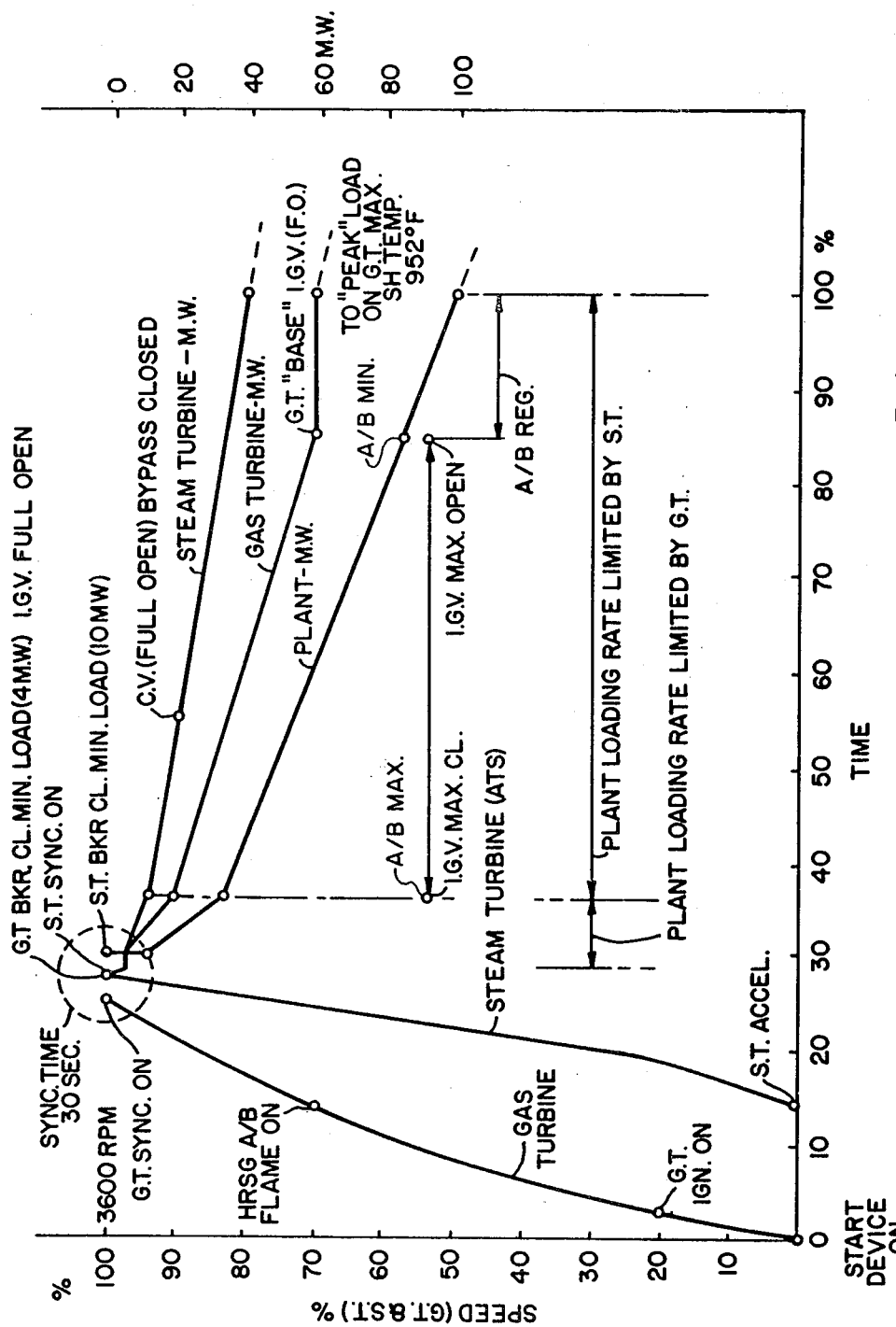
FIG. G5-1

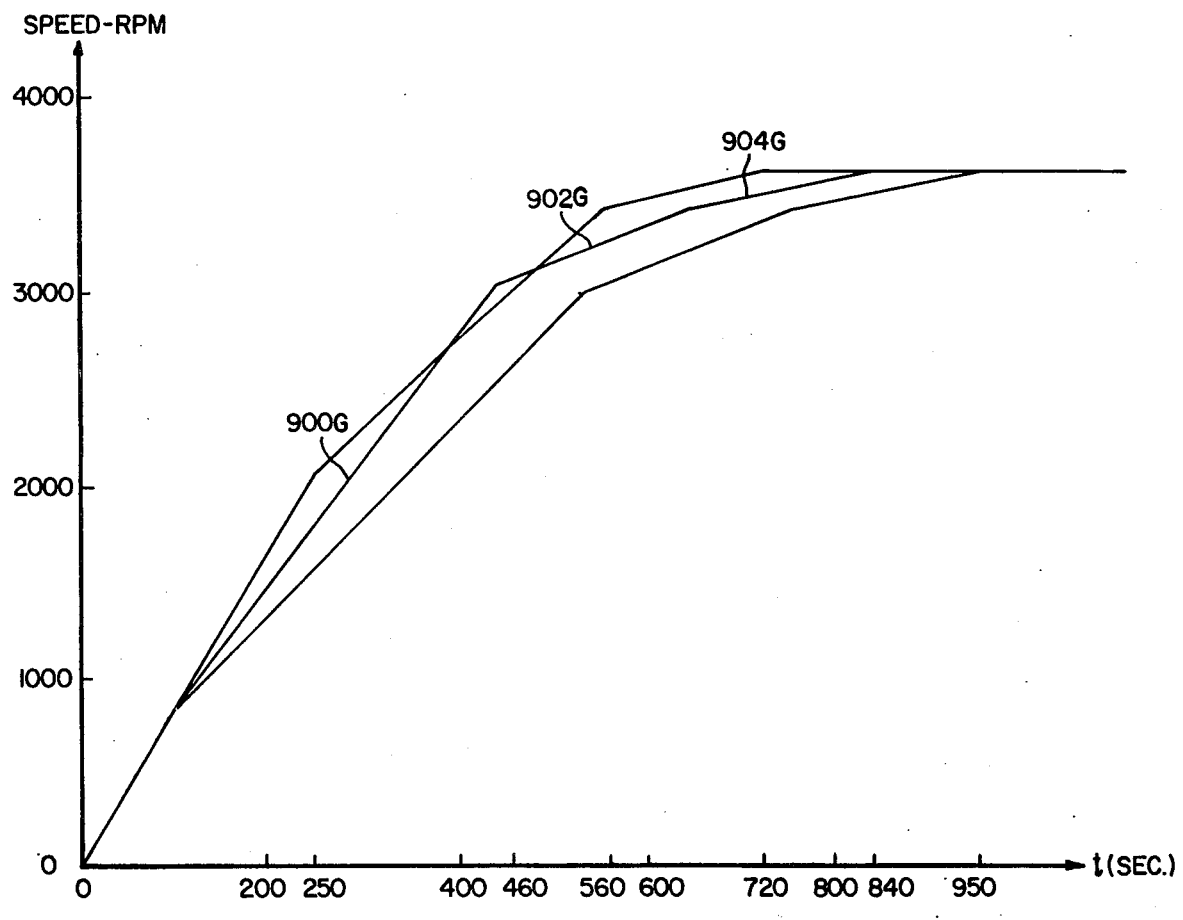
FIG.G5-IA

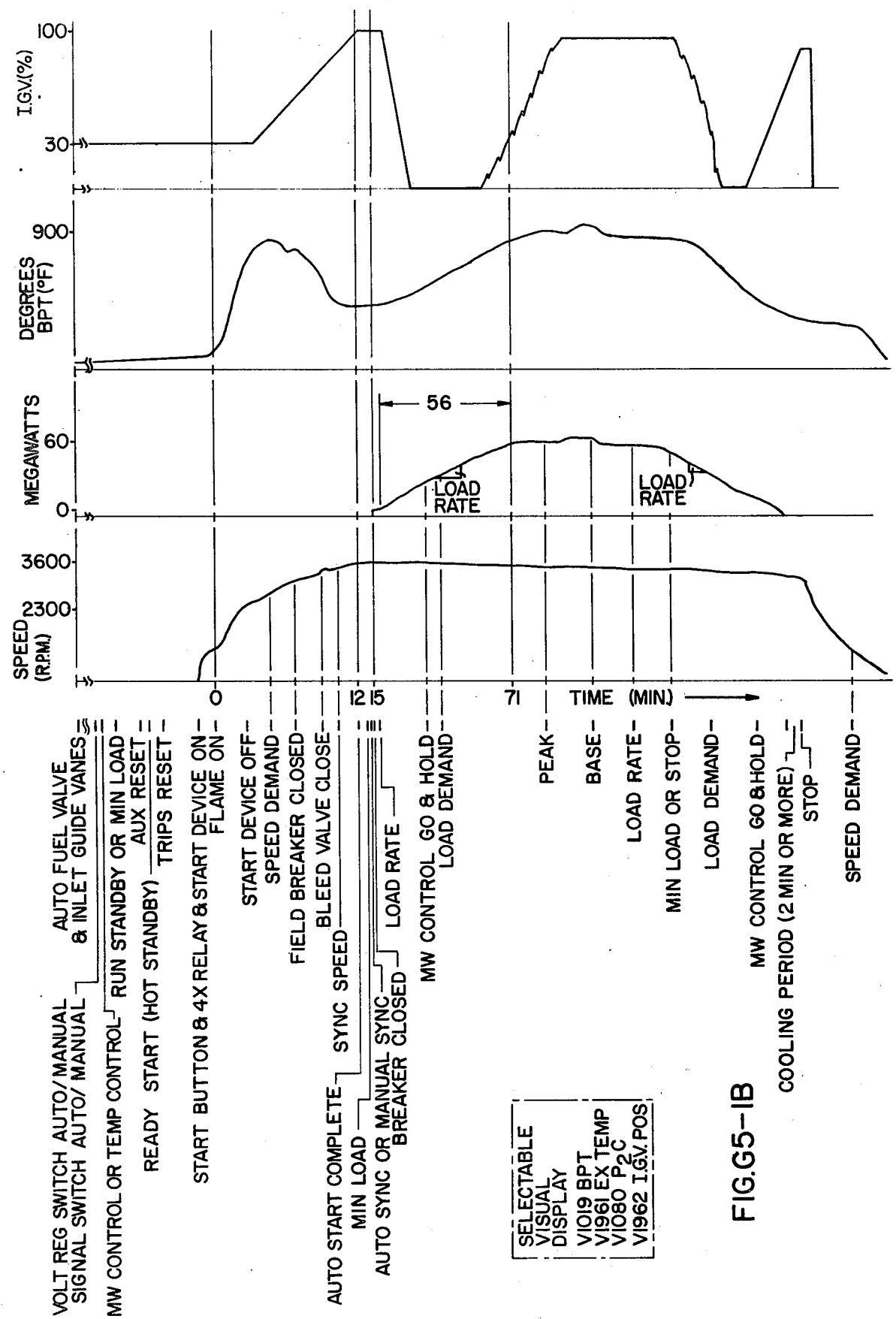
FIG.G5-1B

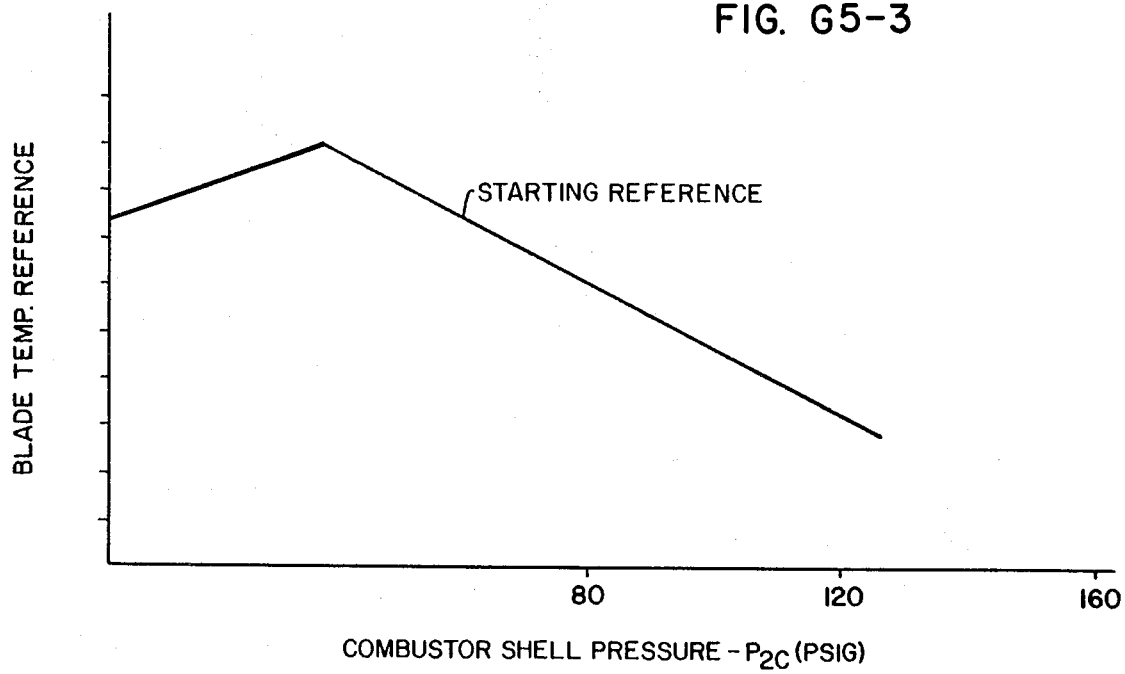
FIG. G5-3
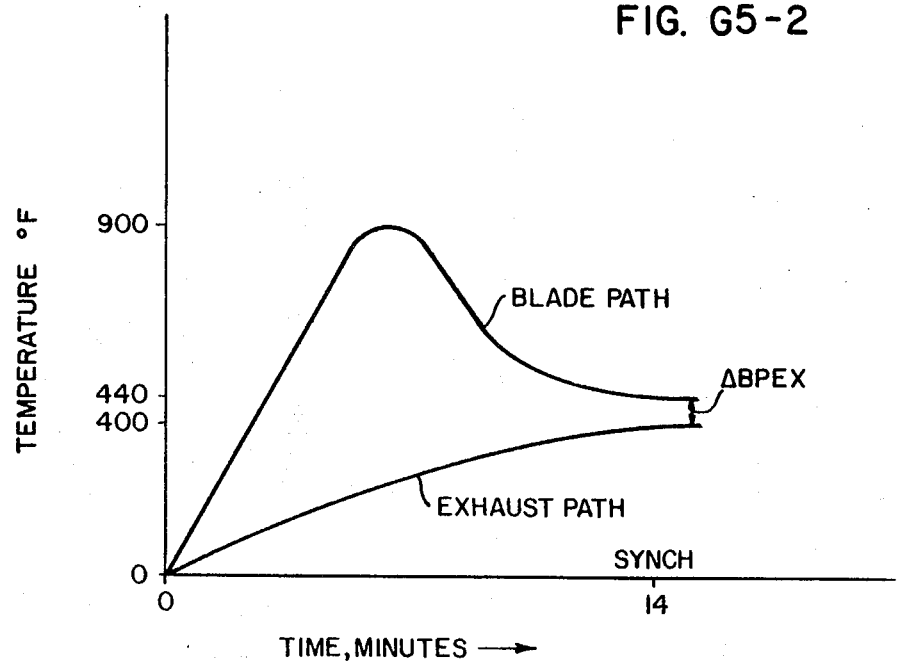
FIG. G5-2

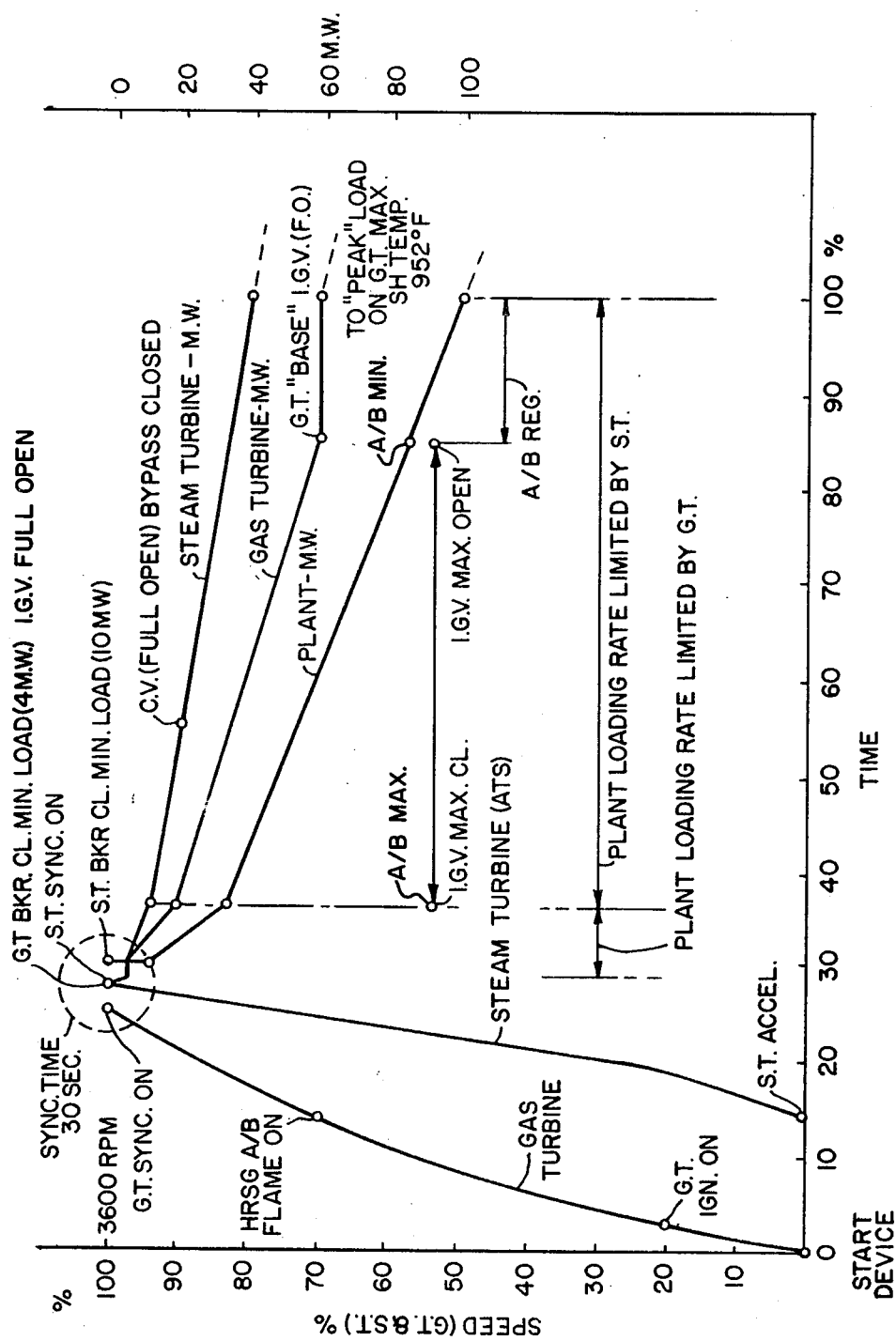
FIG. G5-4

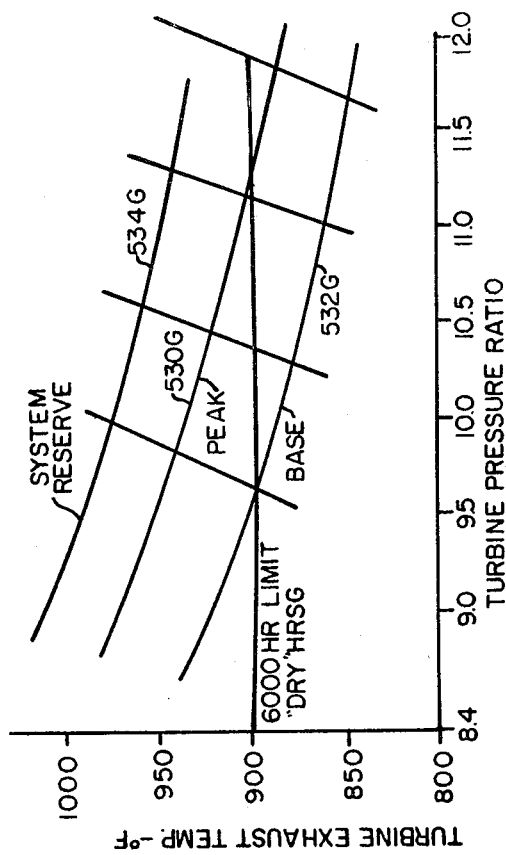
FIG. G5-5
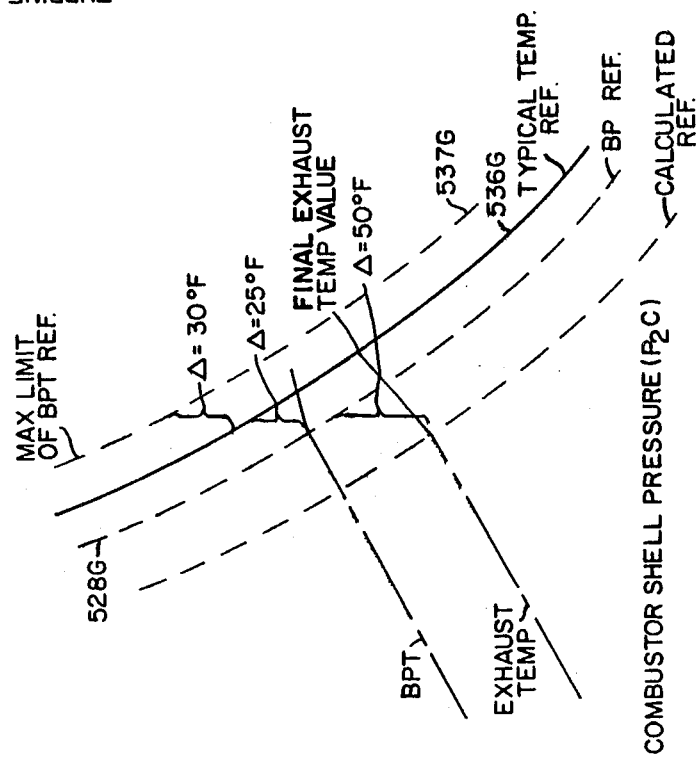
FIG. G5-6

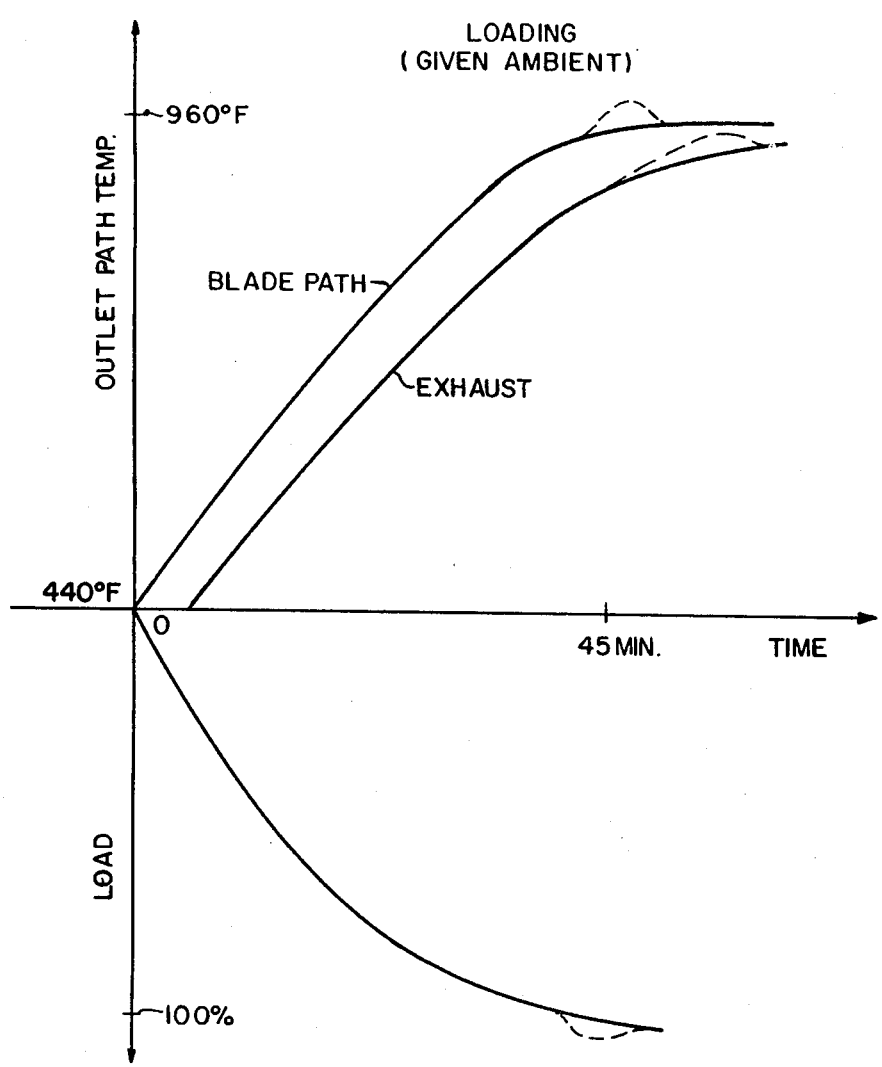
FIG. G5-7

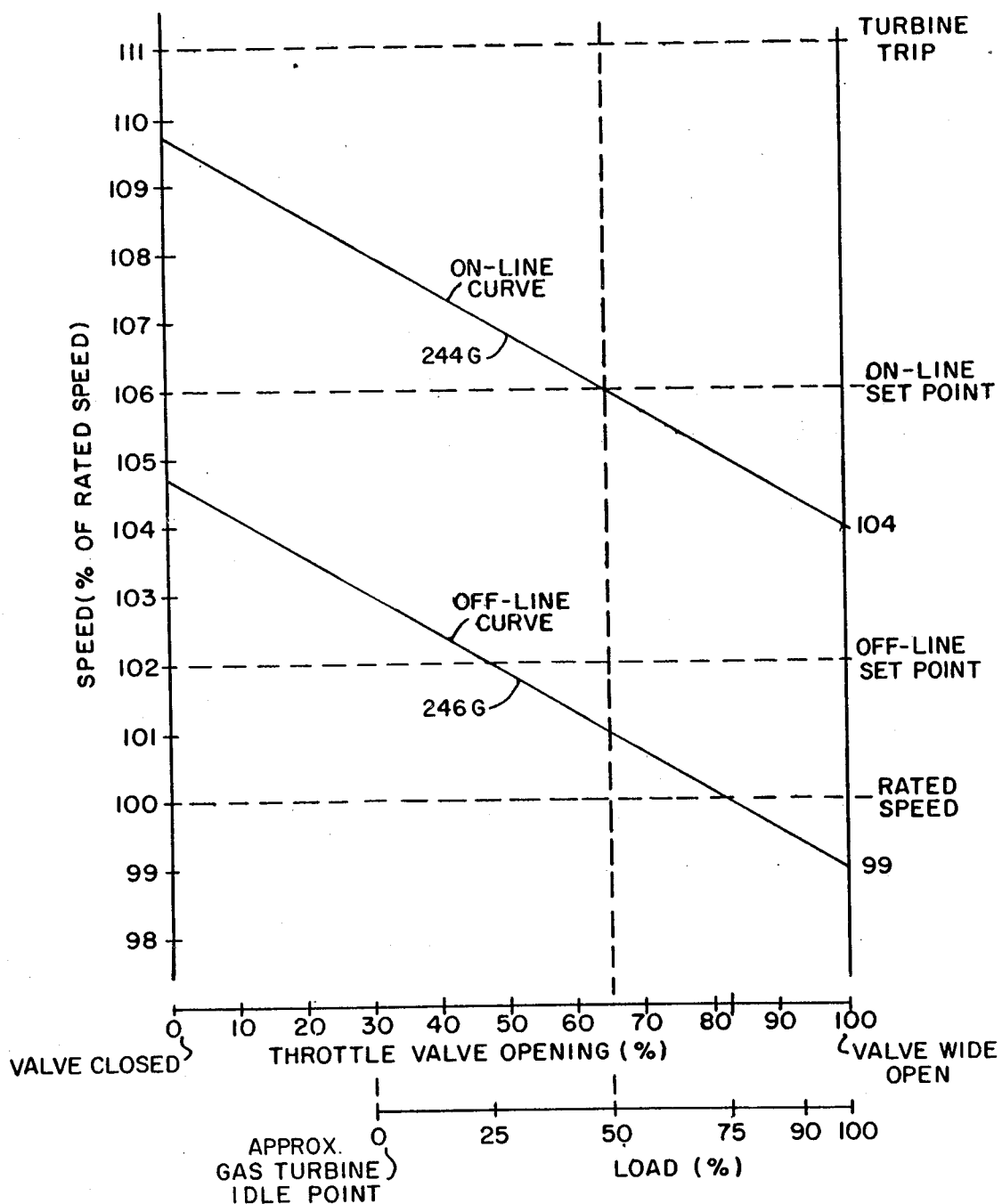
FIG.G 5-8

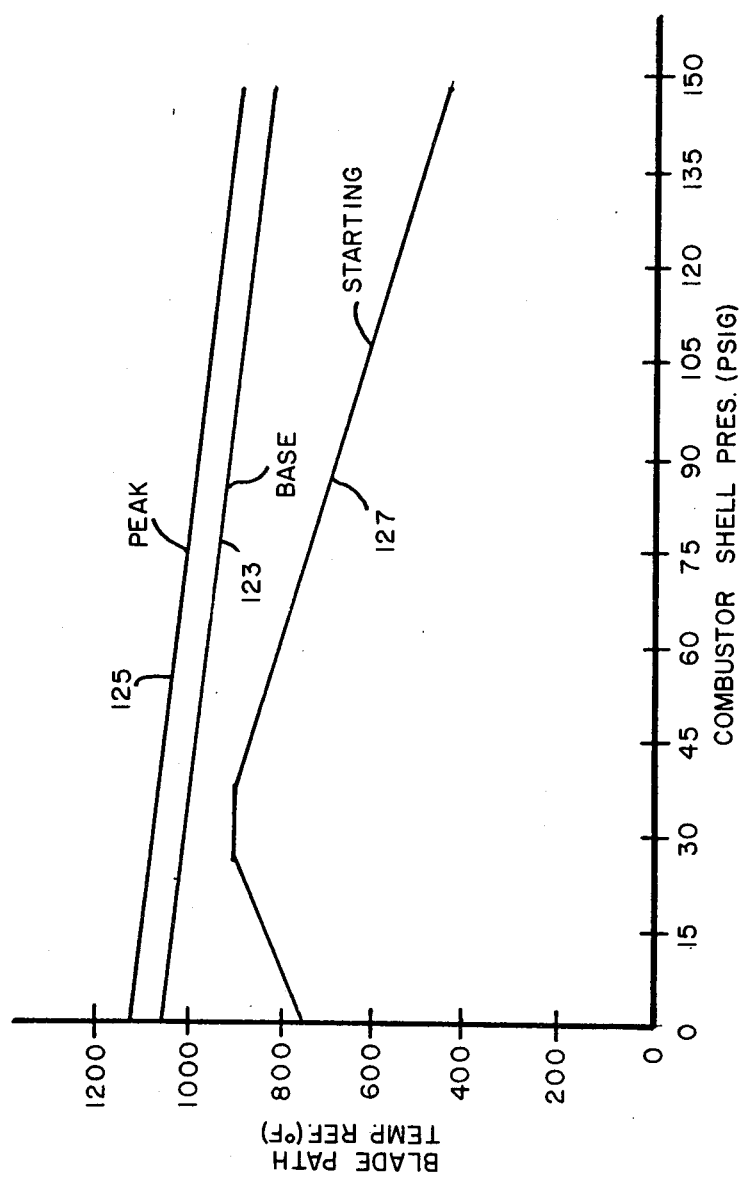
FIG.G5-9

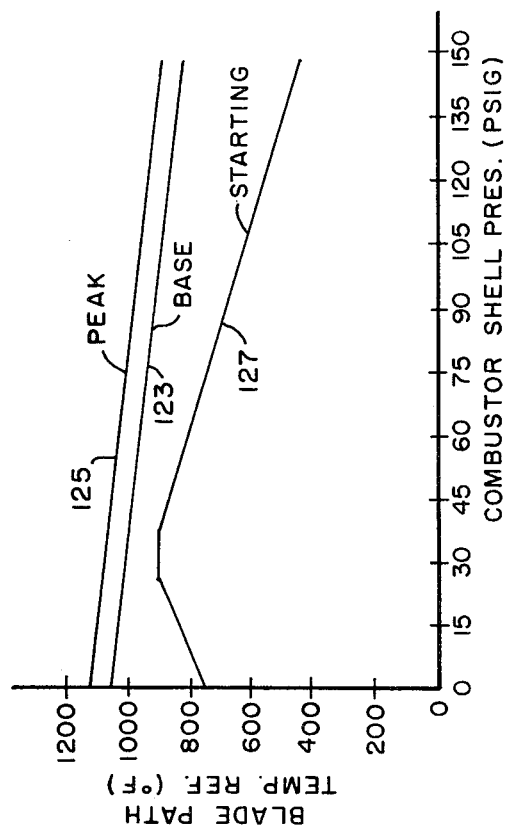
FIG. G5-11
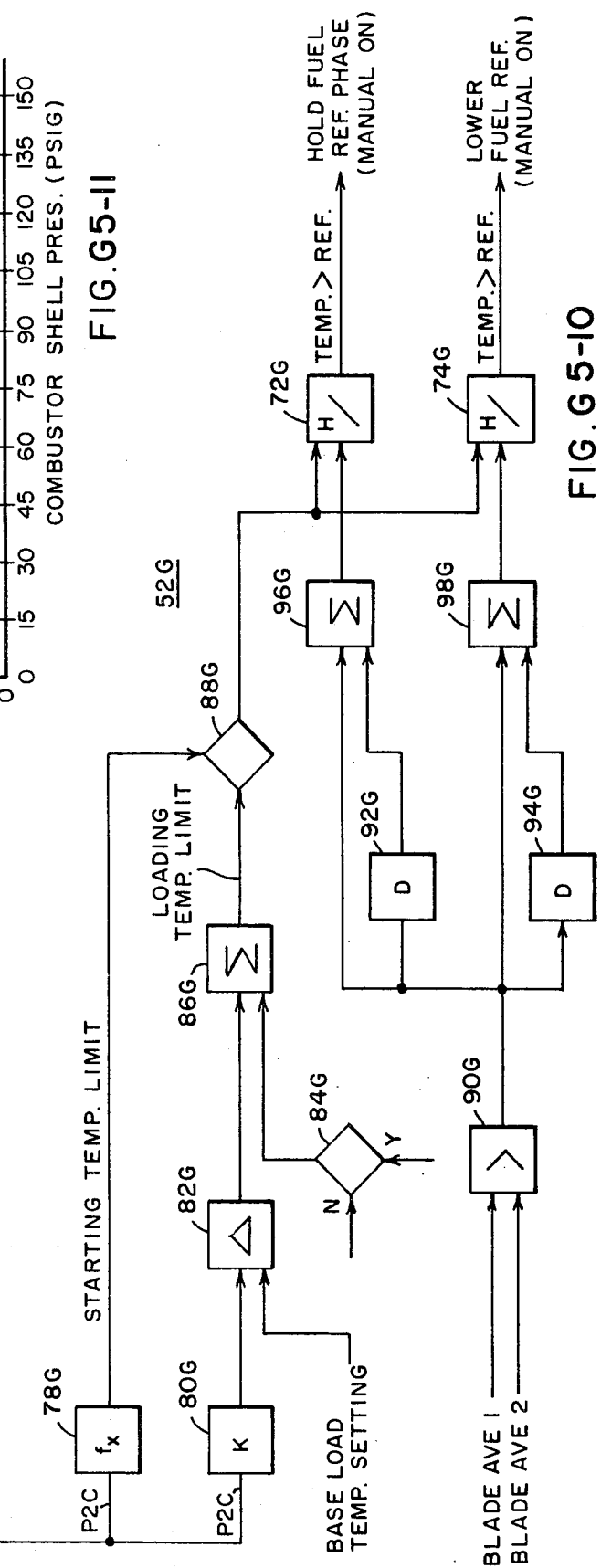
FIG. G5-10

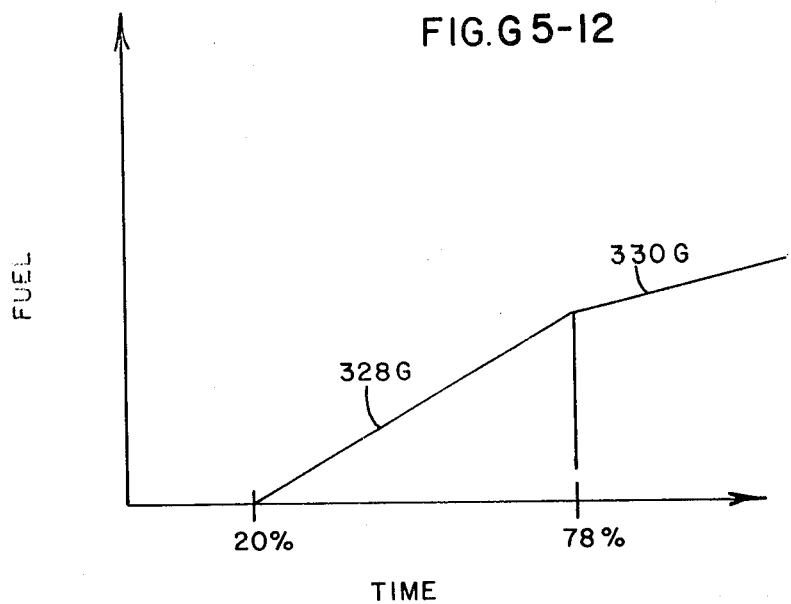
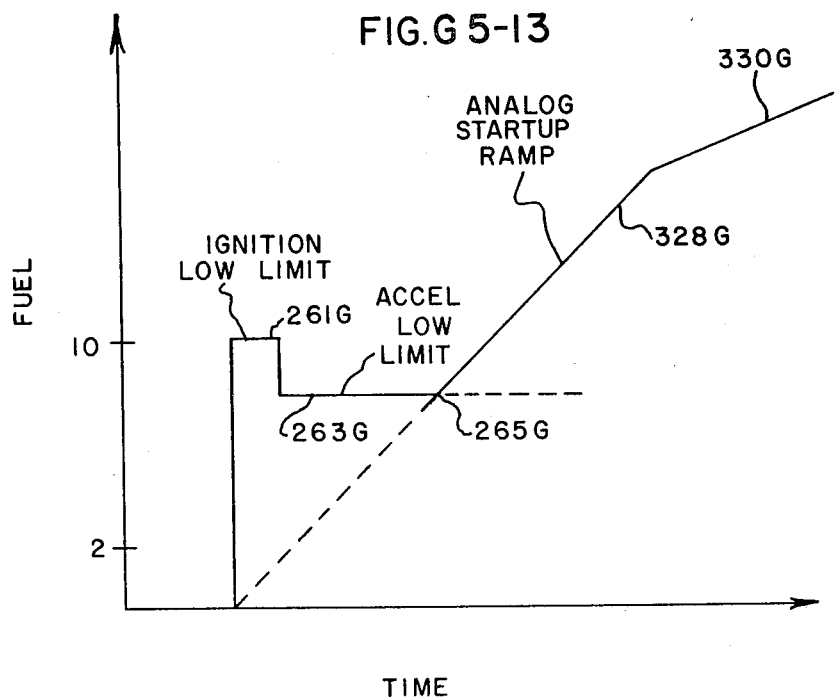

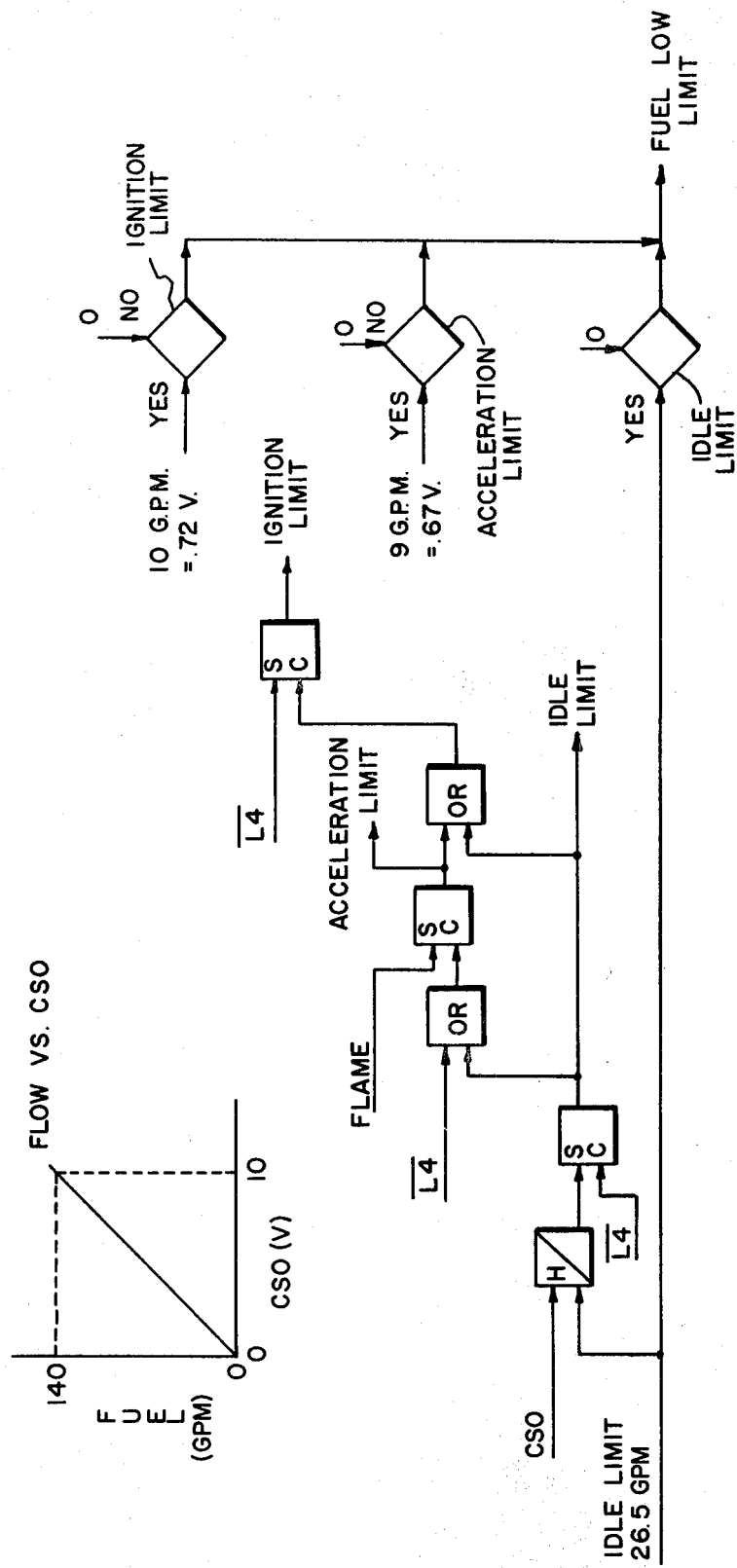

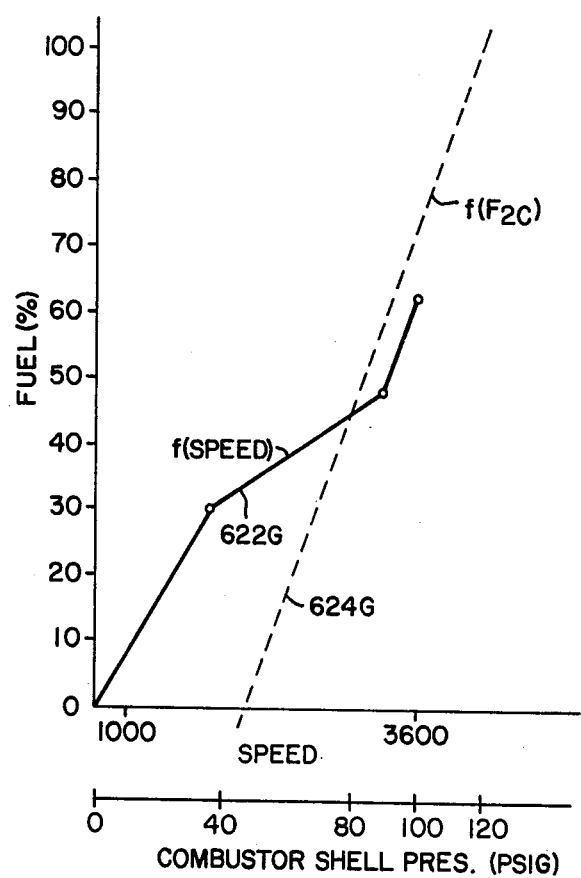
FIG.G5-15

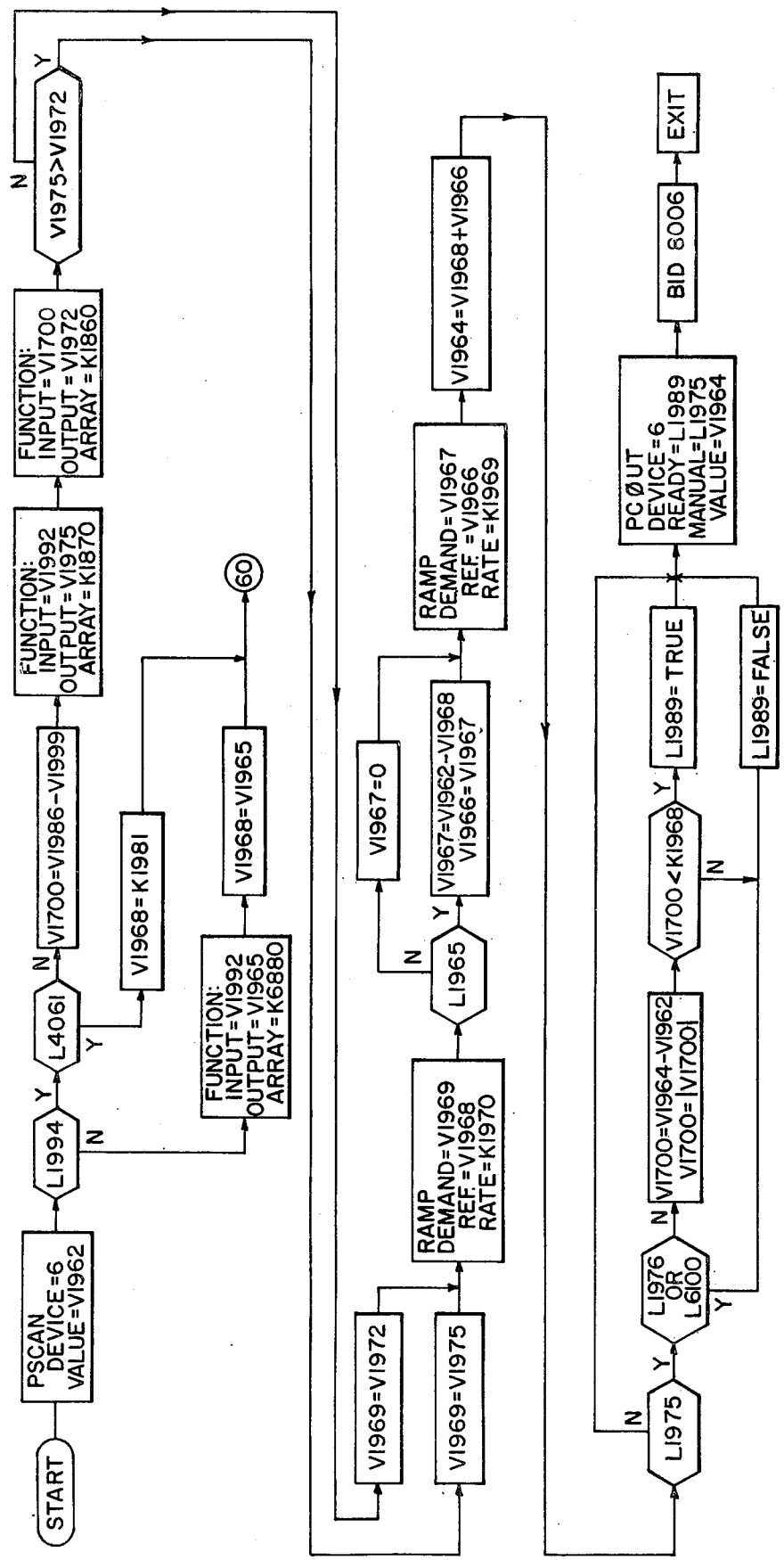
FIG.G5-16

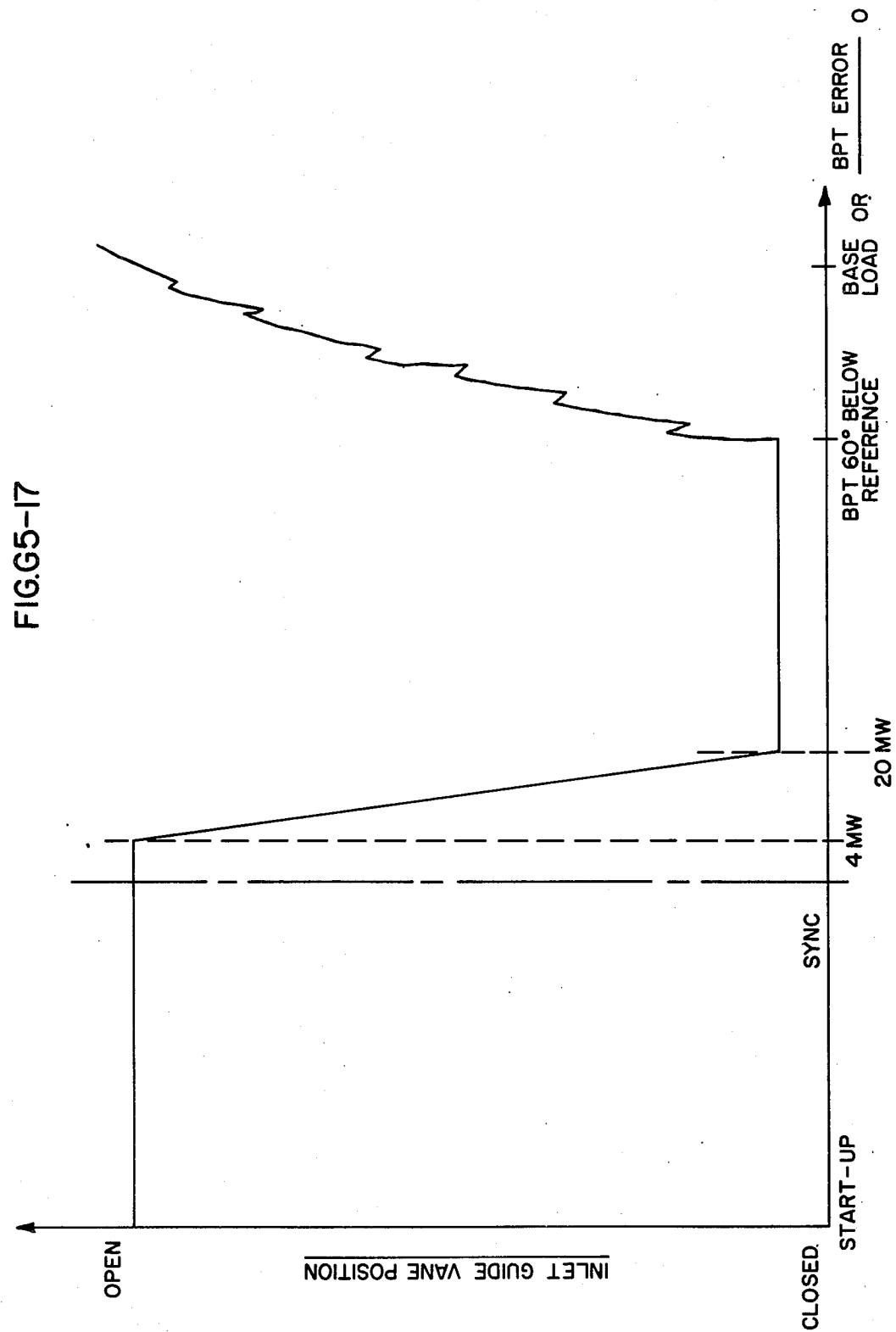
FIG.G5-17

COMBINED CYCLE ELECTRIC POWER PLANT HAVING AN IMPROVED DIGITAL/ANALOG HYBRID GAS TURBINE CONTROL SYSTEM

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

5. Ser. No. 495,722, filed concurrently herewith by J. R. Smith and T. J. Reed, entitled "Improved Digital/Analog Interface System Especially Useful In Turbine And Power Plant Control Systems", assigned to the present assignee.

6. Ser. No. 408,962, filed on Oct. 23, 1973 by Theodore C. Giras et al, entitled "System And Method For Starting, Synchronizing And Operating A Steam Turbine With Digital Computer Control", and assigned to the present assignee.

BACKGROUND OF THE INVENTION

The present invention relates to combined cycle electric power plants and more particularly to improved digital/analog hybrid control systems especially useful in the operation of gas turbines in combined cycle electric power plants.

In the manufacture of combined cycle and other electric power plants, it is desirable that they be structured to be characterized with high operating availability for power generation. Control system and other equipment operating reliability is one important factor in the plant availability rating. Control system reliability in turn depends both on the reliability of parts of the control system as well as the manner in which the system parts are organized to provide the desired turbine performance and protection.

Digital/analog control systems can be hybridized in varying ways to provide specific control performance while control system reliability and cost depend on the system organization. The previously noted patent application Ser. No. 319,114 discloses a digital/analog hybrid control system which is arranged to operate a gas turbine electric power plant. In another patent application Ser. No. 476,182 entitled "Local Maintenance Controller For Gas Turbine Power Plants Having A Primary Control System" filed by R. A. Yannone et al on June 4, 1974 and assigned to the present assignee, there is disclosed a backup control system usable with the hybrid control system of Ser. No. 319,114 to obtain extended system reliability. In the previously noted patent application Ser. No. 371,625, there is disclosed another control system and the manner in which it is organized to achieve high gas turbine operating reliability.

The present patent application is directed to an improved digital/analog hybrid control system especially adapted for operating gas turbines and other equipment in a combined cycle electric power plant.

The description of the prior art herein is made on good faith and no representation is made that any prior art considered is the best pertaining prior art nor that the interpretation placed on it is unrebuttable.

SUMMARY OF THE INVENTION

A combined cycle electric power plant includes turbine and generator apparatus and a control system arranged to provide improved plant availability. The control system preferably includes an automatic digital computer control and a backup gas turbine analog control which are interfaced with each other to provide gas turbine fuel control. Preferably the automatic digital control is also interfaced with a backup steam turbine analog control to provide automatic and backup steam flow control for a steam turbine in the combined cycle power plant. Certain gas turbine functions are performed continuously in the analog backup control system during both automatic and manual modes of operation of the gas turbine. A separate gas turbine sequencer is preferably also included in the gas turbine control system to provide gas turbine startup sequencing and gas turbine trip protection. As a result of its organization, the control system economically and efficiently provides high control system availability and therefore high gas turbine and plant availability for electric power generation.

BRIEF DESCRIPTION OF THE DRAWINGS

FIGS. 2A and 2B illustrate a gas turbine structure which can be employed in the plant of FIG. 1;

DESCRIPTION OF THE PREFERRED EMBODIMENT

A. General Plant Description

Figure 1:
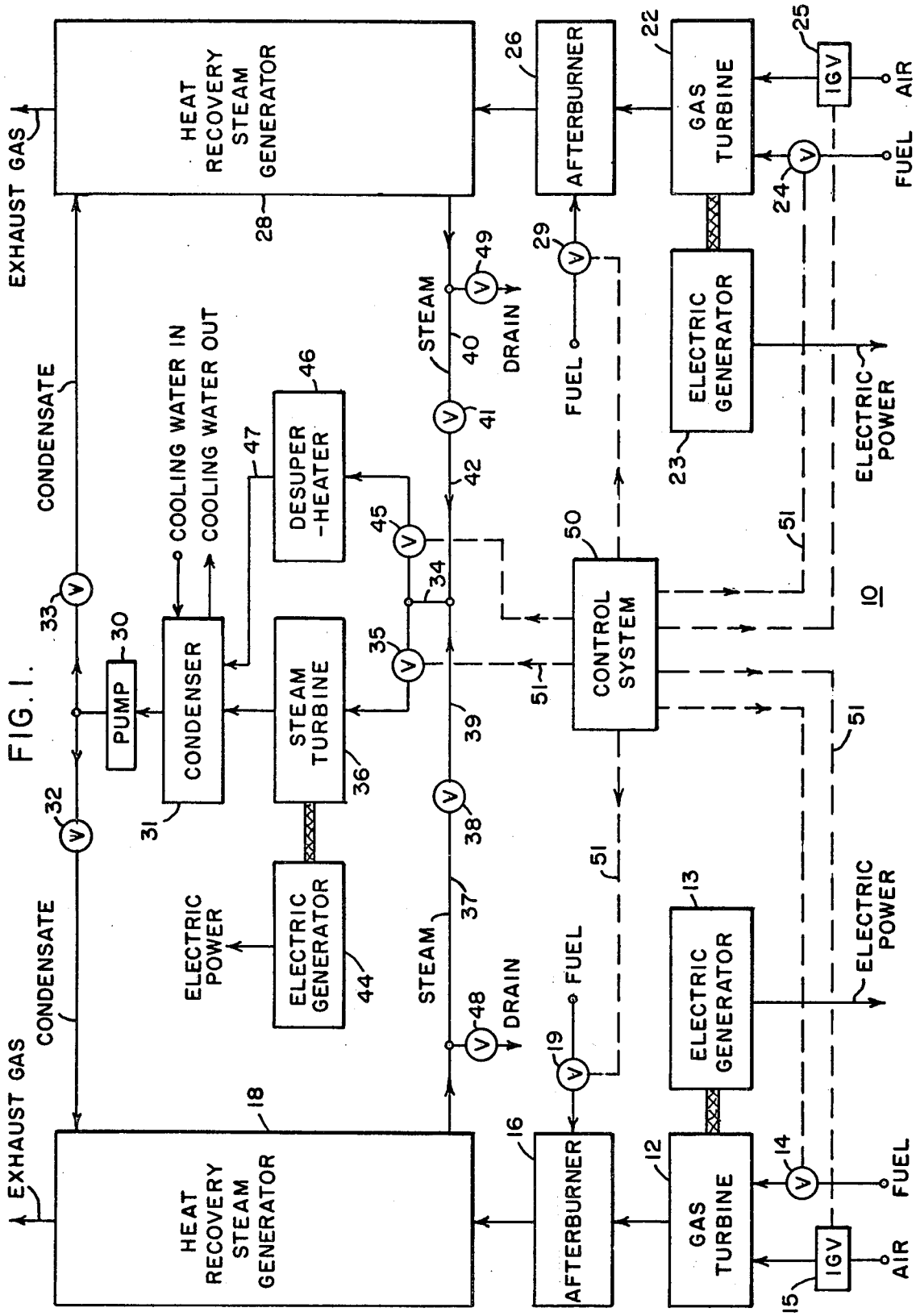
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2B:
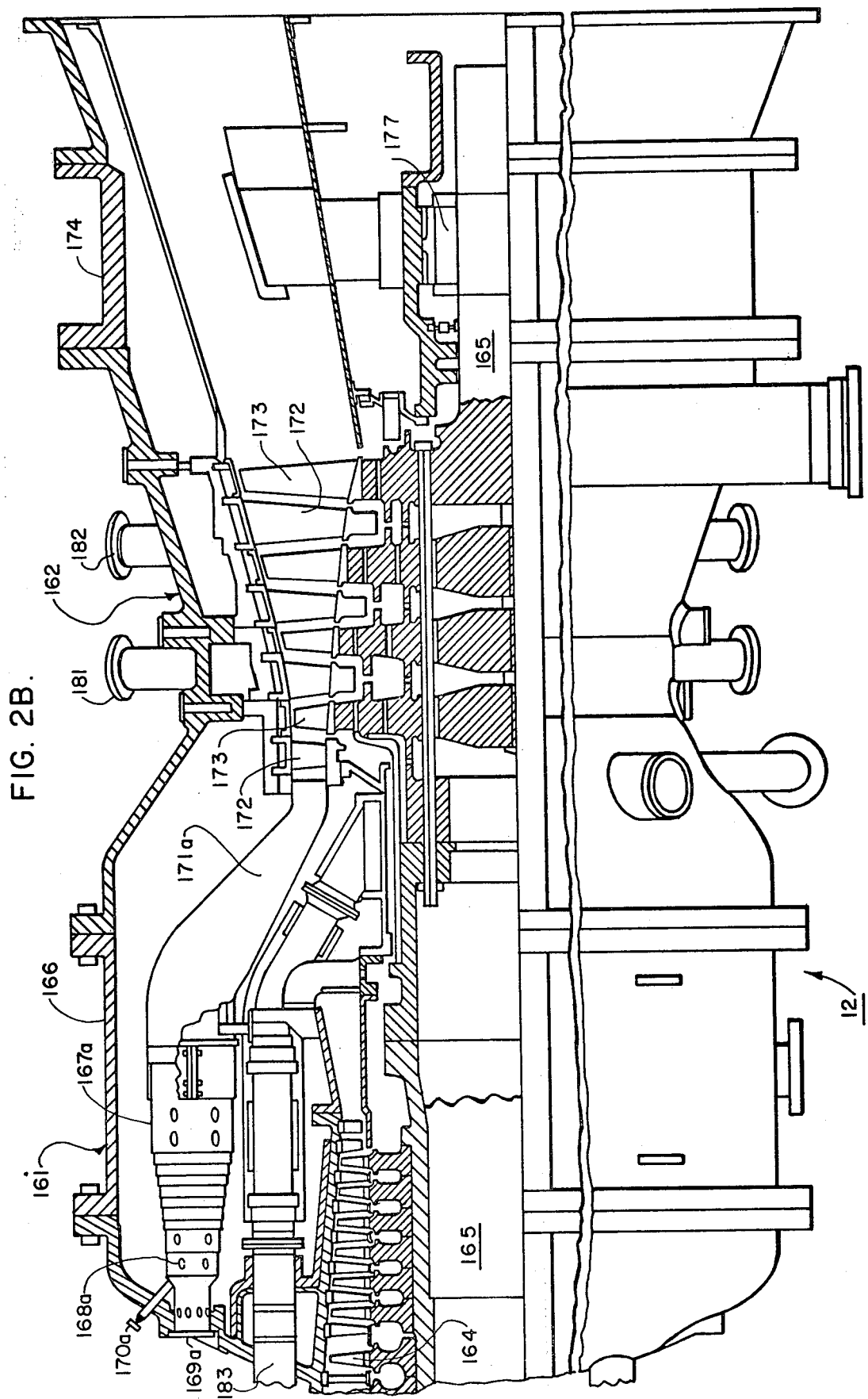

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
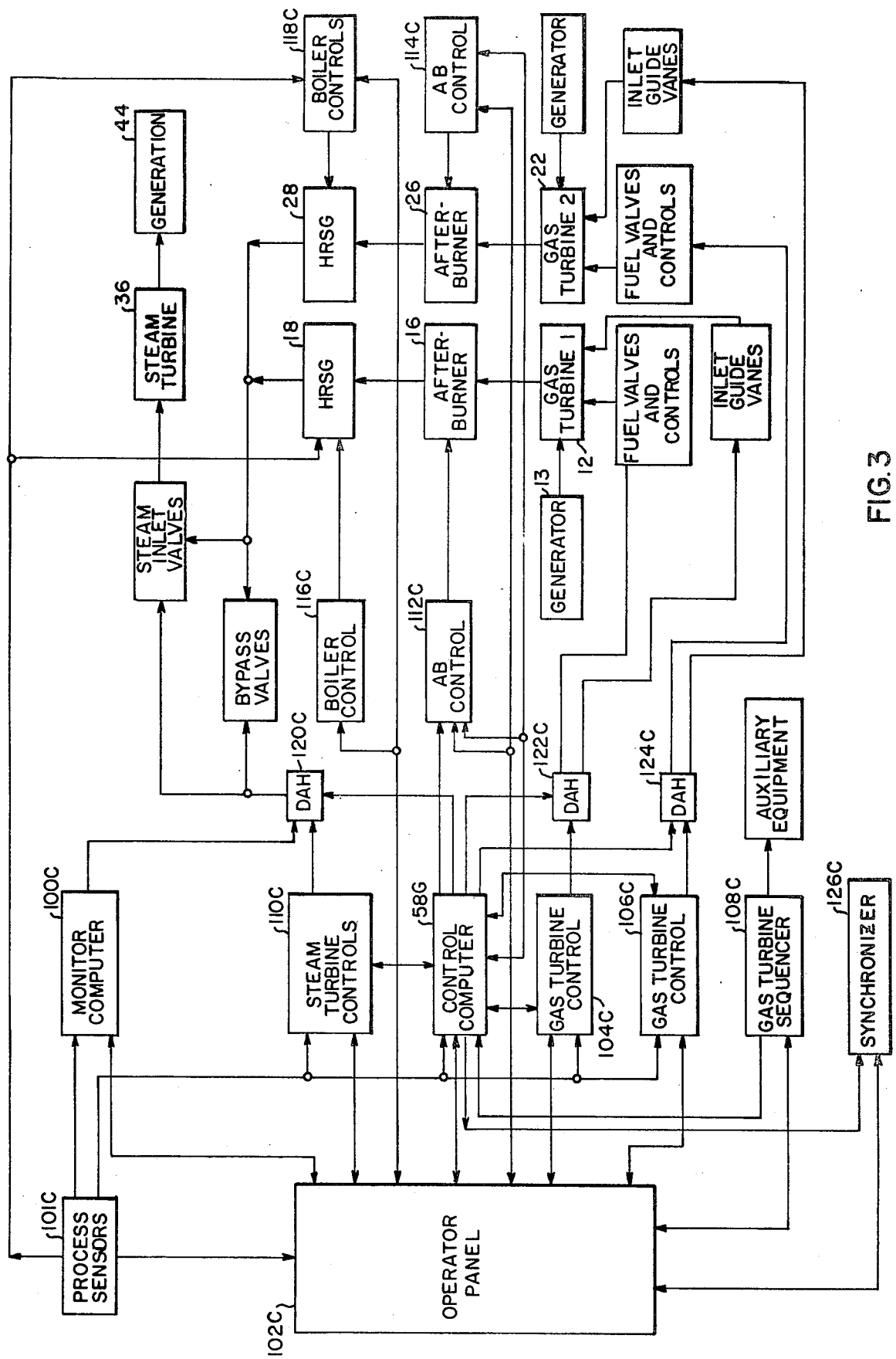
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital ana analog controls.

Under plant coordinated control, the computer 58G generally directs the plant operation through startup, synchronization and loading to produce the plant power demand. The extent of coordinated plant control is dependent on the existing plant configuration, i.e., according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e., they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Hybrid Control System For Gas Turbine

Figure 4:
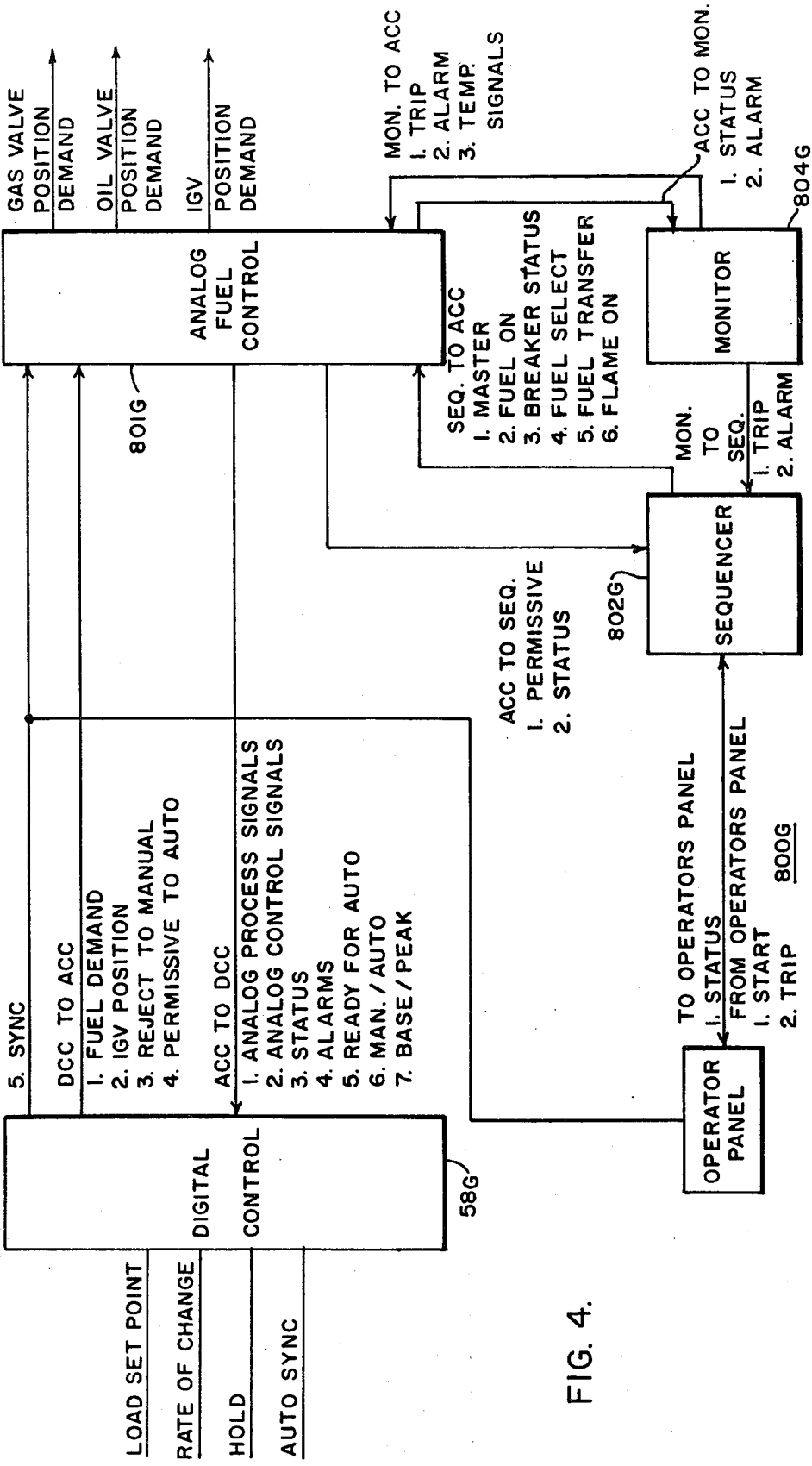
FIG. 4 shows a functional block diagram which indicates the manner in which the gas turbine control system functions are hybridized between digital and analog parts of the gas turbine portion of the plant control system.

As shown in greater functional detail in FIG. 4, the plant control system 50 includes a control system 800G for each gas turbine and it basically includes the digital automatic control computer 58G, an analog control center 801G which provides backup and other control functions, a sequencer 802G and a monitor 804G. An operator panel 806G interacts with the digital and analog controls 58G, 801G, 802G and 804G. In FIG. 4, the interaction between blocks is designated.

Generally, each of the four major blocks and operator panel are structured as separate, stand-along parts of the control system. In this manner, maintenance and troubleshooting are simplified. Further, the control system is generally adaptable to updating as new components, new technologies or new plant operating procedures become available for the individual control system sections in the course of time. Thus, a complete redesign of the total control system is not required to accommodate improvements in the individual control system sections.

In the analog system sufficient functions are provided to start, synchronize, load, trip and shut down the gas turbine. The analog system is divided into an analog fuel control system, a sequencer and a monitor to provide these functions.

In the analog fuel control system, there is sufficient computational and logic circuitry to provide the regulation requirements for the specified gas turbine control functions outside of the digital computer 58G. Automatic turbine sequencing and turbine protection requirements are provided through the functioning of the sequencer and the monitor. More particularly, the analog fuel control when operating without the computer provides the following functions:
1. Blade Path Temperature Limit Control (starting and loading)—deactivated on computer control
2. Surge Control
3. Turbine Overspeed Control
4. Startup Fuel Ramp—deactivated on computer control
5. High-Low Fuel Limit
6. Gas-Oil Fuel Transfer
7. Manual Fuel Setpoint Control
8. Automatic Inlet Guide Vane Positioning
9. Automatic Limiting of Inlet Guide Vane Opening
10. Dual Feedback Speed Signal Development
11. Process Status Monitoring The analog fuel control system also includes manual/automatic selection circuitry, permissives and rejects in order to control whether the digital computer or the backup control operates the gas turbine. An operator panel provides for interfacing the analog fuel control system with other elements of the gas turbine control system and with the plant operator.

As indicated in the above listing, certain gas turbine control system functions are always performed in the analog fuel control. Thus, when the system is operated in the coordinated or operator automatic modes of operation with the digital computer 58G in control, temperature, startup and loading fuel control are performed in the computer but surge and overspeed protection functions are performed in the analog fuel control. If control is transferred to the operator analog mode, temperature control and the startup and loading control responsibility is transferred to the analog fuel control system.

The sequencer includes logic circuitry needed for certain automation and protection requirements for the gas turbine control system. It provides functions including the following:
1. Automatically sequences the gas turbine from turning gear operation through ignition to pre-synchronizing speed
2. Monitor Status of Auxiliaries
3. Start/Stop Auxiliaries
4. Monitor Sequence Permissives
5. Monitor Turbine Status
6. Generate Trips and Rejects
7. Generate Alarms
8. Control Gas/Oil Fuel Transfers
9. Select Fuel The sequencer performs its functions in coordinated, operator automatic and operator analog control. The digital computer 58G directs the sequencer when the plant is in the coordinated or operator automatic level of control but it does not replace any of the sequencer functions. The sequencer is interfaced with the monitor and analog fuel control modules and with the operator through the operator control panel. The gas turbine trip circuits in the sequencer are independent of all other control functions and are powered by a DC battery power system.

In the monitor, amplifiers, comparators, selectors and indicators for temperature and vibration measurements, alarms, trips and displays are all included in a separate control system module. The monitor provides functions including the following:
1. Turbine Gas Temperature Measurements
2. Gas Temperature Averaging
3. Gas Temperature Alarm
4. Overtemperature Trip Signal Generation
5. Gas Temperature Displays
6. Turbine Vibration Measurement
7. Turbine Vibration Alarm
8. High Vibration Trip Signal Generation
9. Turbine Vibration Display The monitor performs its functions independently in all levels of control system operation. A monitor display panel is provided for interfacing the monitor with the sequencer and the analog fuel control.

The digital computer 58G provides for coordinated plant control over the major pieces of plant equipment including the gas and steam turbines during startup and loading operations. The digital control includes the following automatic gas turbine control functions:
1. Startup Fuel Control
2. MW Load Control
3. Rate of Change of Load
4. Blade Path Gas Temperature Control
5. Inlet Guide Vane Control
6. Manual/Automatic Permissives and Rejects
7. Transmitter and System Monitoring
8. Alarms
9. Control Messages
10. Turbine and Plant Status The digital gas turbine control is interfaced with the analog fuel control and the operator through the operator control panel and data loggers. As previously indicated the digital computer provides for automatic temperature control, startup and loading control and inlet guide vane control for the gas turbines and bypass and control valve positioning control for the steam turbine. The information generation system provided by the computer 58G is functional and available to the operator in all operating modes. If a computer malfunction occurs, transfers are automatically made to the backup analog control system for continued and substantially bumpless turbine operation. For more information on the operator control panel, reference is made to Appendix D of Ser. No. 495,765.

Generally, the hybrid control system provides the power of a digital computer for primary control with a reliable and economic hardwired analog control for backup turbine control if a malfunction occurs in the computer or if the operator selects backup control for maintenance or other reasons. Further, the control system is modular within itself and modular relative to other elements of the plant control system. Thus, it can operate independently of other control systems for other major equipment items in the combined cycle power plant. Although the analog fuel control system does not duplicate the degree of automation provided by the digital computer control system, it does contain sufficient functions to allow a single operator to control the gas turbines over normal ranges of power operation, to switch to a safe condition in case of a malfunction, to adjust load according to demand and to place the gas turbines on line, standby operation. Transfers are made from primary to backup control simply and bumplessly in the event of a computer malfunction or an operator selection during startup or loading operation. Each section of the gas turbine control system is a separate, stand-alone subsystem in equipment and function to simplify maintenance, troubleshooting modernization or modification and major safety protection functions are provided independently from the basic control system.

Figure 5:
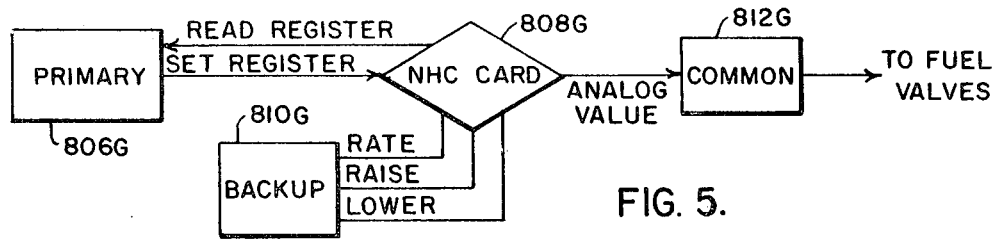
FIGS. 5 and 6 show respective functional block diagrams which illustrate the manner in which the digital automatic and analog backup controls are interfaced in the gas turbine control system.
Figure 6:
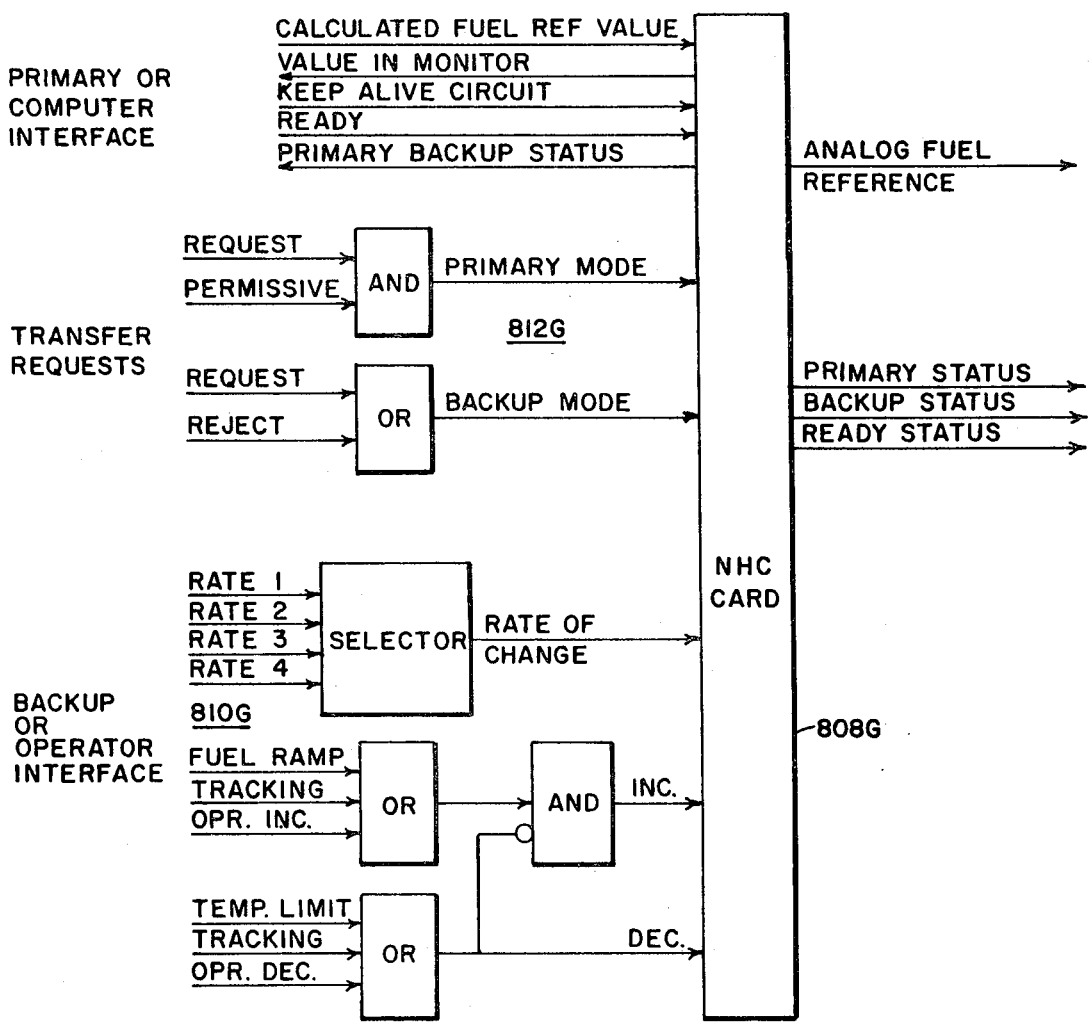

As shown in more functional detail in FIGS. 5 and 6, the DAH 122C or 124C shown in FIG. 3 includes an NHC card 808G which interfaces the primary or digital automatic control 806G and a backup analog control 808G for gas turbine fuel control purposes. Generally, the NHC card (nuclear hybrid coupler card) is arranged to provide a set of functions which are generally useful for digital/analog interfacing in various applications and which can be specifically integrated into particular overall primary and backup control systems to pprovide special advantages in those systems. Thus, separate NHC cards are used in the present combined cycle plant for each gas turbine fuel control, each gas turbine inlet guide vane control, and each steam turbine valve control.

With respect to the interface between the primary and backup controls for the gas turbines, reference is made to FIGS. 5 and 6. A primary control 806G is connected to a digital/analog interface card or NHC card 808G where a fuel control output sets a register. A backup control 810G is also coupled to the NHC card 808G. An analog output signal is generated by the NHC card in accordance with whether the primary computer control 806G or the backup analog control 810G is in control. The analog output signal is applied to a common control block 812G. Certain limit protection and other functions are performed in the common block 812G in the generation of a final output fuel control signal for the turbine throttle valve.

The primary control 806G has the calculation advantages of a digital computer, and it responds to signals from the turbine process and calculates a desired valve position demand signal which is transmitted to the NHC card 808G as a single computer word which is stored in the card register.

In the sixteen bit computer output word, bits 12 and 13 are status bits as follows:
00—Do nothing, ignore any data
01—Clear ready
10—Pulse alive, accept data if in automatic mode, set ready if in manual mode
11—Go to manual mode In the sixteen bit computer input word which is employed for tracking the register setting in the NHC card 808G when the backup control is in operation, status bits 12 and 13 provide indications as follows:
00—Card in manual mode
10—Card in automatic mode In the computer input and output words, bit locations 0-11 carry the valve position signal data.

Generally the backup control 810G is an organized arrangement of circuitry which provides certain analog and logic control functions which are interrelated to result in three output signals, i.e., rate, raise and lower. The raise and lower signals are applied to the NHC card 808G to cause the internal card register to be counted up or down after the rate specified by the backup control 810G. The card register output is converted to the analog output signal from the card 808G and therefore the fuel control signal moves up and down as the card register is counted up and down.

During normal automatic operation of the plant, the primary digital computer control 806G directly sets the card register to control the turbine fuel flow during startup and load modes of operation. When the digital computer control is functioning the backup analog control is inactive and its raise/lower signals if generated are disconnected from the NHC card 808G.

If the primary computer control fails or for some reason becomes unavailable, its last output to the card register remains fixed. As shown in FIG. 5B, the NHC card 808G senses the failure of the primary computer controller through logic circuitry 812G and the card circuitry is switched to a mode where it accepts only raise or lower inputs from the backup control 810G. If no raise or lower input demands are generated, the card register remains at its last value and the analog output from the NHC card 808G does not change. The entire system accordingly remains in a fixed state and bumpless transfer is achieved. The fixed state operation can continue indefinitely substantially without drift, but if certain operating parameters monitored by the analog backup limit controls are exceeded, the analog control system comes into operation automatically and provides the proper raise or lower signals required to return the turbine operation to a safe level.

When the primary computer controller becomes available again, it reads the current NHC card register setting and adjusts its control loops until their output matches the register setting and then informs the operator that it is ready to undertake control. The operator can then initiate a transfer back to automatic control through the logic circuitry 812G and the NHC card 808G then accepts inputs from the primary computer control and disconnects the backup control.

The described interface circuitry between a digital primary and an analog backup control provides bumpless transfer in both directions, and bumpless transfer is provided from automatic to manual without any requirement for tracking hardware in the backup controller. Generally, the system provides a stable setpoint with a sit-still capability upon transfer from automatic to backup operation. Interfacing is kept relatively simple and reliable through the integration of all backup system control and logic functions into one raise output signal, one lower output signal and a rate control output. System reliability is also enhanced by the fact that the computer control simply and directly sets the data register and the interface circuit. Another advantage lies in the fact that the backup control does not have to be active during primary computer control operation. Further, the rate of change of the NHC card output signal in the backup control mode is readily modified through logic circuitry included in the backup controller to generate the rate control output thus providing flexibility for the rate of change of the fuel flow or other controlled variables to be adapted to the severity of any process upset which may cause raise or lower requests.

DIGITAL/ANALOG HYBRID COUPLER (NHC) CARD

Figure 7:
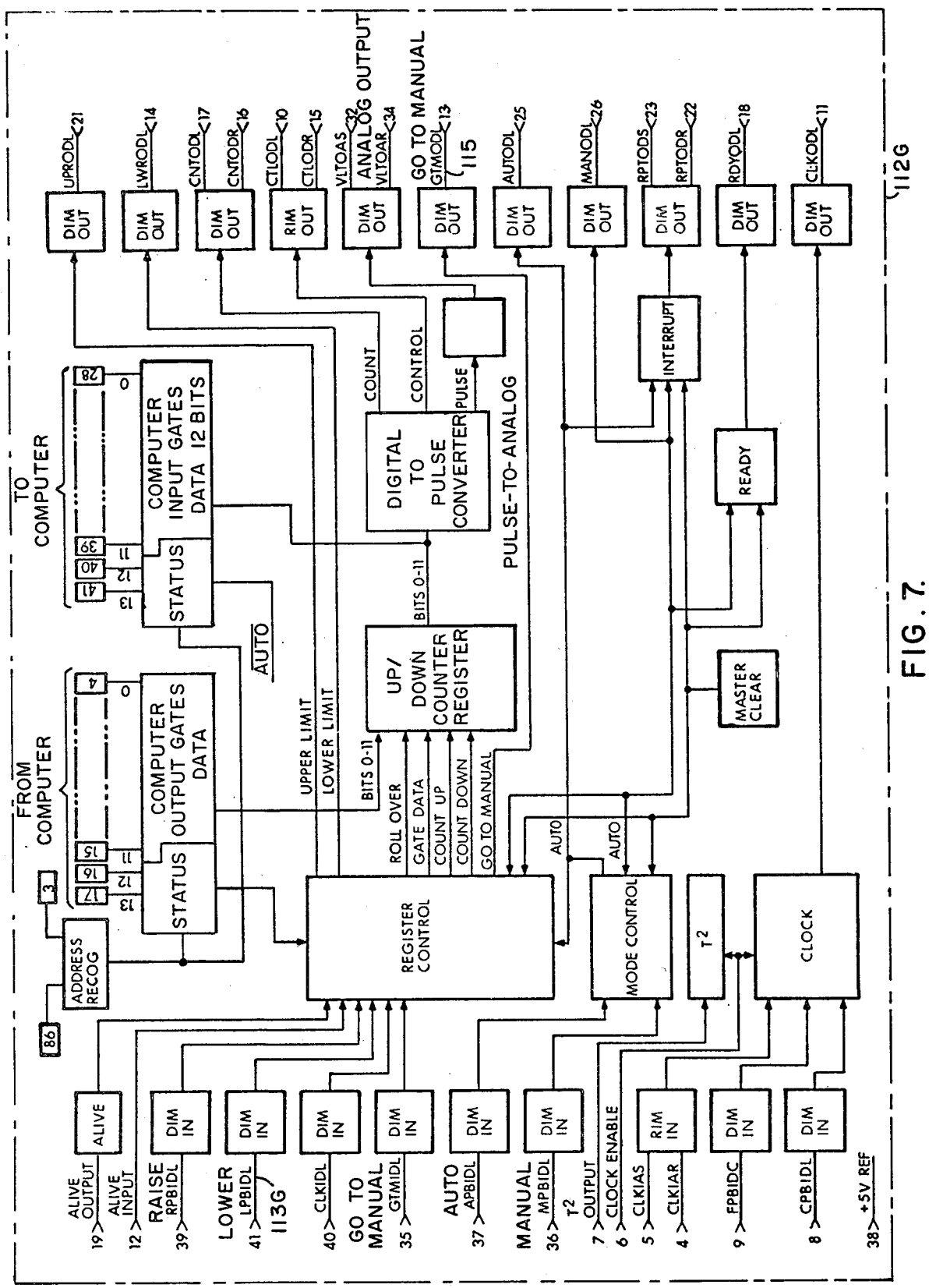
FIG. 7 shows a schematic diagram of a circuit card which provides a hybrid interface between the digital computer circuitry and the analog circuitry employed in the gas turbine control system.

As shown in greater detail in FIG. 7, the fuel reference raise and lower signals are applied to the input of an NHC register control which causes an up/down counter register to count up or count down according to whether a raise demand or lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as a fuel reference to the fuel valve control as indicated by the reference character 115G.

An NHC card converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

Automatic Operation

The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e., by means of a variable voltage at pins 4 and 5, determines the amount of time it takes to change the signal level. When the raise or lower signal goes low, i.e., logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A "Ready" output indicates that the card is in Manual mode and that no "Go To Manual" signal is present. The card can be forced to Manual by a "Go To Manual" signal. An internal "Go To Manual" is generated by the computer outputting a "Go To Manual" status, by either a "Raise" or "Lower" input, or by the Keep Alive circuit. After an Auto to Manual transition, the last number set in the D/A register by the computer remains until changed by the operator. For more detail on the NHC card, reference is made to Ser. No. 495,765.

E. Gas Turbine And Synchronization Control Systems

As shown in FIG. G4-1, the plant control system 50 includes a digital computer 58G which can for example be a Westinghouse P2000 computer which is structured with the Westinghouse PROGEN automatic programming system. A monitor computer 58M is also provided for plant data acquisition and manipulation and for automatic steam turbine startup control. The computers 58G and 58M are data linked.

In the control computer 58G, steam turbine and gas turbine control and logic functions, plant synchronization functions, operator interface functions, and mode control functions are all included. The gas turbine control system and the synchronization control system are partly embodied in the digital computer 58G and partly in external circuitry and other apparatus.

a. Plant Synchronizer System

As shown in FIG. G4-1, the control system 50 includes a synchronizer system 700G for automatically or manually bringing the plant turbines on line. In the combined cycle electric power plant sequence, as illustrated in FIG. G5-1, the plant is operated to a hot standby condition and the two gas turbines are then started. Shortly thereafter, the steam turbine is started as the gas turbines continue to be accelerated toward synchronous speed. Within a time frame of several minutes, all of the generators normally reach a speed near the synchronous value and the synchronizer system 700G sequentially synchronizes the generators, closes the generator breakers and minimally loads the turbines through the speed/load controls, and then the turbine speed/load controls proceed to load the gas and steam turbines to produce the selected plant load up to a maximum value. The entire plant sequence normally takes about one hour, i.e., the plant can move from hot standby to rated output of about 260 megawatts in one hour. If the plant configuration is other than normal, for example if one of the turbines is down, the automatic plant sequence is made as required by the plant configuration change. If the operator selects any mode other than the coordinated control mode, the plant synchronization sequencing is placed under operator direction for all plant configurations.

To start each gas turbine 12 or 22 under acceleration control, a digital startup speed control 704G operates with a fuel reference block 701G to generate a computer output fuel demand which is applied to a fuel valve position control 706G or 708G through a digital-/analog hybrid interface 710G or 712G. Like sequencers 705G start and stop gas turbine auxiliary equipment during the startup process.

The startup speed control 704G functions in a speed feedback control loop during gas turbine startup, i.e., a speed reference is compared to the actual gas turbine speed and the error is acted upon by a controller. Generally, a speed reference is generated in accordance with a speed versus time curve and the reference is compared with a representation of the actual turbine speed. Any speed error is acted on by the controller to produce a corrective fuel change. Hold and runback control actions limit the speed loop operation.

At the end of the acceleration ramp, the gas turbine comes to a state called Run Standby. In this state, the gas turbine is at about 3,600 rpm and is ready to be synchronized. In the operator automatic mode, the Run Standby state is automatically selected by the software until Run Standby is attained. At that time, the operator may select one of the loading states and initiate the synchronizing procedure. When operating at the plant coordinated level, the plant coordination control initiates synchronizing at the proper time. During the time the turbine is in Run Standby, the speed is held at synchronous speed by the speed controller.

In gas turbine load control, a load demand is applied to the reference generator 703G which generates a feedforward load reference which is output as a fuel valve position demand if MW trim correction is disconnected. With MW trim correction, the load reference is modified by the correction and the corrected reference is output as a valve position demand.

An automatic startup control 714G is also provided for the steam turbine 36. It operates with a valve control 715G to generate computer output sequencing signals and valve position signals which are applied through another digital/analog hybrid interface 716G to position controls 717G for turbine inlet and bypass valves 718G and to various auxiliary equipment items.

Gas turbine analog controls 720G and 721G and steam turbine analog controls 722G provide backup startup control in the event the automatic computer control is unavailable for startup or in the event the operator selects a particular turbine for backup control while the remaining turbines are kept in coordinated or operator automatic control. As the turbines are operated during startup, various afterburner and boiler controls (not shown) are operative as more fully disclosed along with more detailed turbine control disclosure in the aforementioned patent application Ser. No. 495,765, and other related cases referenced therein. For more detail on automatic steam turbine startup control like that referred to herein, reference is made to a copending and coassigned patent applicaton Ser. No. 408,962 entitled "System and Method for Starting, Synchronizing and Operating A Steam Turbine With Digital Computer Control" filed by T. C. Giras, et al on Oct. 23, 1973 as a continuation of earlier filed applications and hereby incorporated by reference.

After synchronization of each gas turbine, digital temperature and fuel flow controls 724G and 726G function in conjunction with pushbutton controls on an operator panel 728G and the digital reference generator 703G to generate power equal to a reference megawatt demand or equal to a megawatt value permitted by temperature control under base or peak load operation. In load operation of the steam turbine, a load control 730G operates through the valve control 715G to operate the steam bypass and steam turbine inlet valves until the turbine is loaded to the point where the bypass valves are closed and the turbine inlet valves are wide open with the turbine operating in a boiler follow mode. The turbine backup controls 720G, 721G and 722G also provide backup control in the load mode, and they further provide some protective control actions even during the automatic mode of operation.

The sequencer system 700G functions during the transition from the startup mode to the load mode. Thus, an automatic synchronizer logic block 732G generates an output which enables the system for the automatic synchronization mode for each turbine when automatic synchronization and automatic field voltage regulator switches on the operator panel have been actuated and when the voltage regulator breaker for that turbine is closed as indicated by a contact closure from a block 734G. In this case, each voltage regulator breaker closes when its generator reaches 98% of synchronous speed.

The first gas turbine to reach 98% synchronous speed is the first turbine placed under automatic synchronizer system control by a sequence and mode logic block 736G if it has reached that value within a predetermined acceleration time interval which is a preselected value such as twelve minutes. If both gas turbines attain synchronous speed substantially simultaneously, the gas turbine 12 is synchronized first. If the first gas turbine or any other turbine fails to reach synchronous speed from the turbine start time, i.e., from the gas turbine ignition time or from the steam turbine control valve opening time, within its prescribed time interval as detected by a timer in the block 736G, it is rejected from the automatic synchronizer sequence and the next turbine is automatically processed by the sequencer system 700G. The allowed steam turbine acceleration interval is a value such as nine minutes. An alarm is communicated for any rejected turbine so that the operator can determine whether there is some equipment fault or whether the rejected turbine simply must be manually synchronized.

During manual synchronizing, the operator matches the turbine generator frequency to line frequency by adjusting the speed demand from a block 737G to the speed control 704G through the operator panel 728G. The changing of the speed reference input causes the reference to move slowly toward the demand. As this occurs the generator and the line slip through synchronism and the breaker can be closed.

Once a particular turbine-generator is identified for synchronization, a sequencer 738G generates a contact closure output to energize an external timer circuit 740G so that a timer associated with that turbine-generator initiates the synchronizing sequence. After a short delay period, the timer operates contacts to energize a control relay which in turn operates contacts in switch networks 742G, 744G, 746G and 747G. In operating the contacts in the switch networks, the control relay connects respective potential transformers for the identified generator and associated line to a conventional synchronizer 748G. For example, if the first gas turbine has been identified for synchronization, the first generator potential transformer G1PT and the first line potential transformer L1PT are connected to the synchronizer 748G. Operation of the control relay contacts also causes the voltage raise/lower signals from the synchronizer 748G to be connected to the voltage regulator associated with the turbine-generator selected for synchronization. In the cited example, the control relay contacts couple the synchronizer 748G to the first voltage regulator. Control relay contact operation also connects the synchronizer 748G to the appropriate breaker for synchro acceptor enabling of transmittal of the breaker closure signal at synchronization.

In this instance, a separate synchro acceptor is provided for each generator breaker. The purpose of the synchro acceptor is to provide a coarse check on phase by providing a contact closure which enables breaker closure when the phase relationship of the two waveforms is acceptable. Ordinarily, the synchronizer 748G generates its breaker closure signal within about 5 cycles difference between the two waveforms and ordinarily the synchro acceptor contact would be closed at that point to permit transmittal of the synchronization signal to the generator breaker.

The generator and line potential waveforms are applied to the synchronizer 748G through the switching circuits 742G and 744G in order to provide for voltage matching and frequency matching between the two waveforms. The synchronizer 748G performs the matching function by generating signals which are applied through the switch network 746G to the voltage regulator for the generator to be synchronized, and the voltage regulator provides voltage adjustment through variation in the generator field energization as previously indicated. Frequency matching is performed by the synchronizer 748G by the generation of speed pulses as indicated by the reference character 750G which are applied to the computer 58G and more particularly to the speed control 704G for gas turbine speed changes or to the steam turbine startup control 714G for steam turbine speed changes. Each pulse generated by the synchronizer 748G represents a command for an increase in the turbine speed of 1 rpm.

The final result is an increase or decrease in the fuel reference to the gas turbine or the valve position reference to the steam turbine valves, which will result in a corresponding increase or decrease in turbine speed. When the synchronizer 748G detects the proper slip frequency between the generator voltage and the line voltage, no further speed raised pulses are generated.

Once the generator and line frequencies are substantially in phase and a voltage match substantially exists, the synchronizer 748G generates a signal to close the generator breaker and a breaker close signal is then applied to the synchronizer sequencer 730G in the computer 702G. If the generator breaker does not remain closed for a finite time such as 15 seconds an anti-pump circuit prevents the breaker from attempting to automatically close a second time. A time delay of approximately 20 seconds duration is provided to check the generator breaker closure status to assure that the anti-pumping check has been accomplished before the sequencer 738G permits the synchronization process to be sequenced to the next generator identified for synchronization. If the breaker does not remain closed for 20 seconds, the synchronizer sequencer 738G provides a contact closure output to alarm the fault and the generator and its associated turbine are rejected out of the automatic synchronization sequence.

If the first gas turbine generator has been successfully synchronized, the gas turbine is loaded to minimum load through operation of the synchronizer sequencer 738G. When the minimum load status is confirmed, the sequencer 738G generates a contact closure output to the timer circuit 740G associated with the next turbine generator identified for synchronization. By providing some delay in the generation of switching actions which decouple the synchronizer 748G from circuitry associated with one turbine generator and couple the synchronizer 740G to circuitry associated with another turbine generator, assurance is provided that the synchronizer 748G will have returned to a non-energized state before the new synchronization procedure is undertaken.

Generally, the sequencer 738G provides an adjustable time delay between 1 and 2 minutes for the purpose of measuring the time taken in attempting a synchronization for each turbine generator. If synchronization of a generator has not been completed within the predetermined time period, an alarm is communicated and the generator is rejected from the automatic sequencing procedure as the next identified generator is ready for synchronization.

After either or both gas turbine generators have reached minimum load, the synchronizer sequencer 738G initiates the synchronizing sequence for the steam turbine generator. Once the steam turbine generator is synchronized, the plant load reference is ramped to the desired value after the steam generator has reached its minimum load operating level.

b. Digital Fuel Control and Megawatt Load Control System For Gas Turbine

As shown in FIG. G4-2, a gas turbine megawatt load control system 400G is included in the plant control system 50 to provide for gas turbine operation at a controlled megawatt level in response to a plant coordinated control setpoint, operator megawatt setpoint, or a remote digital dispatch megawatt setpoint. In coordinated control operation, gas turbine electrical load can accordingly be automatically and accurately controlled through control of the megawatt load generated by the operation of the gas turbines. In turn, with additional plant control, total plant electrical load is enabled to be controlled automatically and accurately. Further, in the operator automatic mode, the generated gas turbine load can be accurately set by an operator or by a remote setpoint to satisfy plant power dispatch requirements. In the latter case, turbine megawatt setpoint adjustments could be required to reach a particular dispatch plant power level according to the resultant steam turbine generated power which is combined with the gas turbine power to provide the total plant power.

The manual/automatic status of the plant control system 50 is fixed by operator selection at an operator panel 402G or by a computer rejection or failure to manual. A digital/analog hybrid interface 404G includes manual/automatic logic circuitry to detect when the gas turbine 12 is to be on manual control and to make bumpless switching operations which implement the applicable control mode.

In automatic control, the programmed digital control computer 58G generates a fuel reference from the hybrid interface 404G in the coordinated and the operator automatic modes to provide megawatt load control and to schedule fuel for automatic startup. It also initiates turbine startup by a sequencing system 406G under coordinated control. Generally, the sequencer 406G sequences the gas turbine 12 through the startup process by starting and stopping auxiliary equipment when sequencing permissives are generated, and it trips the turbine if certain conditions develop. Further, the sequencer 406G generates logicals for the turbine controls, i.e., a master relay on signal, a fuel on signal, a breaker status signal, a fuel select and transfer signal, and a flame on signal.

Megawatt control is provided only in the automatic modes of operation and it is not available to the operator in the backup modes. Generally, the megawatt level of gas turbine operation in the backup modes is that which results from the manual operation of a feedforward speed/load control through raise and lower pushbuttons.

The operator controls the turbine loading operation in the backup mode by generating a fuel reference from the hybrid interface 404G through backup and limit controls 408G. The backup controls also include a simplified startup speed control which generates a feedforward fuel reference from the hybrid interface 404G during startup. Analog controls including overspeed and surge limiters function during the coordinated and operator automatic modes of operation as well as the operator analog and manual modes of operation.

An analog temperature limit control is included in the block 408G to function during the manual and operator analog modes as a limit on the fuel reference. The computer 58G provides a digital temperature limit control function 410G which acts as an override or a hold on the startup speed and load controls during the programmed computer operation in the automatic mode.

The hybrid interface 404G applies its output fuel reference to valve position control circuitry 412G which operates fuel valves 414G. As already indicated, the hybrid output fuel reference valve is that value resulting from computer control or that value resulting from operator control from the control panel, subject to limit action. Transfer between automatic and manual fuel references is made bumplessly by the functioning of the hybrid interface 404G.

In the backup mode, the temperature limiter circuitry functions to limit bumplessly the fuel reference output signal from the hybrid interface 404G as required to prevent excessive blade path temperature and in turn excessive turbine inlet gas temperature. Surge and overspeed limit controls function in all modes of operation directly through the fuel valve positioning control 412G to limit the fuel demand reference for the purpose of avoiding surge operating conditions and turbine overspeed.

As shown in FIGS. G4-2 and G4-3, a digital fuel control 416G operates automatically and it includes the computer 58G and embodies certain elements in the megawatt load control system 400G, a system 410G for limiting blade path temperature, and a startup speed control system 418G. The megawatt load control system 400G and the startup speed control system 418G together form an automatic speed/load control system 417G (FIG. G4-3) which generates a fuel reference through an output block 419G as indicated by the reference character 420G. In backup control operation, a block 421G tracks the computer fuel reference output to the hybrid interface output, i.e., the output of a fuel control NHC card 112G. In the automatic load mode, an inlet guide vane control 427G operates through another NHC card 429G and improves the plant efficiency.

The load control system 400G preferably functions as a feedforward generator, and a megawatt trim control 422G preferably provides a megawatt feedback trim correction to the forward load control channel on the basis of actual megawatts generated by a sensor 423G. The startup speed control 418G preferably functions as a closed loop speed feedback control with the setpoint being varied in accordance with a speed/time characteristic and in accordance with hold and runback actions which may occur during the startup. Speed error is equal to the difference between the reference and a speed feedback from a monitor 425G and it is used as an input to a proportional plus integral controller which generates the fuel reference as a function of time.

With reference now to the startup speed control system 418G, gas turbine startup in the automatic mode is controlled from an ignition speed of approximately 900 rpm to synchronous speed. At ignition, the fuel reference is set at a fixed value and upon detection of a successful ignition the speed reference is increased to generate an increasing output reference for the fuel control. When the fuel reference from the speed loop equals the minimum fuel allowed for acceleration by a downstream low signal limiter, the speed loop becomes controlling. The fuel reference then increases normally in accordance with the stored speed/time characteristic. The speed control is arranged normally to make the gas turbine accelerate to synchronous speed in the same length of time from startup to startup. Reference is made to the above referenced patent application Ser. No. 399,790 for more description of the startup speed control.

At the end of the acceleration period, the gas turbine is in a run standby state at a speed of approximately 3,600 rpm and it is ready to be operated for generator synchronization. The synchronizing procedure can be carried out by the operator, or in the coordinated control mode the procedure is automatically initiated and implemented. The fuel reference which exists at the time that the gas turbine reaches the run standby state is stored for subsequent use since the run standby fuel requirement varies in dependence on ambient temperature and to some extent on other variable conditions.

Generally, once a demand is applied to a load control 424G in the megawatt load control system 400G, the fuel reference is ramped from its present value toward the demand value at a specified rate. The rate can be inserted by the operator or changed dynamically by limit controls. During the time period when the fuel reference is to be ramped toward the demand value, it can be put into a HOLD state where the fuel reference value remains fixed until a GO signal is generated at which time the ramping of the fuel reference toward the demand value is resumed.

The fuel reference can also be increased or decreased as requested by external sources including an automatic synchronizer and an automatic dispatch system. The fuel reference can be adjusted to some lower value by a runback request. The computer output fuel reference is tracked to the hybrid output fuel reference when the system is operating in a backup mode to provide for a bumpless transfer.

In the operation of the megawatt load control system 400G, the load reference is proportional to megawatts and becomes a feedforward demand for fuel valve position after conversion from megawatts to valve position and correction by the megawatt feedback trim from the load trim control 422G. Temperature and other override signals hold or run back the load reference to provide protective system responses to abnormal conditions, to reduce control signal transfers and to prevent integrator windup.

A summer 426G generates the computer output fuel reference 420G as the sum of a load fuel reference plus the stored run standby or idle speed fuel reference. During speed control, the fuel reference is that value which results from speed controller response to speed error.

The system is calibrated so that the load demand is satisfied by the sum of the load fuel reference and the idle fuel reference, and accordingly the actual generated load can be quickly and accurately controlled without control system delay even though ambient conditions may vary over a period of time. Some inaccuracy can creep into the feedforward load control if the plant has been operating continuously for a long period of time and the average ambient temperature has changed significantly over that time period. However, with frequent plant starts such as more than once a week, such inaccuracy is limited to cases of short term transient ambient temperature conditions. In any case, the load trim control corrects for megawatt errors including those induced by changed ambient temperature with some control system delay time.

If the breaker opens while operating in the load mode, the load reference is made equal to zero and the fuel reference applied by the computer 58G to the hybrid interface 404G is made equal to the stored idle fuel reference. Further, the output of the load trim 422G is made equal to zero so that it does not cause any disturbance to the speed control.

With the breaker closed, accurate megawatt control is provided by the functioning of the megawatt load control system 400G. Operator load demands or automatically generated load demands are quickly and accurately satisfied by the feedforward operation of the megawatt load control system 400G in adjusting the load level of operation of the gas turbine 12. The load trim 422G provides any minor corrections needed in the functioning of the megawatt load control system 400G.

As shown more particularly in FIG. G4-4, the digital fuel control 416G includes the startup speed control 418G, and a reference generator 430G functions in the control system 418G in the startup mode to generate a speed reference output which increases in accordance with a stored speed startup schedule. The reference generator output is applied to a difference or error block 432G by a switching block 439G since the breaker is open during the startup mode. A speed feedback is also applied to the error block 432G by the speed monitor 425G. A proportional plus integral transfer function is applied to the output of the error block 432G by a controller block 434G and, after band limiting and range gain application, the resultant output is applied to the summer 426G. When the turbine 12 reaches the run standby state, the speed controller 418G responds to the actual speed feedback 425G and a synchronization speed setpoint generated by the reference generator 430G under the control of the operator or an external synchronizer to set the turbine fuel flow until the breaker is closed. Upon breaker closure, block 436G stores the existing ranged fuel reference from the output of the speed controller 434G for continued application to the summer block 426G during the load mode of operation.

In the load mode, the reference generator 430G functions in the megawatt load control system 400G and it generates an increasing MW reference output at a set rate to move toward an input MW load demand or setpoint. The switch block 439G applies the output of the reference generator 430G to another switch block 444G which either bypasses or inserts a load trim into the load control. If the load trim is bypassed, the forward load reference is applied directly to the summer 426G through a percent multiplier. If the load trim is selected for inclusion, a load trim is summed with the forward load reference in another block 435G and the sum is then applied to the summer 426G. In the trim control, a MW error is generated in block 446G from an MW feedback and the MW load reference and acted on by a proportional plus integral controller 448G to produce the load trim. In the summer block 426G, the load reference is added with the run standby or idle fuel reference for output from the computer 58G as a feedforward fuel reference.

Block 437G checks the external surge limit signal and the external overspeed limit signal. If either is lower than the load reference, a runback is implemented through the reference generator 430G to make the load reference equal to the actual downstream fuel reference for bumpless resumption of load control when the limit action ends.

The digital temperature limit control 410G generates either a hold output or a cutback output which is applied to the reference generator 430G to hold or cut back the megawatt load reference output from the reference generator 430G for turbine protection purposes during the load mode.

c. Digital Blade Path Temperature Limit Control System

As shown in FIG. G4-5, a gas turbine blade path temperature limit control subsystem 500G is included in the plant control system 50 to limit blade path and exhaust path gas temperature reliably and efficiently during the automatic mode of gas turbine operation.

In the operator analog or manual mode, the operator controls the turbine loading operation by generating a fuel reference from the hybrid interface 504G, and a startup control 508G generates a fuel reference from the hybrid interface during startup. An analog control 510G, including overspeed and surge limit controls, functions during the coordinated and operator automatic modes of operation as well as the operator analog or manual modes of operation. An analog temperature limit control 512G functions only during the manual or operator analog mode.

The hybrid interface 504G generates a fuel reference for application to a fuel valve control circuit in block 514G. The hybrid output fuel reference value is that value resulting from computer control or that value resulting from operator control from the operator panel, subject to limit action. Transfer between automatic and manual fuel references is made bumpless by the functioning of the hybrid interface 504G in conjunction with the automatic and backup controls.

The digital blade path temperature limit system 500G functions during startup and loading operations in the automatic mode. During gas turbine startup, a blade path temperature reference is generated as a function of the combustor shell pressure, and a representation of actual blade path temperature is compared to the blade path temperature reference. A digital speed control 516G operates to generate a fuel reference through a summer block 520G. Normally, as a result of the system design, the actual outlet gas temperature varies during startup as schematically illustrated as a function of time in FIG. G5-2 and does not reach limit conditions defined by a blade path temperature reference block 522G in which there is stored a blade path reference characteristic like that shown in FIG. G5-3. Therefore, no temperature limit control action is normally initiated by blade path temperature control block 524G during the startup period which as shown in FIG. G5-4 is approximately 25 percent of the total plant startup time, or in this instance about 15 minutes.

When the generator 13 is synchronized by an external synchronizer or by operator control through block 526G, the breaker status changes from open to closed, and for base load operation the blade path temperature reference block 522G generates a blade path temperature reference in accordance with a temperature-combustor shell pressure characteristic indicated by dotted line 528G in FIG. G5-6. As shown in FIG. G5-5, a blade path temperature limit characteristic 530G for peak operation is scaled at higher values than the base load characteristic 532G. A blade path temperature limit characteristic 534G for a system reserve operation also can be employed, and it is scaled higher than the peak load characteristic. Thus, as the generator 13 is loaded the applicable blade path temperature limit characteristic is that which corresponds to the selected load mode. For description purposes, it will be assumed hereinafter that the base load operation is the selected mode.

To load the turbine 12, a demand is placed on the reference generator 518G and it ramps the reference toward the demand value with correction provided by a load trim 519G. The output load fuel reference from the summer 520G is the sum of a stored idle speed fuel reference from the speed block 516G and the corrected or uncorrected reference from the generator block 518G.

As the turbine 12 is loaded, the blade path temperature control 524G places a hold or a cutback action on the fuel reference through the reference generator 518G if the blade path temperature exceeds the applicable blade path temperature limit value derived from the applicable characteristic at the measured combustor shell pressure. Once the turbine is loaded to the point where the actual exhaust temperature reaches a predetermined value below a limit value indicated on an exhaust temperature limit characteristic 536G (FIG. G5-6) the blade path temperature reference is increased, preferably incrementally, until the actual exhaust temperature reaches the limit exhaust temperature value determined from the characteristic 536G.

In the present case, the initial blade temperature reference characteristic 528G provides a temperature limit 25° F. below the exhaust temperature limit associated with the exhaust temperature limit characteristic 536G. Preferably, the exhaust temperature limit function permits the blade path temperature reference to increment upwardly when the actual exhaust temperature is 75° F. below the exhaust temperature limit based on the exhaust temperature limit characteristic 536G. When the exhaust temperature has reached its limit value on the characteristic 536G, the blade path temperature is at some higher value.

An upper blade path temperature absolute limit value is preferably employed. Thus, in this case a blade path temperature limit reference is defined by a blade path temperature limit characteristic 537G which is displaced 30° F. above the exhaust temperature limit characteristic 536G. In operation, the final blade path temperature limit reference produced by incrementation of the reference upwardly under exhaust temperature loop control will typically be between 5° F. and 15° F. above the exhaust temperature limit characteristic 536G. The final blade path temperature limit is a particular value for each installed turbine, and once that value is determined for an installed gas turbine, it is preferable that the blade path absolute temperature limit characteristic be adjusted downwardly from 30° F. above the exhaust temperature limit characteristic 536G to the empirically detected value, say to 10° F. above the exhaust temperature limit characteristic 536G. In this manner, a faster corrective response can be achieved by blade path temperature limit control if a blade path temperature increase occurs beyond the limit value defined by the resultant blade path temperature limit characteristic corresponding to exhaust temperature operation on the characteristic 536G.

In a typical power plant turbine, the system response time to a change in fuel demand is as follows:

| Value | Combustor | Transport | Blade Path Thermocouple | Exhaust Path Thermocouple |
| --- | --- | --- | --- | --- |
| 2 seconds | 90 milliseconds | Less than 1 second | 3 seconds | 20 seconds |

Accordingly, with the described system, fast blade path temperature limit control is achieved with a moderating effect being placed on the blade path temperature control by an exhaust path control as the blade path temperature limit is approached.

Generally, all temperature and pressure signals applied to the digital computer 58G are first checked against limits for reasonability. Two averages of four blade path temperature thermocouples are compared and if they are within 50° F. they are averaged and high selected with an average of eight blade path temperatures to produce the blade path temperature control signal. If the two averages are different by more than 50° F., the condition is alarmed and the average of eight becomes the control signal. Proportional plus derivative control action is applied to the feedback blade path temperature representation prior to comparison to the blade path temperature reference. As already indicated, a hold or a cutback in the fuel reference is generated if the actual blade path temperature is greater than the reference blade path temperature to prevent excessive blade path temperature and thereby to prevent excessive turbine inlet temperature. Preferably, when the exhaust temperature is within 75° F. of the exhaust temperature reference, the blade path temperature reference is permitted to increase at a rate equal to a preset constant multiplied by the difference between the exhaust temperature reference and the exhaust temperature. The preset constant is preferably selected to match the response of the exhaust thermocouples. The blade path temperature reference is preferably increased at this rate for an adjustable time period such as 10 seconds, and then the rate is reset to zero until the next exhaust temperature input is received, i.e., at a 30 second sampling period.

The blade path temperature cutback or override reduces the load reference, changes the rate of change to correspond with the runback requirements, and places the system in hold with respect to the load demand as long as the load demand is greater than the load reference. This allows the gas turbine to operate at any load up to the base or peak temperature limit or at the selected base or peak temperature limit if the load demand requires higher fueling than that permitted by existing temperature limits. The load increases or decreases as ambient conditions change the temperature limit if the load demand is greater than that permitted by the selected temperature limit. Controller windup and deadtime are eliminated by applying the blade path temperature override in the manner described herein.

As a result of system operations, smoother loading is achieved as shown by solid lines in FIG. G5-7. The dotted overshoot schematically illustrates how the temperature and loading behavior can be without the system damping provided by the functioning of the described system. As temperature limits are approached, the gas turbine picks up decreasing increments of load until either the exhaust temperature reaches the exhaust temperature limit or reference characteristic or the blade path temperature reaches its maximum limit of 30° F. above the exhaust temperature reference characteristic. Blade path and turbine inlet temperature overshoots are thus reduced or avoided through this smoothing process. Nonetheless, relatively fast blade path temperature response is provided. Accuracy of temperature limit control operation results from the fact that the exhaust temperature measurements used in blade path temperature reference modification are made by thermocouples which are located sufficiently far from the turbine blade path to avoid the effect of temperature stratification.

Portions of the blade path temperature limit control system 500G are shown in somewhat greater functional detail in FIG. G4-6 and with certain additional program details in FIG. G4-7. The signals from 16 exhaust thermocouples are scanned and averaged in block 540G every 30 seconds in this instance. As indicated by the reference characters 542G and 544G, respective average blade path temperature signals are generated from two groups of four blade path thermocouples. If the two average signals 542G and 544G differ by more than 50° F., block 546G generates an alarm.

Block 548G generates an average of the two average signals 542G and 544G. A switch block 550G enables further downstream use of the output of the block 548G if the block 546G indicates that the spread between the signals 542G and 544G is less than 50° F. Another blade path temperature average signal 552G is generated as an average of eight additional blade path thermocouple signals and a high selector block 554G generates an output corresponding to the highest of the signal 552G and of the output from the switch block 550G.

During startup, a block 556G generates a blade path temperature reference from a characteristic stored in block 558G as a function of measured combustor shell pressure. Exhaust temperature is not employed during startup because of its very slow response characteristic.

During load operation, a block 560G generates the difference between the temperature limit or temperature reference derived from the applicable temperature limit or reference characteristic and the average exhaust temperature signal generated by the block 540G. If the difference is greater than 75°, a high monitor block 562G operates a switch block 563G to apply a zero input to a downstream exhaust temperature limit controller 564G. A summer block 566G accordingly causes the block 556G to generate a blade path temperature limit based on a temperature equal to 25° below that associated with the characteristic stored in the temperature reference block 558G.

Once the exhaust temperature difference reaches less than 75° F., the monitor block 562G operates the switch block 563G to transmit the output from the exhaust temperature difference block 560G to the input of the exhaust temperature limit controller 564G which includes a proportional element and an integrator element. If a negative value exists, i.e., if the actual exhaust temperature exceeds the exhaust temperature limit, a low monitor block 568G operates a switch block 570G to apply a negative gain to the controller thereby causing a cutback in the blade path temperature reference generated by the block 556G.

When the controller 564G begins to function, the blade temperature reference generator 556G increases the blade path temperature reference at a predetermined rate for a predetermined time period, i.e., at a rate equal to a preset constant multiplied by the difference between the exhaust temperature reference and the exhaust temperature for 10 seconds. The preset constant is selected to match the blade path temperature reference ramp to the response of the exhaust thermocouples. The duration of the incrementation ramp period is preferably made adjustable. As the difference decreases, the incremental rate actions are repeated with a slower rate of blade path temperature increase each time until the actual exhaust temperature equals the temperature reference generated by the block 558G.

A low selector block 572G prevents the blade path temperature reference generated by the block 556G from exceeding 30° F. above the temperature reference determined from the block 558G. Increased responsiveness of the control system is achieved by adjusting the 30° F. absolute limit to a lower value empirically determined as a value just above a temperature value equal to the exhaust temperature limit value plus the actual temperature drop between the blade path and the exhaust path at the temperature limit of operation.

A hold monitor 574G compares the generated blade path temperature reference to the feedback blade path temperature output from a proportional plus derivative block 576G and it generates a hold on the reference generator once the feedback value reaches the blade path temperature limit. If the blade path temperature output from another proportional plus derivative block 580G reaches the temperature limit, a monitor block 578G causes the reference generator to run back the fuel demand. The derivative value in the runback channel is higher than the derivative value in the hold channel so that runback action is produced if the blade path temperature is approaching the limit value too fast relative to its spread from the limit value.

As shown in FIG. G4-8, the hold and runback outputs from the digital temperature control are applied to a reference generator 430G in a turbine speed or load control loop to hold or cutback the turbine speed or load. The blade path feedback hold and cutback channels are respectively denoted by reference characters 543G and 545G in FIG. G4-7. The startup blade path temperature reference is generated through channel 547G, and the loading blade path temperature reference is generated through channel 549G with exhaust temperature modification applied through channel 551G. Switch block 553G applies a peak bias to the temperature reference in summer block 555G if peak operation has been selected.

The reference generator 430G functions in a digital fuel control 416G in the startup mode to generate a speed reference output which increases in accordance with a stored startup speed schedule. The reference generator output is applied to a difference or error block 432G in a speed control loop by a switching block 434G since the breaker is open during the startup mode. A speed feedback is also applied to the error block 432G by the speed monitor 425G. A proportional plus integral transfer function is applied to the output of the error block 432G by a controller block 441G and, after band limiting and range gain application, the resultant output is applied to the summer 426G. When the turbine 12 reaches the run standby state, the speed control responds to the actual speed feedback 425G and a synchronization speed setpoint generated by the reference generator 430G under the control of an external synchronizer to set the turbine fuel flow until the breaker is closed. Upon breaker closure, block 436G stores the existing fuel reference from the output of the speed controller 441G for continued application to the summer block 426G during the load mode of operation. During the startup period, hold or runback action on the reference results in a fuel hold or runback through speed loop operation.

In the load mode, the reference generator 430G functions in a megawatt load control system 400G and it generates an increasing MW reference output at a set rate to move toward an input MW load demand or setpoint. The output of the reference generator 430G is applied to a switch block 444G which either bypasses or inserts a load trim into the load control. If the load trim is bypassed, the forward load reference is applied directly to the summer 426G through a percent multiplier. If the load trim is selected for inclusion, a load trim is summed with the forward load reference in another block 435G and the sum is then applied to the summer 426G. In the trim control, a MW error is generated in block 446G from an MW feedback and the MW load reference and acted on by a proportional plus integral controller 448G to produce the load trim. In the summer block 426G, the load reference is added with the run standby or idle fuel reference for output from the computer 58G as a feedforward fuel reference. During the load mode, hold or runback action on the reference generator results in a fuel hold or runback through load loop operation.

Block 437G checks the external surge limit signal and the external overspeed limit signal. If either is lower than the load reference, a runback is implemented through the reference generator 430G to make the load reference equal to the actual downstream fuel reference for bumpless resumption of load control when the limit action ends.

d. Gas Turbine Speed Control System With Fixed Acceleration Time

As shown in FIG. G4-2, the startup speed control system 418G is included in the plant control system 50 normally to provide for gas turbine acceleration from flame on to idle speed in a fixed time in this case 720 seconds. If a hold or runback occurs during automatic acceleration, a time counter is stopped and then restarted after the hold or runback is terminated and the total acceleration time is then extended from the fixed value. In the alternative, the time counter can continue to run and on termination of the hold or runback, the rate of change of the speed reference is increased from the scheduled rate value in a speed versus time curve generator subject to blade path temperature and surge limits. In the latter case, the total acceleration time can be equal to the fixed acceleration time, or it will be greater than that value depending on the length of the hold or the runback action. With fixed time acceleration, startup time variations, otherwise caused by differing ambient temperatures in temperature startup control, are avoided.

As shown in FIG. G5-1A, the stored speed versus time curve employed in generating a speed reference for the speed control loop during wide range speed control comprises three straight line parts 900G, 902G and 904G. Time is zero at the point in time at which the flame goes on (at approximately 900 rpm) during the ignition part of the startup sequence. Time is counted upward to 720 seconds from that point onward, and for each time point a scheduled speed reference is defined by the curve.

The speed schedule is basically made up of the fast rise part 900G to 2,000 rpm at 250 seconds, and the slower rise part 902G to 3,400 rpm at 560 seconds, and the still slower rise part 904G to 3,600 rpm at 720 seconds because of the relationship between the time specified for acceleration, the power of the starting device, i.e., an electric induction motor in this case, and the temperature and surge limits on startup operation.

As shown in FIG. G5-1B, various events occur in the detailed embodiment prior to and during the turbine acceleration to synchronous speed. Once the START button is pressed and the master relay contact 4X is closed, the sequencer starts the starting device and it drives the turbine to about 900 rpm in about 90 seconds. At this point, the fuel is turned on, ignition occurs, and the flame goes on as a transition is made to digital speed control. Many operator button selections can be made prior to or during rolling, but preselection is usually more desirable since the operator has more time for selection prior to rolling. FIG. G5-1B further shows the behavior of blade path temperature, speed, load and inlet guide vane position as a function of time.

Since the turbine approaches ignition and flame on with some deceleration, the digital speed control first causes the actual turbine speed to accelerate slightly and smoothly at an increasing rate to bring the turbine on the slope of the curve part 900G (FIG. G5-1A). Some slight overshoot may then occur but the proportional plus integral controller quickly makes the actual turbine speed follow the slope of the curve part 900G. Thus, a speed error is determined from an actual speed value and the speed reference and integral plus proportional action is applied to the error. Generally, the controller algorithm has a gain G and a reset time T which are tuned to provide good speed curve follow action as well as good response during synchronization. A ranging constant K1988, shown in the detailed speed/load chain flow chart, provides tuning for interfacing the computer output with the NHC card. A minimum ignition fuel value is added to the controller output as a bias since that fuel value exists at the flame on time point.

As a transition occurs between the curve part 900G and the curve part 902G at 250 seconds, some slight turbine speed overshoot again occurs but the speed control quickly and smoothly brings the turbine on the curve part 902G. At about 2,300 rpm, the starting device is turned off and the loss of its torque results in a drop in turbine speed, but again the speed control quickly returns the turbine to the curve part 902G.

At 560 seconds and 3,400 rpm, the transition to the curve part 904G again causes some deviation from the stored speed curve but the digital speed control brings the turbine on the curve part 904G quickly and smoothly. At 3,450 rpm, the turbine bleed valves are closed to cause significantly more air to flow through the turbine. A quick speed rise of 50 to 60 rpm typically occurs, but the speed control quickly backs off the fuel valve to bring the turbine speed smoothly back to the curve part 904G. It is preferred that the curve part 904G be provided with a relatively low slope so that the bleed valve disturbance is stably resolved to regain smooth accurate speed control prior to synchronization. If the scheduled speed change rate were high in this range of operation, the speed controller could cause the turbine to approach the 3,600 rpm speed value too rapidly such that overshoot would occur thereby undesirably preventing a transfer to synchronization control until speed controller action would drop the turbine to idle speed.

In summary, the closed loop speed control normally provides fixed time startup with accurate and smooth following of the scheduled turbine speed by the actual turbine speed. Power generation capacity is accordingly made highly available in the combined cycle plant.

e. Backup Control System With Feedforward Speed/Load Control

As shown in FIG. G4-9, a backup control indicated by box 360G is preferably included with a programmed digital computer automatic control 362G in the plant control system 50 to provide for turbine and plant operation in the event the operator selects the manual or operator analog mode of operation or in the event the computer 58G rejects to backup control. Transfer to backup control can be transacted any time after ignition during startup or load operation.

The manual/automatic status of the plant control system 50 is fixed by operator selection at an operator panel 364G or by a computer rejection to manual. A digital/analog hybrid interface 366G includes manual/automatic logic circuitry to detect when the gas turbine 12 is to be on backup control and to make switching operations which implement the applicable control mode.

In automatic control, the digital computer 58G generates a fuel reference when operating in the coordinated and the operator automatic control levels during speed and load control to function as an automatic speed/load controller, and it initiates turbine startup by a sequencing system 368G under coordinated control. Generally, the sequencer 368G sequences the gas turbine 12 through the startup process by starting and stopping auxiliary equipment when sequencing permissives are generated, and it trips the turbine if certain conditions develop. Further, the sequencer 368G generates logicals for the turbine controls, i.e., a master relay on signal, a fuel on signal, a breaker status signal, a fuel select and transfer signal, and a flame on signal.

The digital/analog hybrid interface 366G generates an output fuel demand signal as a valve position reference for a valve position control 370G comprising electropneumatic circuitry which operates a throttle valve included in the fuel supply system for the gas turbine 12. In automatic control, the computer generated fuel demand is based on an automatic startup fuel scheduling program subject to limit action by a computer blade path temperature limit control during startup and further it is based on a computer load control subject to the computer blade path temperature limit control during load operation. A high/low limiter 372G prevents the fuel demand signal from rising to levels which would cause excessive fuel flow and from falling to levels which could cause outfire.

A surge limit control 374G and an overspeed limit control 376G function in all modes of operation directly through the fuel valve positioning control 370G to limit the fuel demand reference for the purpose of avoiding surge operating conditions and turbine overspeed.

A low select function 378G transmits the lowest of the surge and overspeed protection limit signals as a limit on the fuel demand from the hybrid 366G. Thus, another low select function 380G imposes a limit on the hybrid fuel demand by transmitting the lowest of the low limit signal from the low select function 378G and the hybrid fuel demand to the throttle valve position control 54. Through low selector operation, surge and overspeed limit control action is imposed bumplessly on the fuel control channel.

In the operator analog mode, a speed/load control 382G functions in response to pushbutton increase or decrease signals from the operator panel 364G to generate the fuel demand signal at the output of the hybrid interface 366G. The speed/load control 382G thus functions in the backup mode as a feedforward fuel reference generator without integrator or other controller action like that often employed in feedback type speed/load controls for power plant gas turbines. The feedforward fuel demand from the backup speed/load control 382G is applied substantially directly to the valve position control 370G to provide direct turbine responses proportional to fuel demand changes made by the operator. Accordingly, the plant operator is provided with a good feel for the plant operation. Further, protection system actions are imposed at points in the control circuitry between the operator and the turbine to prevent unsafe operator actions. Preferably, the limit controls are adjusted to produce the limit actions needed for safe turbine operation while permitting the speed/load control 382G to be the controlling element under normal operating conditions in the manual or operator analog mode.

A blade path temperature limit control 384G functions only in the manual or operator analog mode to limit bumplessly the output signal from the speed/load control 382G as required to prevent excessive blade path temperature and in turn excessive turbine inlet gas temperature. If the turbine is to be started in the manual or operator analog mode or if the automatic control rejects to manual during the startup mode, the gas turbine startup is smoothly completed by the operation of a startup control 386G which generates a feedforward speed reference function.

Figure 8A:
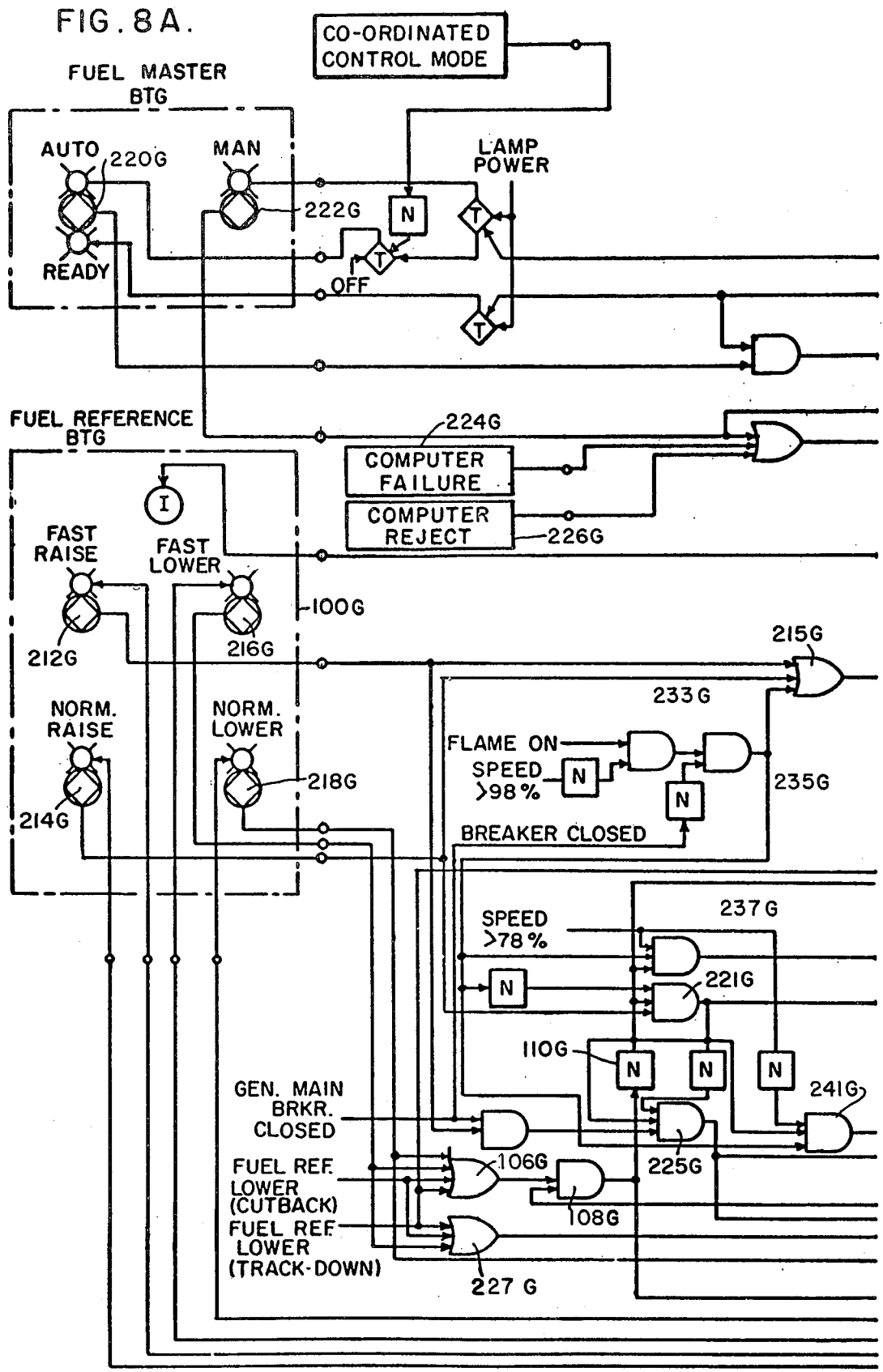
FIGS. 8A through 8N show more detailed functional diagrams of the gas turbine analog backup control; and FIGS. G4-1A, Gr-1B, G4-2 through G4-4, G4-5A, G4-5B, G4-6 through G4-14, G5-1A, G5-1B and G5-2 through G5-17 show various functional block diagrams and curves for the gas turbine control system.
Figure 8B:
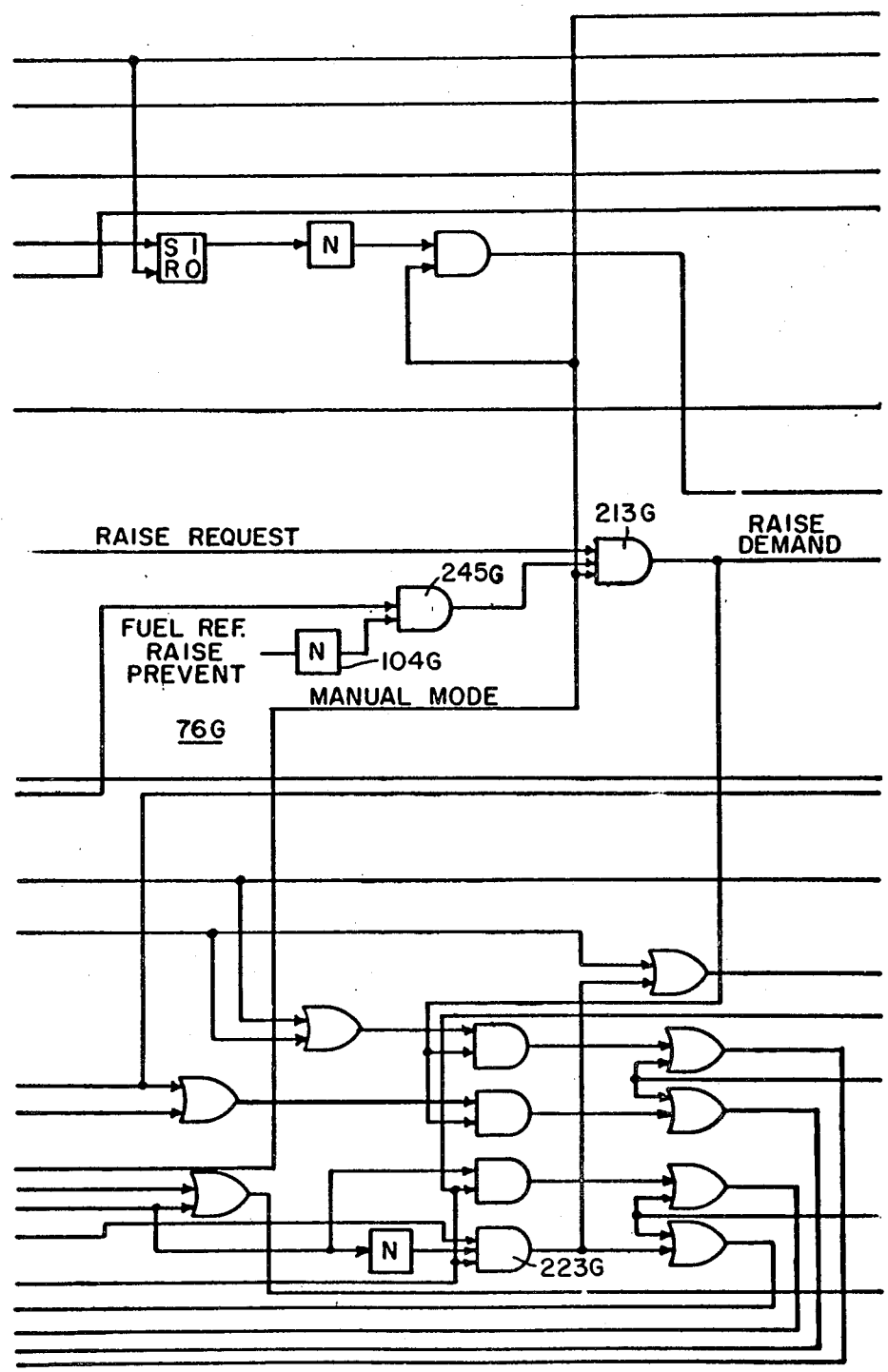
Figure 8C:
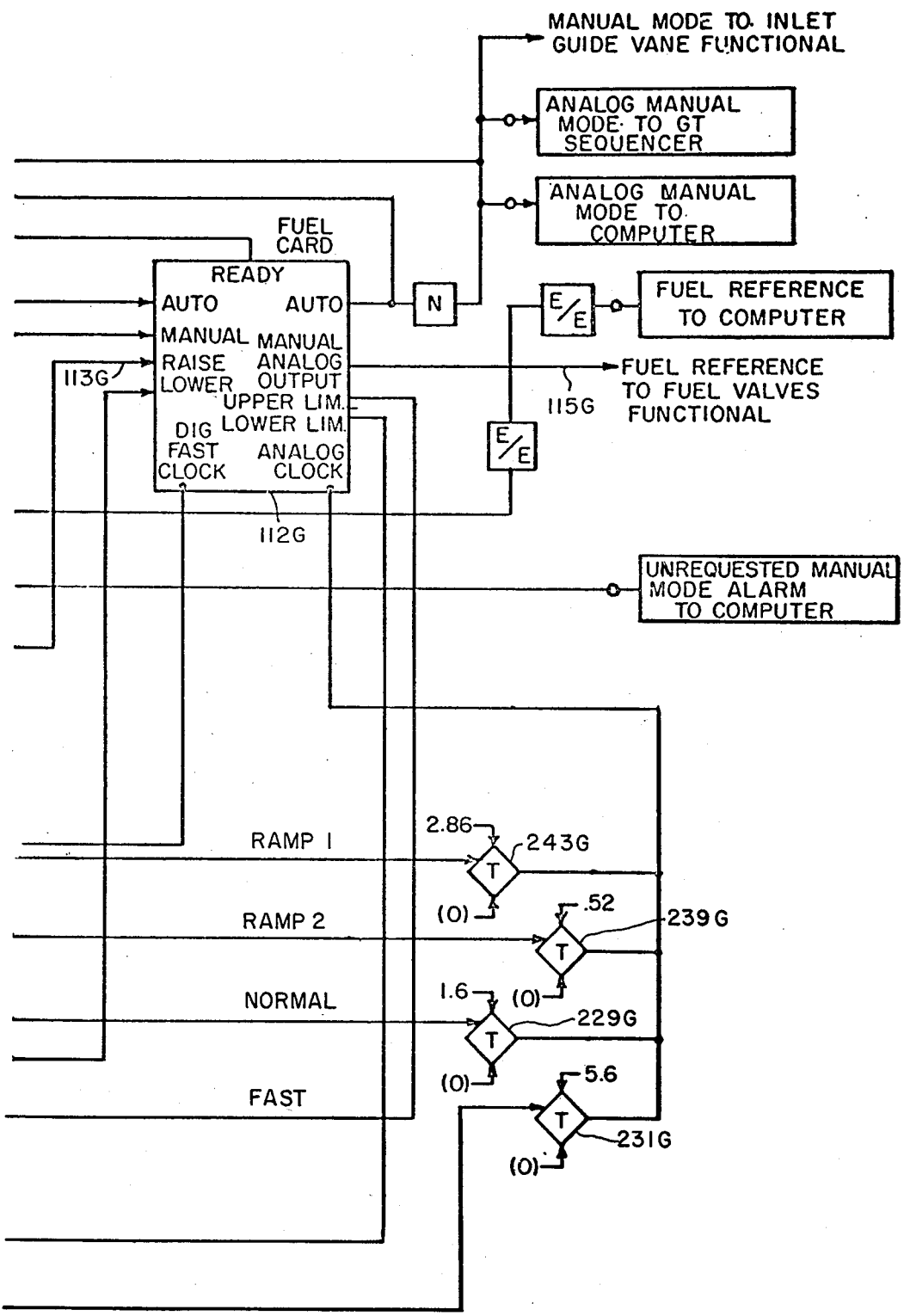

As shown in more functional detail in FIGS. 8A through 8C, a fuel reference is generated by the NHC hybrid interface card 112G (FIG. 8C) as indicated by the reference character 115G. Fast and normal raise and lower pushbuttons 212G, 214G, 216G and 218G in box 100G on the operator panel (FIG. 8A) function through RAISE AND and OR blocks 213G and 215G and LOWER AND and OR blocks 108G and 106G to apply inputs to the NHC card 112G which enable the feedforward fuel reference to be raised or lowered in the operator analog or manual mode. The normal raise and lower pushbutton signals are also applied to AND blocks 221G and 223G to set a normal ramp through the application of an analog signal to the NHC clock for as long as the pushbutton is depressed. Similarly, fast raise and lower signals generate a fast ramp through AND block 225G and OR block 227G. Switches 229G and 231G are operated to generate the normal and fast ramp control signals. In the automatic mode, the computer 58G applies signals to the NHC card 112G to generate the output fuel reference from the NHC card 112G.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

In the operator analog or manual mode, the output of the NHC card 112G is a fuel demand or reference signal which increases or decreases at the applicable fast or normal rate according to the panel pushbutton operations. The fuel demand signal is a feedforward signal which causes the valve position control 370G to operate the throttle valve and move the gas turbine 12 to the operating level desired by the operator subject only to automatic analog protection control limits. In analog startup, a speed reference ramp function is generated by the startup control 386G subject to pushbutton cutback by the plant operator through the speed/load control 382G.

If the turbine is placed in the startup mode and the backup control is operating, the starting device drives the turbine to ignition speed and, when ignition occurs and the flame is on as indicated by a logical input to AND block 233G, a ramp request is generated by AND block 235G since its breaker status input signal indicates an open breaker and since the turbine speed is less than 98% rated speed at which switchover to synchronization control occurs. The raise request signal is transmitted to the NHC card 112G through the OR raise request block 215G.

The ramp request is also applied to the input of an AND block 237G which sets the clock on the NHC card 112G for generation of the second lower sloped ramp through a switch 239G if the turbine speed is greater than 78% rated. Similarly, an AND block 241G sets the clock on the NHC card 112G for generation of the first higher sloped ramp through a switch 243G if the turbine speed is less than 78% rated.

A signal representing speed being greater than 78% is generated by a monitor block which compares a 78% speed setpoint with a high selected turbine speed feedback signal. The first ramp causes the gas turbine to accelerate automatically in the backup control mode from ignition speed to 78% speed normally free of overtemperature limit control. At the 78% speed point, the second ramp causes the turbine to accelerate to 98% rated speed at a lower acceleration rate normally free of overtemperature limit control. Thereafter, the turbine is in an idle where it can be placed under synchronizer control for generator synchronization.

Figure 8D:
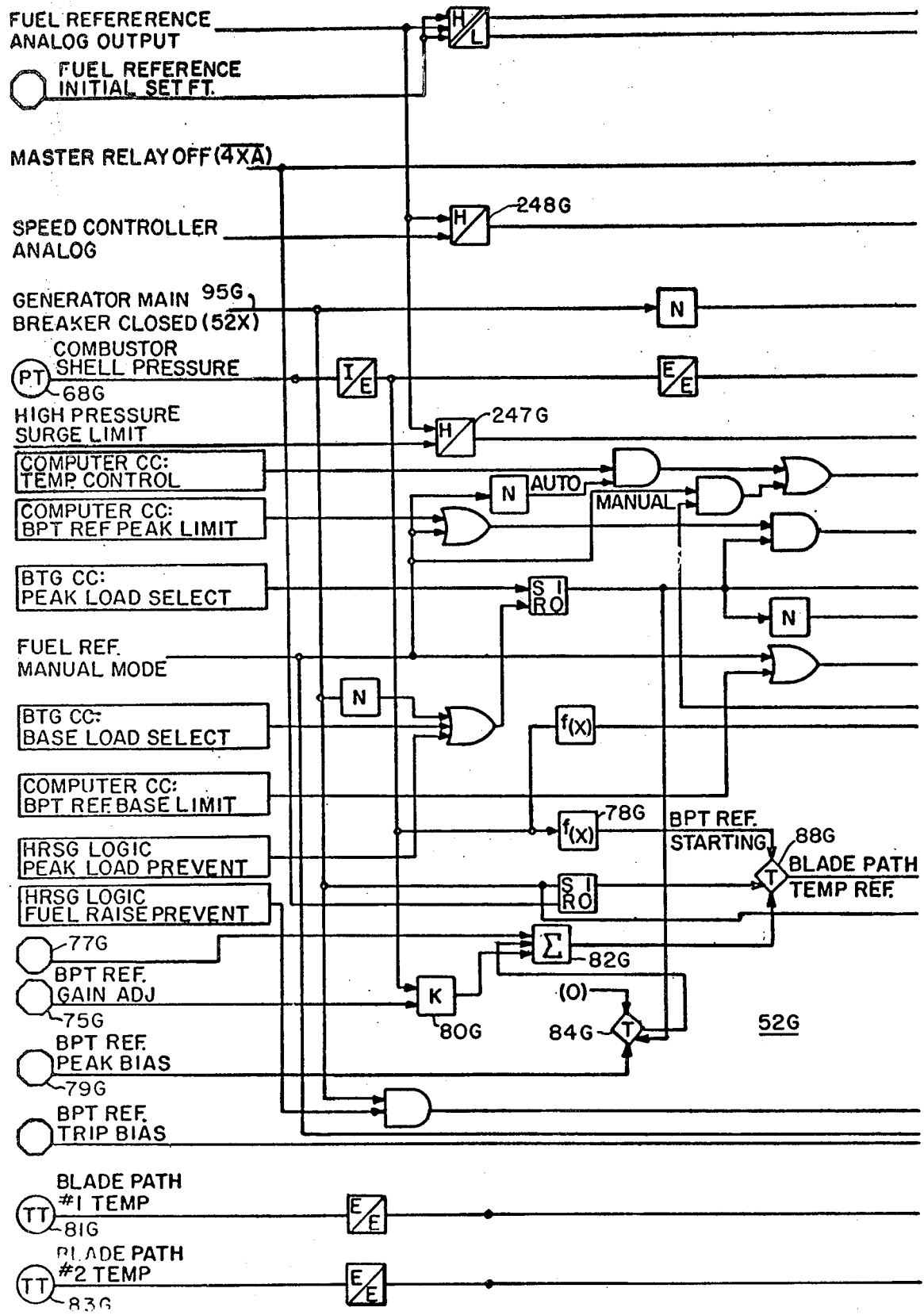
Figure 8F:
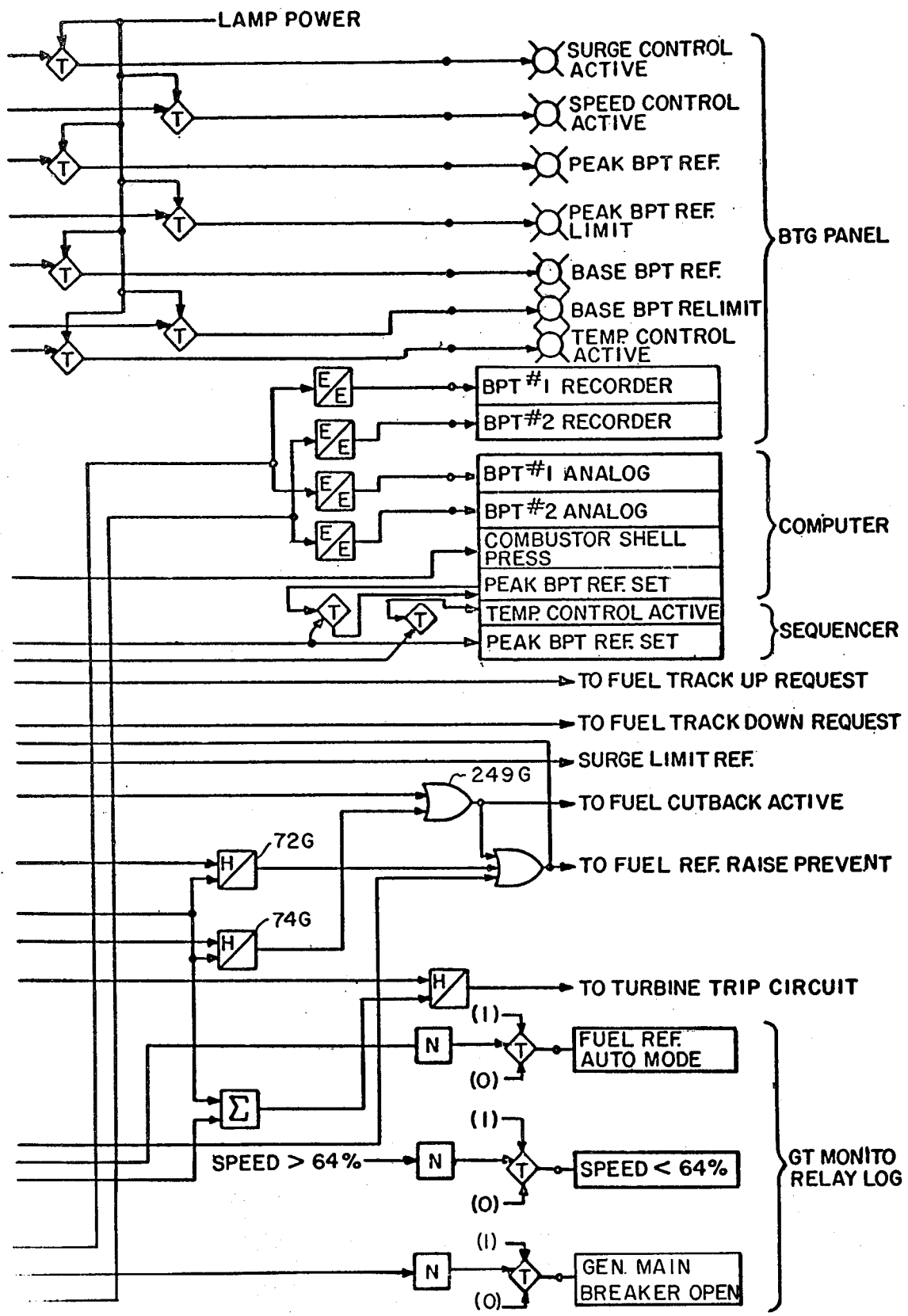
Figure 8G:
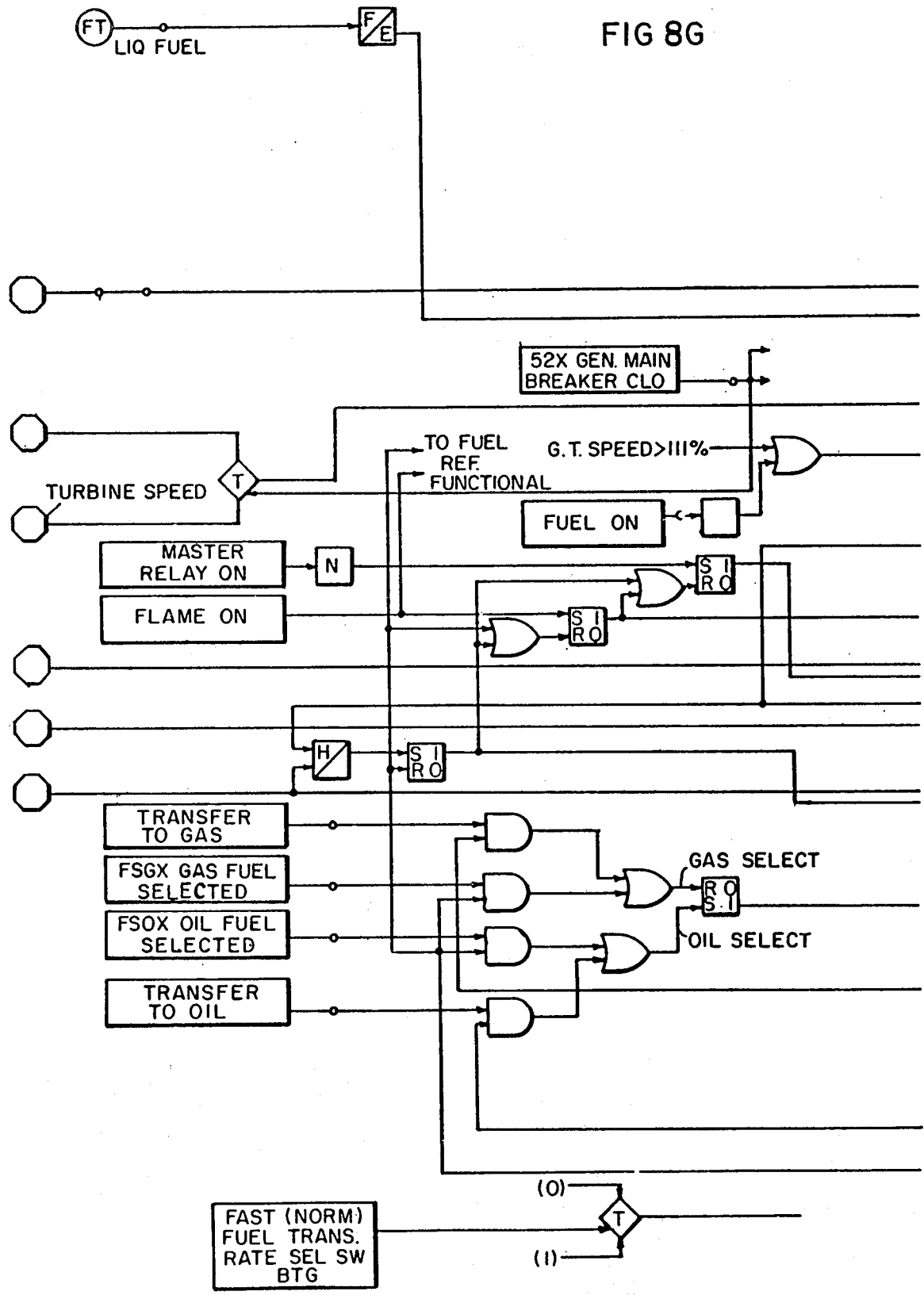
Figure 8H:
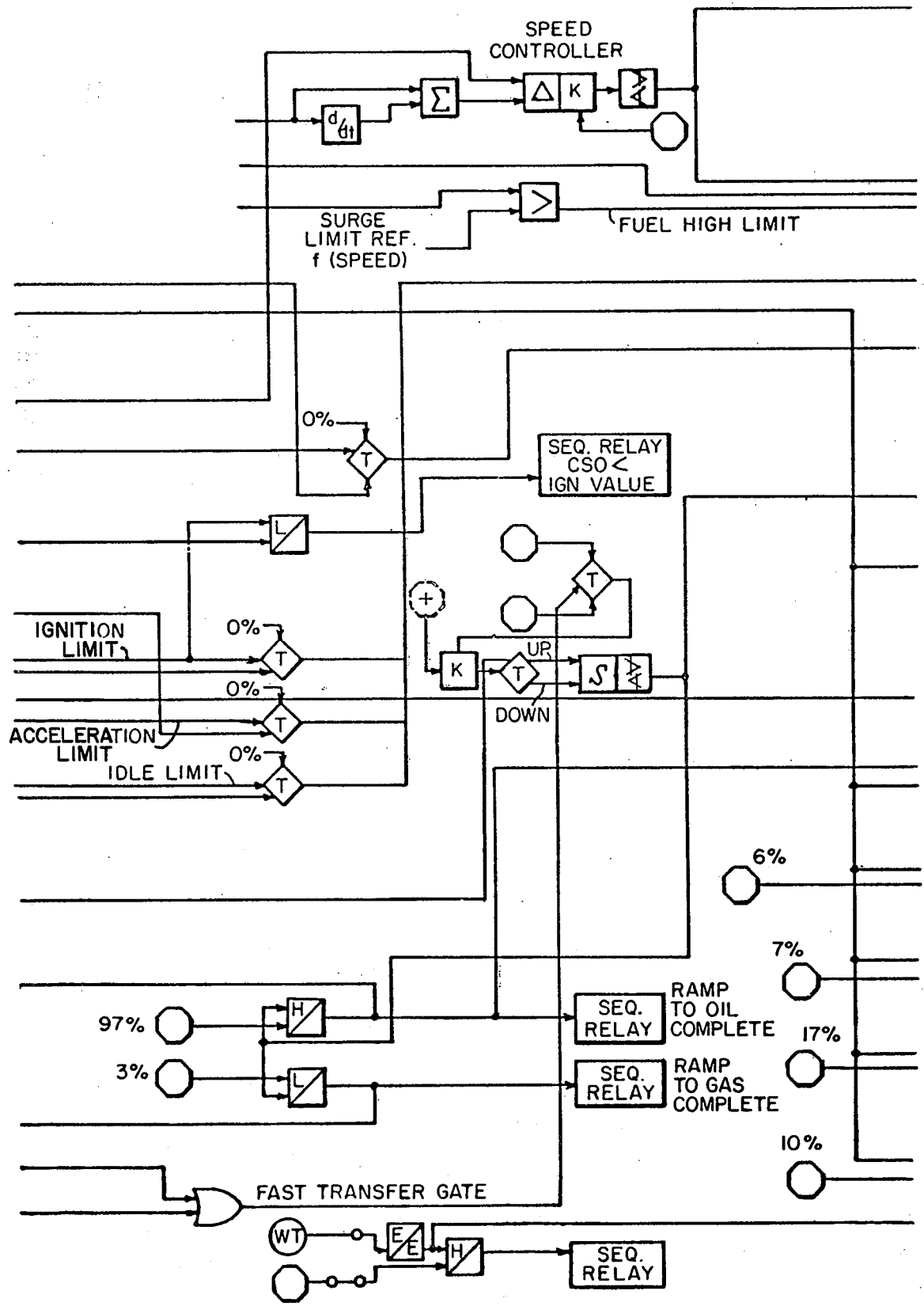
Figure 8I:
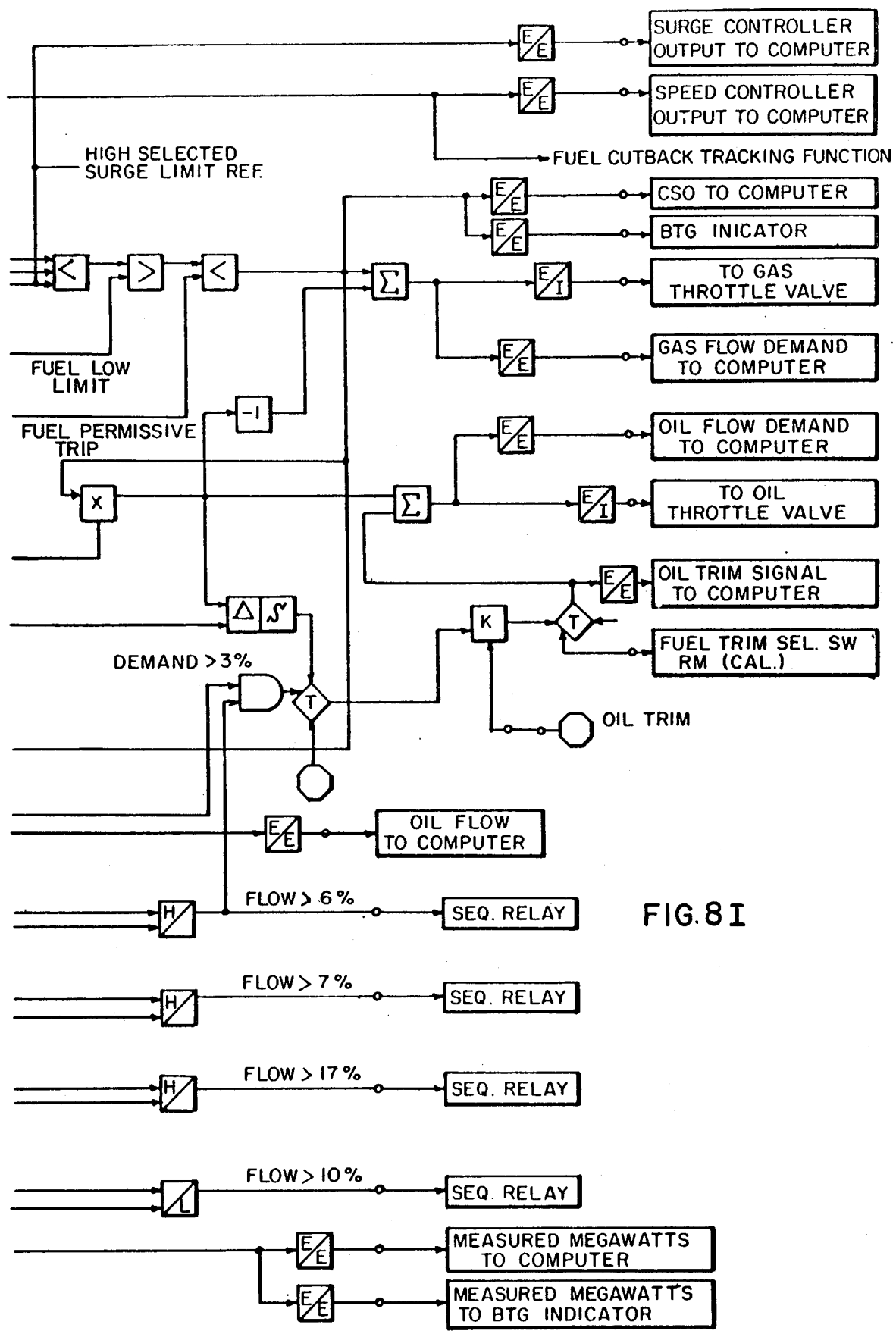

As shown in more detail in FIGS. 8G through 8I, the control system includes an oil/gas fuel transfer system which applies the low selected and high and low limited fuel demand signal to a gas throttle valve position control or an oil throttle valve position control respectively through a summer block 386G or a summer block 388G. The fuel transfer system provides for bumpless changes between oil and gas fuel supply during turbine operation as more fully described in W.E. 44,522. The gas throttle valve fuel demand output and the oil throttle valve fuel demand output are respectively applied to conventional electropneumatic positioning controls for the gas and oil throttle valves.

Limit action on the forward speed/load control channel is provided by blade path temperature, overspeed and surge protection systems. As shown in FIGS. 8G through 8I, an electrical overspeed protection system 10G includes a proportional controller 226G which compares a turbine speed setpoint of 102% or 106% as indicated by the reference character 228G with a signal representing the sum of the actual speed and, for purposes of quick corrective response to speed errors, the derivative of the actual speed as indicated by the reference character 230G. The proportionality constant of the controller can be varied to vary the regulation from 2% to 8% as indicated in the drawing. The output of the speed controller 226G is checked for high and low limits and applied to a low selector 232G along with the fuel reference from the NHC card 112G as indicated by the reference character 234G and an output from the surge limiter indicated by the reference character 236G. The smallest of the three input signals is selected by the low selector 232G and generated at its output. A high selector 238G prevents the fuel reference from falling below a value required for avoiding outfire, and a low selector 240g prevents the fuel reference from exceeding a predetermined high limit value. The output fuel reference signal is then applied to the fuel transfer control as a position reference for the gas and oil throttle valve controls.

As illustrated in FIG. G5-8, the speed reference is 106% rated speed when the breaker is closed to enable the speed error to be sufficient to allow 100% loading in the load mode. The speed reference is 102% when the breaker is open to allow closer overspeed protection during startup and during idling operation. Upon the opening of the breaker, a switch block 242G switches the speed reference from 106% to 102% to obtain an immediate fuel cutback directly through the speed controller 226G and thereby to reduce the speed bump on a load dump.

In order to track the actual fuel reference signal when the overspeed or surge protection loop becomes active, the NHC fuel reference output is compared with the speed controller output in a high signal monitor 248G (FIG. 8D) and with the high selected surge limit reference in a high monitor 650G (FIG. 8D). If the fuel reference is higher than the speed limit signal, a fuel reference track down signal is generated by an AND block 252G through an OR block 253G and applied to an OR block 227G (FIG. 8A) to set a fast analog fuel lower rate through the NHC clock and to cause a cutback in the NHC fuel reference through the lower OR block 106G. If the fuel reference is higher than the surge limit signal a fuel reference cutback signal is generated through OR block 106G. The fuel reference lower track down signal also operates as a digital or logical trigger for fast clock operation in the NHC card 112G to shorten the time needed to reset the fuel reference.

A track down or cutback signal from the lower OR block 106G causes a cutback or lower demand to be generated by the AND block 108G if the system is in the manual mode. If the system is in the automatic mode, similar tracking occurs through the computer 58G to cause the NHC fuel reference output to track the speed limited fuel reference.

The NOT block 110G processes the track down output of the AND block 108G to generate the lower signal in the NHC card 112G as indicated by the reference character 113G. The output of the AND block 108G is also coupled to display logic to indicate any track down activity. Accordingly, when the electrical overspeed protection loop becomes active to limit the fuel reference applied to the throttle valve control, the output fuel reference from the NHC card 112G is caused to be tracked down to the current value of the speed limited fuel reference. In this manner, a return can be made to automatic or manual NHC card control in a bumpless manner when the overspeed control loop becomes inactive with a drop in turbine speed below the limit value.

In the surge protection system, the combustor shell pressure signal is applied from a sensor 640G (FIG. 8D) to a function generator 642G to generate the higher range surge limit signal for application to a surge high selector 644G (FIG. 8H). A high selector 646G transmits the higher of two feedback speed signals and applies the output to a function generator 648G to generate the lower range surge limit signal for application to the surge high selector 644G (FIG. 8H).

In a temperature limit control subsystem 52G, the combustor shell pressure signal is applied to a function generator 78G to produce a temperature limit signal during startup and it is applied to a proportional function block 80G during load operation. On base load operation, a difference block 82G generates the base load temperature limit signal. On peak load operation, block 84G generates a signal which is added to the base load temperature limit signal by a summing or load function generator block 86G to produce higher temperature limit action during peak operation. Block 88G transmits the applicable limit signal, i.e., the startup or the load temperature limit signal, to the hold and cutback comparators 72G and 74G.

As shown in FIG. G5-9, the load temperature limit reference generator 86G generates an output corresponding to a linear characterization 123 for base load generation and a linear characterization 125 for peak load operation. The startup function generator 78G generates a characterization 127 comprising three linear sections having different slopes and approximating a nonlinear function. The basic purpose of the temperature limit control is to protect the gas turbine against excessive turbine inlet temperatures under varying ambient conditions. Since it is difficult to measure turbine inlet temperature, the turbine outlet or blade path temperature is measured and compared to a blade path temperature limit reference obtained from the characterization 123, 125 or 127. In turn, the characterizations 123, 125 and 127 are each calculated from a preselected turbine inlet temperature limit and a known function of turbine temperature drop versus combustor shell pressure. Thus, at any particular pressure, each of the characterizations 123, 125 and 127 defines a blade path temperature limit which implies existence of the preselected turbine inlet temperature limit. In the present case, base load operation is automatically selected on breaker closure, and peak load operation is obtained by operator selection.

A plurality of blade path temperature sensors generate temperature signals which are divided into two groups and respectively averaged. Block 90G selects the higher average temperature signal for use in the temperature limit control loop. Thus, the temperature signal is applied to rate blocks 92G and 94G which generate different rate signals on the basis of different derivative functions. Further, the derivative functions for each rate block 92G or 94G is automatically varied as a function of gas turbine status. Thus, different rates are used in each block for starting as compared to loading. A hold summer 96G adds the temperature signal and the rate signal from the block 92G. A cutback summer 98G adds the temperature signal and the rate signal from the block 94G. The hold derivative function in the block 94G has a somewhat higher derivative value than that associated with the cutback block 92G so that the hold control acts more quickly as the temperature limit is exceeded or as it is being approached at a fast rate. Thus, as the temperature limit is being approached, hold or cutback action occurs according to the approach rate.

In the temperature limit control loop, the combustor shell pressure sensor 68G (FIG. 8D) is coupled to a proportional function generator 80G which is provided with a gain adjuster 75G, and the output of the block 80G is summed with a base load temperature setting signal from block 77G in a summer 82G. In addition, a switch 84G controls the application of an input blade path temperature reference peak bias signal from block 79G to the input of the summer 82G. The combustor shell pressure signal is also applied to the input of the startup function generator 78G and a switch 88G determines whether the startup temperature limit signal from the function generator 78G or the load temperature limit signal from the summer 82G is applied to the comparators 72G and 74G (FIG. 8F).

A pair of averaged blade path temperature signals from blocks 81G and 83G are passed through signal conditioners to the high select block 90G (FIG. 8E). The high temperature signal is then applied to the rate blocks 92G and 94G for development of the hold and cutback signals for comparison to the applicable temperature limit reference. The derivative values in the hold and cutback rate blocks 92G and 94G are different from each other as previously indicated, and further the derivative value in each rate block 92G or 94G is preferably controlled by switches 91G and 93G respectively to be one value under startup conditions and another value under load conditions.

A breaker closure input 95G operates the switches 91G and 93G to determine the operative derivative value in the blocks 92G and 94G. With breaker closure, the turbine is placed in the load mode of operation and the operative derivative values in the box 92G and 94G are relatively decreased from the operative values for dynamic startup conditions. In this manner, the system is optimized in its response characteristics to the different operating conditions in the starting and load modes.

The temperature limit logic 76G includes an AND block 102G (FIG. 8B) which responds to a hold signal from the comparator 72G through a NOT block 104G when a fuel reference LOWER demand is not operative. A cutback signal from the comparator 74G is passed through the lower OR block 106G (FIG. 8A) to generate a cutback demand from the AND block 108G if the system is in the manual mode. The NOT block 110G processes the output of the AND block 108G to generate the negative LOWER signal applied to the input of the hold AND block 102G. The output of the cutback block 108G is also coupled to display logic, and it is coupled directly to the NHC hybrid interface card 112G (FIG. 8C) as indicated by the reference character 113G. To effect a hold action, the fuel reference raise input to the NHC card 112G from the AND block 213G is negated when a raise request is operative from the operator panel 54G and when a fuel reference hold signal has been generated at the input of the NOT block 104G to make the output of the AND block 102G a logic zero.

Once the gas turbine control is switched or rejected to the backup mode, the temperature limit loop has no effect on the high selected characterized blade path temperature signal is less than the temperature limit reference. When the characterized feedback temperature signal equals or exceeds the reference value, the hold signal or the cutback signal forces a hold or cutback in the manually controlled fuel reference which is applied from the NHC card 112G to the electropneumatic controls 370G for the gas turbine throttle valve.

f. Blade Path Temperature Limit Control For Backup Mode

As shown in FIG. G4-10, the preferred embodiment comprises a gas turbine outlet temperature limit control subsystem 52G which is included in the plant control system 50 preferably to limit blade path gas temperature reliably and efficiently during the backup or manual mode of gas turbine operation. The rate and magnitude of blade path gas temperature cycling is limited economically and effectively by on-off type of control as the gas temperature limit is approached under operator control. Since blade path temperature setpoint control is not employed, the operator has extended flexibility and can freely make changes in the gas turbine power generation level until the temperature limit value is approached.

The manual/automatic status of the plant control system 50 is fixed by operator selection at an operator panel 54G or by a computer rejection or failure to manual. A digital/analog hybrid interface 56G includes manual/automatic logic circuitry to detect when the gas turbine 12 is to be on manual control and to make bumpless switching operations which implement the applicable control mode. By "manual mode or control" it is meant to refer herein to a backup mode or control in which both manual and automatic control actions can occur.

An analog control 62G, including overspeed and surge limit controls, functions during the coordinated and operator automatic modes of operation as well as the operator analog and manual modes of operation. The temperature limit control subsystem 52G functions during the manual and operator analog modes only, and it is disconnected, but in a standby mode, during automatic operation. The computer 58G provides a temperature limit control 59G which acts as an override or a hold on the computer startup and load controls during its programmed operation in the automatic mode.

The hybrid interface 56G generates a fuel reference for application to fuel valve control circuitry in block 57G. The hybrid output fuel reference is either a value which results from computer control or a value which results from operator control from the operator panel, subject to limit action.

Gas turbine outlet temperature limiting operation may be reached during startup of the gas turbine 12 or after it has been started and is operating in the load mode to produce electric power through the generator 13 and to supply heat to the steam generator 18. In the manual load mode, the operator can raise or lower the turbine fuel reference freely unless the blade path gas temperature limit is approached.

To detect exhaust temperature limit conditions, blade path temperature sensors 64G generate a temperature signal which is characterized by block 66G, and a combustor shell pressure sensor 68G generates a pressure signal from which there is generated a temperature limit signal by block 70G. A hold comparator 72G relates one feedback characterized temperature signal and the temperature limit and bumplessly forces a hold on the fuel reference if the limit is exceeded by the temperature signal. Further, a cutback comparator 74G compares another differently characterized temperature feedback temperature signal and the temperature limit signal bumplessly to force a decrease in the manually controlled fuel reference when the blade path temperature is exceeded or when it is being approached at a rate that may cause it to be exceeded by overshoot. Temperature limit logic 76G restricts any operator entered fuel reference raise demand according to the operation of the hold and cutback comparators 72G and 74G.

Portions of the temperature limit control subsystem 52G are shown in somewhat greater functional detail in FIG. G5-10 and in even greater detail in FIGS. 8A through 8I considered previously. The combuster shell pressure signal is applied to a function generator 78G to produce a temperature limit signal during startup and it is applied to a proportional function block 80G during load operation. On base load operation, a difference block 82G generates the base load temperature limit signal. On peak load operation, block 84G generates a signal which is added to the base load temperature limit signal by a summing or load function generator block 86G to produce higher temperature limit action during peak operation. Block 88G transmits the applicable limit signal, i.e., the startup or the load temperature limit signal, to the hold and cutback comparators 72G and 74G.

As shown in FIG. G5-9, the load temperature limit reference generator 86G generates an output corresponding to a linear characterization 123 for base load generation and a linear characterization 125 for peak load operation. The startup function generator 78G generates a characterization 127 comprising three linear sections having different slopes and approximating a nonlinear function. The basic purpose of the temperature limit control is to protect the gas turbine against excessive turbine inlet temperatures under varying ambient conditions. Since it is difficult to measure turbine inlet temperature, the turbine outlet or blade path temperature is measured and compared to a blade path temperature limit reference obtained from the characterization 123, 125 or 127. In turn, the characterizations 123, 125 and 127 are each calculated from a preselected turbine inlet temperature limit and a known function of turbine temperature drop versus combustor shell pressure. Thus, at any particular pressure, each of the characterizations 123, 125 and 127 defines a blade path temperature limit which implies existance of the preselected turbine inlet temperature limit. In the present case, base load operation is automatically selected on breaker closure, and peak load operation is obtained by operator selection.

A plurality of blade path temperature sensors generate temperature signals which are divided into two groups and respectively averaged. Block 90G selects the higher average temperature signal for use in the temperature limit control loop. Thus, the temperature signal is applied to rate blocks 92G and 94G which generate different rate signals on the basis of different derivative functions. Further, the derivative functions for each rate block 92G or 94G is automatically varied as a function of gas turbine status. Thus, different rates are used in each block for starting as compared to loading.

A hold summer 96G adds the temperature signal and the rate signal from the block 92G. A cutback summer 98G adds the temperature signal and the rate signal from the block 94G. The hold derivative function in the block 92G has a somewhat higher derivative value than that associated with the cutback block 94G so that the hold control acts more quickly as the temperature limit is being approached at a fast rate. Thus, as the temperature limit is being approached, hold or cutback action occurs according to the approach rate.

g. Startup Control Especially Useful As A Backup Control For A Primary Automatic Controller As shown in FIG. G4-11, a backup startup control system 301G is included in the plant control system 50 to provide increased plant availability in an efficient and simplified manner. Generally, automatic startup control for the gas turbine 12 is provided by the digital computer 58G and a sequencer 299G. The gas turbine throttle valve is progressively opened by a throttle valve control included in block 303G in response to a fuel demand signal from a digital/analog hybrid interface block 305G under surge limit and overspeed limit protection from a block 307G.

In the automatic mode, the hybrid block 305G is operated by the digital computer. The sequencer 299G generates the signals necessary to govern ignition, starting device assist and other startup events. In this case, the starting device is an electric motor which provides relatively high torque over its operating speed range. If the computer should fail during automatic gas turbine startup, i.e., during an entire plant startup or during gas turbine startup after the entire plant has been operating, the gas turbine startup attempt would fail and the associated generation capacity would be unavailable unless a backup mode of operation is provided. Thus, in this case with backup control, a computer failure detector 310G automatically causes a switchover from automatic control to backup control through manual/automatic logic 312G when the computer fails or rejects to manual and turbine and plant availability are accordingly increased by this provision.

On switchover, the backup startup control 301G takes control of the turbine 12 bumplessly because the hybrid block 305G holds at its last fuel demand output and after switchover increases or decreases the fuel demand output according to increase or decrease signals generated by the backup startup control 301G through up/down logic 314G. During automatic startup, exhaust temperature limit control is placed on the operation of the gas turbine 12 by programmed operation of the digital computer 58G. On switchover to the backup startup control 301G, temperature limit control is provided by an analog circuit block 316G through the up/down logic 314G.

As already indicated, surge limit and overspeed limit protection are provided by the block 307G, through a low select block 299G, and such protection is provided by analog circuitry in the block 307G during both automatic and backup modes of operation. If the surge limit control or the overspeed limit control become operative, a track or cutback block 318G functions through the up/down logic 314G to cause the output from the hybrid block 305G to track or to cutback relative to the downstream limited control signal valve until the limit action ceases.

The startup control system 301G can function as a simplified and otherwise improved primary control for the gas turbine 12 under operator selection from an operator panel 320G. It can function as a backup startup control for the automatic digital computer controller in the manner already indicated.

If flame detectors indicate that the flame is on as indicated by block 322G and if block 324G indicates that the breaker is open, a startup control logic block 326 operates a switch 328G. The block 326G also triggers the up/down logic 314G to cause the output from the hybrid block 305G to increase in voltage along a ramp as a function of time.

As shown in FIG. G5-12, the ramp generation function is made up of a first part 328G and a second part 330G. The first ramp 328G functions during the time period when the turbine 12 is accelerating from the ignition speed of 20% synchronous value to a higher speed equal to 78% of synchronous value. From 78% synchronous speed to approximately 98% synchronous speed, the second and preferably lower sloped ramp 330G is controlling. Thereafter, turbine speed is held or placed under the control of a synchronizer (not shown). Over a first part of the first ramp 328G, a downstream low limit block 295G applies a low limit signal to the throttle valve control for ignition purposes. When the NHC fuel reference value is ramped sufficiently high by the startup control, the NHC fuel reference output becomes controlling.

The slope of the first ramp 328G at lower speeds is valued to allow the fuel to be scheduled by feedforward operation of the startup control system 301G normally without temperature limit action by the temperature limit control 316G. The second ramp 330G is provided with a slope different from that of the first ramp 328G to permit turbine operation normally without temperature limit action over the higher speed range and to do so while permitting the turbine to reach synchronous speed within a specified time which enhances generation availability. The crossover speed between the two ramps 328G and 330G is set in this case at 78%, although the crossover value is subject to variation according to turbine and control system design considerations. Generally, as illustrated in FIG. G5-12, some allowable maximum fuel ramp defined by cycle temperature limits can be defined for a gas turbine. In most cases, starting time from ignition to synchronization as indicated by line 293G is specified for the turbine. To reach synchronization in the specified time, the fuel reference required at synchronous speed must be reached along a fuel reference function which is equivalent to the illustrated average fuel ramp. Each turbine has characteristic power assist requirements and a characteristic self-sustaining speed as represented by dotted line 291G. Starting devices vary significantly in power rating and cost and in how long they can function under maximum drive operation before they must be uncoupled from the turbine as indicated by dotted line 293G. The dotted lines 291G and 293G shift along the abscissa according to the characteristics of particular turbines and starting devices. Therefore, substantial constraint normally exists on the selection of starting devices for a particular gas turbine as indicated by the shaded arcs.

In the present case, the ramp function 328G, 330G is characterized with a higher sloped first part since the rating of the starting electric motor is sufficiently high to permit fast accelerations during power assist operation. With lower power starting devices a ramp such as the ramp 295R might be usable. Thus, the analog startup control provides significant flexibility in selecting starting devices which meet performance requirements while economizing in manufacturing cost.

A speed sensor 332G generates a signal which permits startup control and which indicates which of the two ramps 328G and 330G is to be generated. The switch 328G functions through blocks 334G and 336G to set the ramp generation in the hybrid block 306G.

During the period prior to breaker closure, the normally selectable fast and normal ramp rate are inhibited by AND block 251G and AND block 221G (FIG. 8A). Thus, during the acceleration period the operator is blocked from requesting a different raise rate from that specified by the automatic backup control. Further, the operator can override the automatic analog starting ramp by generating a reference lower signal, and upon release of the lower pushbutton the startup ramp operation is resumed.

Generally, the scheduling of fuel to a gas turbine during startup is a critical matter. At ignition, the amount of fuel supplied must be controlled accurately because the air flow from the compressor is low and too much fuel can cause excess turbine inlet temperatures while too little fuel can cause flameout and reduced turbine availability by shutdown. As the turbine accelerates, the air flow increases and the fuel flow is increased to maintain the acceleration. The rate at which fuel flow increases determines the rate of acceleration and it is accurately and reliably controlled in a simplified manner by the described system to provide highly available gas turbine and combined cycle plant generation capacity.

As shown in FIG. G5-13, smooth turbine fueling operation is achieved during lightoff. As schematically shown in FIG. G5-14 an ignition fuel low fuel limiter generates a fuel reference 261G at lightoff and a short time later an acceleration low fuel limiter generates a slightly lower fuel reference 263G. The analog ramp 328G is started at ignition and continues to rise without controlling effect because of downstream low select action until it reaches the acceleration low limit value at point 265G. At that time, the feedforward ramp 328G takes control smoothly and accordingly results in reliable lightoff with relatively low thermal shock to the unit. The fact that the fuel schedule function is composed of at least two ramps provides extended flexibility in plant design and operation relative to the constraints of turbine cycle temperature limits, allowable turbine cycle temperature limits, allowable turbine startup time, allowable starting device operating time for the selected sizes of the turbine and the starting device and the speed at which the turbine becomes self sustaining. Further, the startup control is independent of any sensors which might not be able to operate accurately in the low speed range region near lightoff. With feedforward startup control, smooth control action is achieved on switchover from automatic to manual backup control and fuel demand swings are avoided that otherwise could have a significantly adverse effect in the startup period.

As shown in FIG. 8A, temperature limit control can become controlling during the startup mode if abnormal conditions develop. Thus, either the OR block 219G or an AND hold block 245G (FIG. 8B) function during startup to drop the fuel demand signal or to hold the fuel demand signal at its existing value, i.e., to override the startup ramp.

As shown in FIGS. 8D through 8F, if the downstream surge limit becomes controlling, a monitor block 247G causes an OR block 249G to generate a fuel cutback signal which is applied to OR block 219G so that the fuel reference output from the NHC card 112G is moved back to keep the NHC fuel reference lined with the actual fuel demand applied to the valve position controls.

h. Electrical Overspeed Protection System

As shown in FIG. G4-12, an electrical overspeed protection system 10G is included in the plant control system 50 to limit turbine overspeed reliably and efficiently during both the automatic and the manual modes of operation. Gas turbine speed is limited by imposing a limit directly on a throttle valve position control 11G independently of a speed load control 12G.

The electrical and mechanical turbine trip apparatus 13G provides backup overspeed protection to prevent turbine speeds in excess of predetermined values such as 108% and 111% of rated speed respectively. When the trip apparatus 13G senses an overspeed condition, a trip valve or a fuel isolation valve is directly closed by the trip action to shut off the fuel flow, and the valve position control 11G is operated to drive the throttle valve to a closed position. As previously described, electrical overspeed protection with fuel limit action provides a first line of defense against turbine overspeed to avoid turbine trips in instances where the turbine operating conditions do not require a shut down for overspeed protection.

In the operator analog or manual mode, the operator controls the turbine loading operation by generating a fuel reference from the hybrid interface 15G, and a startup control 17G generates a fuel reference from the hybrid interface during startup. A temperature limit control 18G functions during the operator analog or manual mode to limit the turbine blade path or exhaust temperature by imposing a limit on the fuel reference.

As in the case of the turbine overspeed protection system 10G, a surge limit control 20G functions in all modes of operation directly through the fuel valve position control 11G to limit the hybrid fuel reference for the purpose of avoiding surge conditions. As shown in FIG. G4-12, a low select function 21G transmits the lowest of the surge and overspeed protection limit signals as a limit on the hybrid fuel reference. A low select function 22G imposes a limit on the hybrid fuel reference by transmitting the lowest of the limit signals from the low select function 21G and the hybrid fuel reference to the throttle valve position control 11G.

During startup, the turbine is accelerated through ignition speed to synchronous speed under control of the computer 58G or the analog startup control 17G and the sequencer 16G. The generator 13 is then synchronized to the line and the breaker is closed and the turbine is loaded by further increases in the fuel flow. Turbine overspeed can occur with the breaker closed if the system frequency rises, or it can occur with the breaker open.

In the operation of the overspeed protection system 10G, the speed/load control 12G generates a fuel reference during startup and in this case without frequency participation during load operation. The turbine is accelerated under backup control to synchronous speed by a feedforward ramp fuel reference without speed feedback correction and once synchronization occurs the turbine speed is regulated by the system frequency. In the automatic mode, a speed feedback control is employed in the computer 58G during startup.

A turbine speed signal generated by a sensor 23G and an overspeed reference generated by block 24G are compared in the automatic mode or the backup mode, and a speed controller 25G generates a speed limit signal. Since the overspeed reference is a higher value during load operation to permit the full turbine loading, it is switched to a lower value sufficient to permit gas turbine idling when the breaker is open and to reduce the speed increase bump when the breaker is tripped and the turbine load is dropped.

Normally, if the gas turbine speed exceeds the overspeed reference and if surge is not more limiting, the overspeed limit signal directly causes a reduction in the fuel reference signal at block 22G without the response delay inherent in the functioning of a speed/load control which includes a speed control for operation during the startup mode and/or the load mode with frequency participation. The speed/load control is kept relatively simple and reliable in the manual mode without need for speed feedback control, and electrical overspeed protection is reliably, directly and quickly provided independently of the speed/load control during all operating modes.

i. Surge Protection System

As shown in FIG. G4-13, a surge protection system 600G is included in the plant control system 50 to prevent the turbine 12 from operating at a level which results in compressor surge over the wide range of turbine operation from ignition to maximum load. Overfiring of the gas turbine which would lead to compressor surge is prevented by the application of a surge limit signal substantially directly on a throttle valve position control 602G which operates fuel valves 604G in controlling the flow of fuel to the turbine combustors.

A mechanical turbine trip apparatus 606G provides backup overspeed protection to prevent turbine speeds in excess of a predetermined value such as 111% of rated speed. An electrical overspeed protection system 608G limits turbine overspeed during both the automatic and manual modes of operation by placing an electric limit signal substantially directly on the throttle valve position control 602G. A low selector block 610G transmits the lowest of the surge and overspeed limit signals, and another low selector block 612G in turn transmits the lowest of that low selected signal and a fuel reference signal generated at the output of a digital-/analog hybrid interface block 614G. The hybrid fuel reference generally provides for turbine speed/load control when it is not limited by other controls for turbine protection purposes.

In the operator analog or manual mode, the operator controls the turbine loading operation by generating a fuel reference from the hybrid interface 614G and a startup control 17G generates a fuel reference from the hybrid interface during startup. A temperature limit control 18G functions during the operator analog or manual mode to limit the turbine blade path or exhaust temperature by imposing a limit on the fuel reference.

During startup, the turbine is accelerated through ignition speed to synchronous speed under control of the computer 58G or the analog startup control 17G and the sequencer 16G. The generator 13 is then synchronized to the line and the breaker is closed and the turbine is loaded with further increases in the fuel flow. Compressor surge can occur during startup or load operations, i.e., over the wide range of operations from ignition to maximum load which typically involves pressure ratio changes from 1.1 to 10 and speed changes from 900 rpm to 4,000 rpm. The surge limit control 600G functions in all modes of operation directly through the fuel valve position control 604G to limit the hybrid fuel reference for the purpose of avoiding surge conditions.

In the operation of the surge protection system 600G, the speed/load control 12G generates a fuel reference during startup and during load operation and normally the system functions free of surge, i.e., to the right of the characteristic surge line. Thus, the turbine is accelerated under automatic or backup control to synchronous speed by a fuel reference and once synchronization occurs the turbine speed is regulated in the load mode by the system frequency. A turbine speed signal is generated by a sensor 23G and a combustor shell pressure signal is generated by a sensor 620G for use in developing the surge limit control signal.

As shown in FIG. G5-15, a surge function 622G is generated as a function of speed, and another surge function 624G is generated as a function of combustor shell pressure. During startup, the speed surge function is generated by block 626G and it is high selected by a monitor block 628G to operate as the surge limit signal in the downstream selection process previously described. The turbine compressor normally functions without surge limit control action and the surge control system is so calibrated that at any operating condition at which surge limit control action does occur the compressor is functioning at a safe distance from its surge line.

At a higher turbine operating level, i.e., at a preselected crossover point well below the surge line or in this case preferably at about 80% of synchronous speed, a block 630G, operating in accordance with the pressure surge function, generates a higher signal than does the block 626G and it is accordingly high selected as the surge limit signal by the high monitor block 628G. At higher speeds and under load operation up to the maximum load, the block 630G generates the surge limit signal. To achieve the described surge functions, the block 630G can be a proportional block with a predetermined gain and the block 626G can be a conventional function generator with an output like that shown in FIG. G5-15. If a surge limit condition is detected from the measured turbine speed of combustor shell pressure, and if the resultant high selected surge limit signal is low selected over the overspeed limit signal and the speed/load fuel reference signal, the surge limit signal then directly causes a reduction in the fuel supply to the turbine 12 by cutting back on the fuel reference signal applied to the fuel valve position control 602G.

In summary of the surge protection system operation, protection is provided for the compressor against surge by limiting the turbine fuel input with a signal that is a function of speed during startup and a function of combustor shell pressure during higher speed and during load operation. Failsafe features are provided preferably by selecting the higher of two speed transducer signals (not specifically shown in FIG. G4-13) and by selecting the higher of the speed limiting or combustor shell pressure limiting signals. If the combustor shell pressure transducer fails low while operating in the load mode, the load will be decreased on the speed curve which corresponds to approximately 60% fuel. The protection system is highly accurate over a wide operating range because of the employment of the speed signal at low speeds and the employment of combustor shell pressure at higher speeds and during the load mode of operation.

j. Inlet Guide Van Control System

The variable inlet guide vane mechanism 15 previously described in connection with the gas turbine 12 is controlled by an inlet guide vane control system 1500G which is illustrated in FIG. G4-14. The inlet guide vane control apparatus 1500G includes an inlet guide vane operator's station 1502G, an automatic control block 1504G and a manual control block 1506G. As shall be hereinafter discussed in greater detail, the inlet guide vane control apparatus 1500G is operable either in an automatic or a manual mode. Further, the inlet guide vane control apparatus 1500G, as is graphically illustrated in FIG. G5-16, is operable from startup to achievement of base load for its associated gas turbine 12.

The operator's station 1502G is cross-coupled to both the automatic and manual control blocks 1540G and 1506G, respectively. In addition, the operator's station 1502G, the automatic control block 1504G and the manual control block 1506G are connected to the inlet guide vane manual/automatic interface block 1508G which, in turn, outputs on line 1517G a control signal for determining the position of the inlet guide vanes of gas turbine 12. The output control signal from interface block 1508G is determined by a selected or forced mode of operation of the inlet guide vane control apparatus 1500G.

A speed reference signal, a megawatt reference signal, a blade path temperature reference signal and the actual blade path temperature signal are fed via lines 1501G, 1503G, 1505G and 1507G, respectively, to the automatic control block 1504G. In response thereto, the automatic control block 1504G develops a control signal which is either speed, load or temperature dependent, depending generally upon the turbine operating level achieved at the time a particular control signal is developed. The control signal developed by the automatic control block 1504G is subsequently fed to the inlet guide vane actuator mechanism 215 via the inlet guide vane manual/automatic interface block 1508G, line 1517G, high select block 1514G and line 1511G. The manual control block 1506G also develops a control signal for manually positioning the inlet guide vanes, which signal is also forwarded in a similar manner to output line 1511G and the actuator mechanism 215.

Under certain conditions, the inlet guide vane control apparatus 1500G will be placed in the manual mode of operation either by operator action or by reason of a manual mode initiate signal developed in block 1510G. When this occurs, the control signal generated in manual control block 1506G is the signal forwarded to actuator mechanism 215. On the other hand, if the inlet guide vane control apparatus 1500G is operating in the automatic mode, then the control signal developed by the automatic control block 1504G is the one that is ultimately utilized to position the inlet guide vanes via the action of the actuator mechanism 215. The control signals developed in the automatic and manual blocks 1504G and 1506G, respectively, are forwarded to line 1511G through the inlet guide vane manual/automatic interface block 1508G. Line 1513G provides a feedback path from the inlet guide vane manual/automatic interface block 1508G so that the automatic control block 1504G is constantly updated and advised as to the value of the analog control signal being forwarded to the inlet guide vane actuator mechanism 215. Thus, for tracking purposes, even though the inlet guide vane control apparatus 1500G may be in the manual mode of operation, the automatic control block 1504G is constantly appraised of the magnitude of the manual control signal and is thereby able and ready to assume operational command.

Gas turbine exhaust flow matching is provided by block 1512G in response to a compressor average inlet temperature signal received via line 1509G. This block is employed in order to prevent increased mass flow from the gas turbine exhaust to its associated steam generator 18, which increased mass flow would result in the generation of lower temperature stem whenever less than an optimum ambient temperature level exists. To prevent this from occurring, the gas turbine exhaust flow matcher 1512G develops a guide vane control signal which is forwarded via line 1515G to high select block 1514G. Normally, the inlet guide vane control signal received by the high select block 1514G from the manual/automatic interface block 1508G will be higher than the control signal received from the gas turbine exhaust flow matcher 1512G. Consequently, high select block 1514G will pass, via line 1511G to actuator mechanism 215, the signal received from the manual/automatic interface block 1508G. However, whenever the ambient temperature or the compressor inlet temperature level falls below the predetermined optimal point and the turbine closes in on synchronous speed, the inlet guide vane control signal developed by the gas turbine exhaust flow matcher 1512G will be the higher of the two signals received by the high select block 1514G. In such a case, the high select block 1514G will pass the higher signal developed by the gas turbine exhaust flow matcher 1512G to actuator mechanism 215. When this occurs, the inlet guide vanes are kept open even though the automatic or manual mode of operation would otherwise call for partial or full closure. In this manner, at lower ambient temperature levels, and as the gas turbine approaches synchronous speed or is being loaded, the exhaust flow from the gas turbine 12 is matched to the requirements and operating criteria of the steam generator 28 wth which it is associated.

The inlet guide vane control apparatus 1500G illustrated in FIG. G4-14 controls the operation of the variable inlet guide vane mechanism 15 located at the air intake end of the gas turbine 12. Identical control apparatus is provided for the gas turbine 22 and its associated variable inlet guide vane mechanism 25. Consequently, no further discussion of the inlet guide vane control apparatus associated with turbine 22 is necessary.

Inlet Guide Vane Control Apparatus—Manual Mode Functional Description

As previously noted, the inlet guide vane control apparatus 1500G is capable of operation in a manual mode. The following discussion presents the details of the manual mode of operation. It should be noted, that while the following description of the preferred embodiment of the manual mode of operation is generally implemented in an analog manner, alternative implementation or modification thereof is within the reach of one having ordinary skill in the art.

Figure 8J:
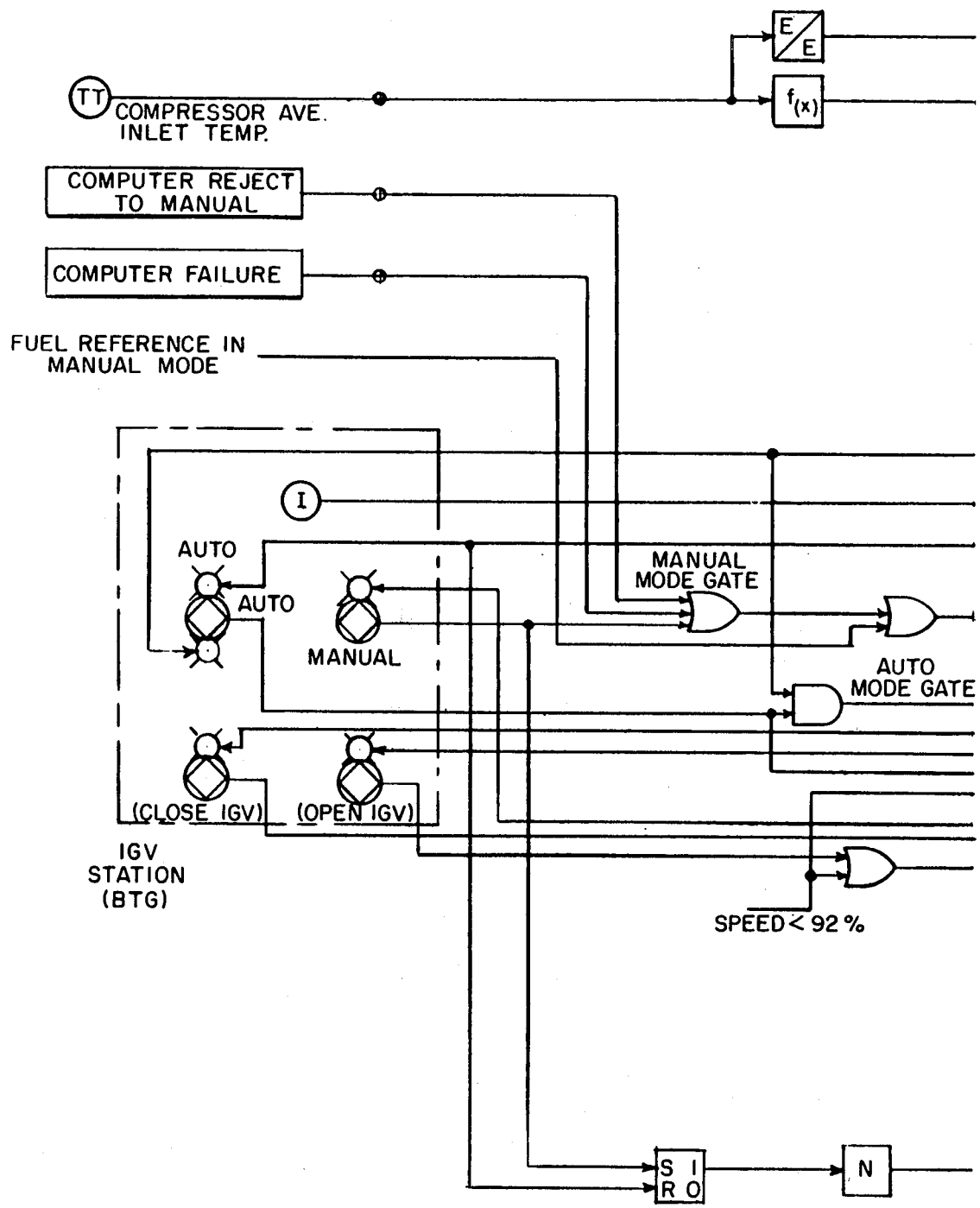
Figure 8K:
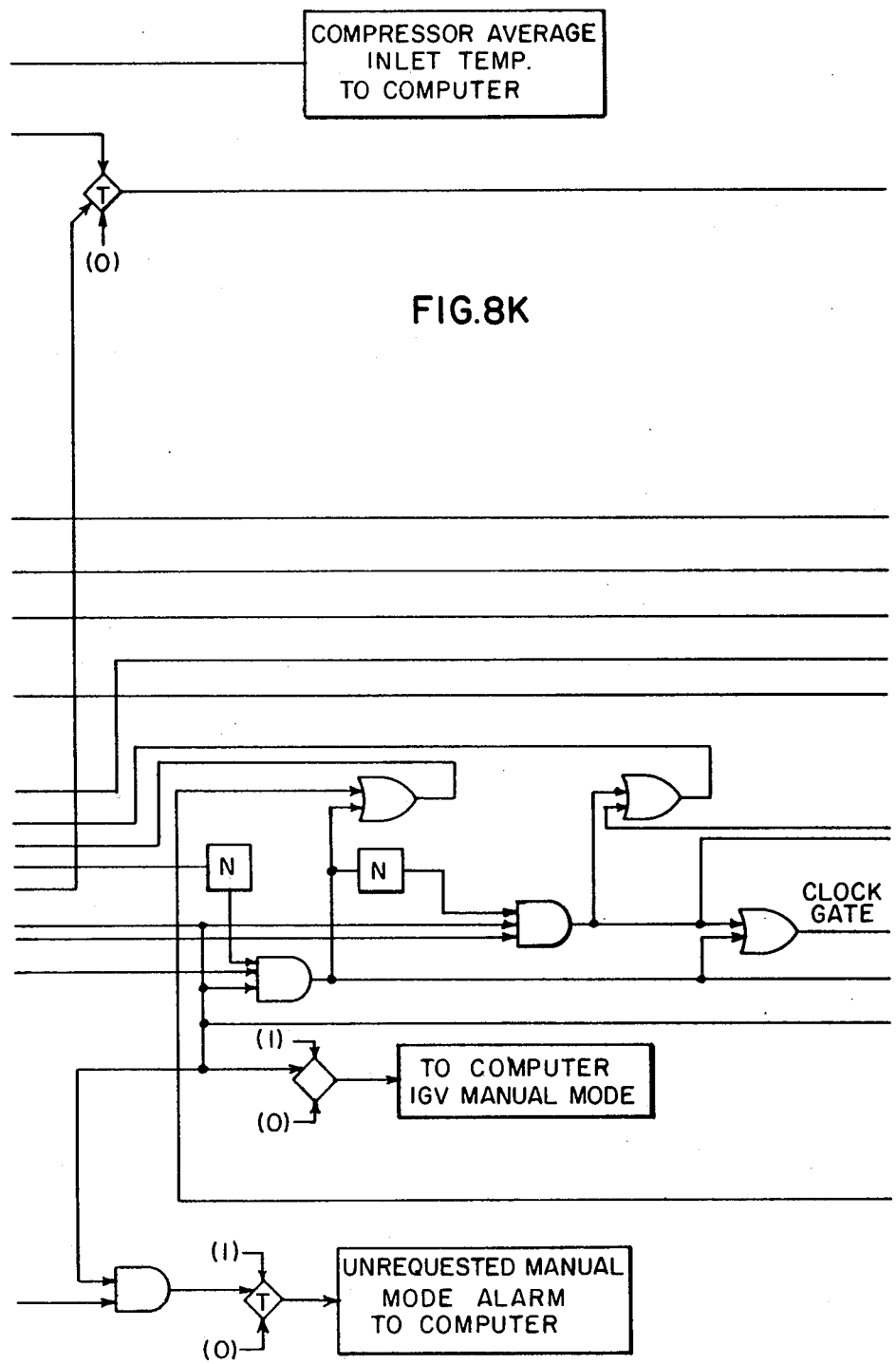
Figure 8L:
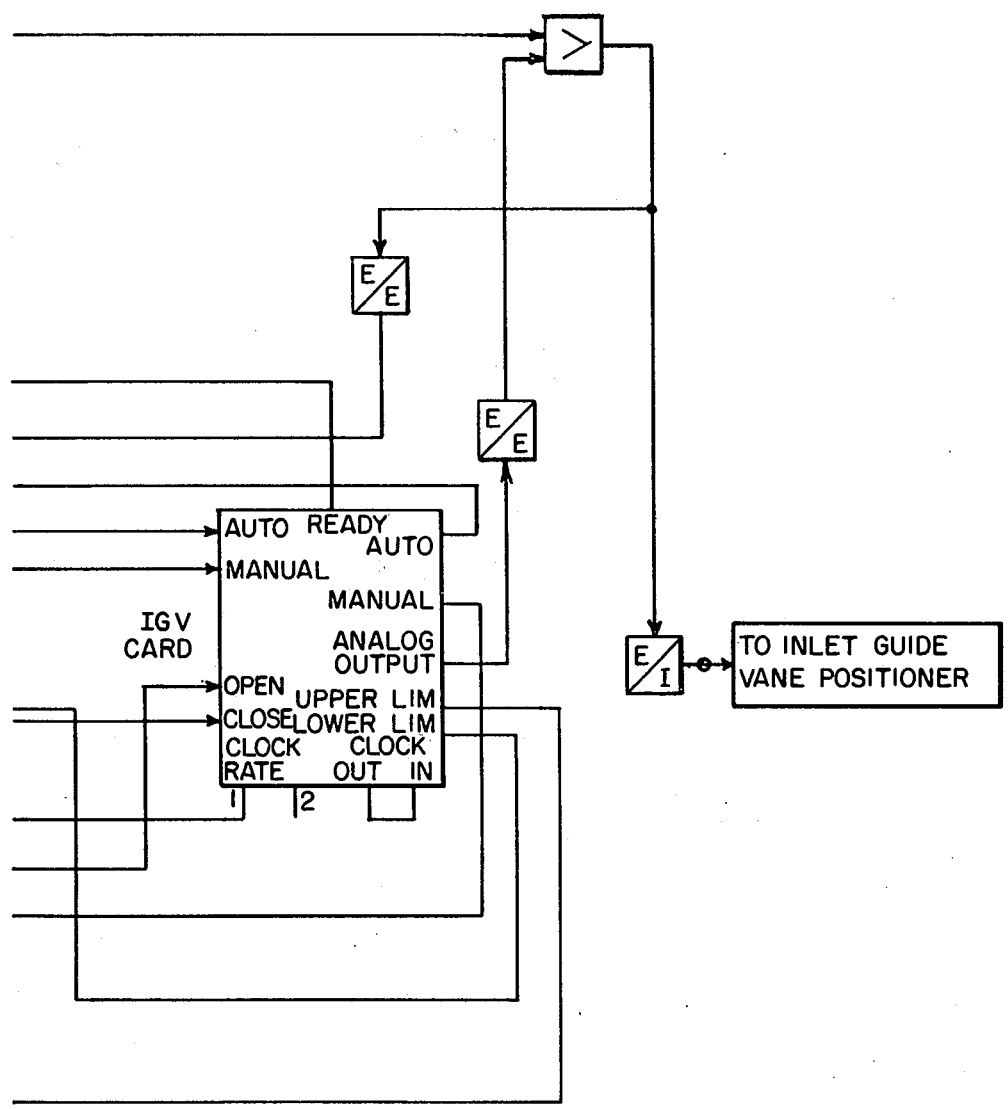
Figure 8M:
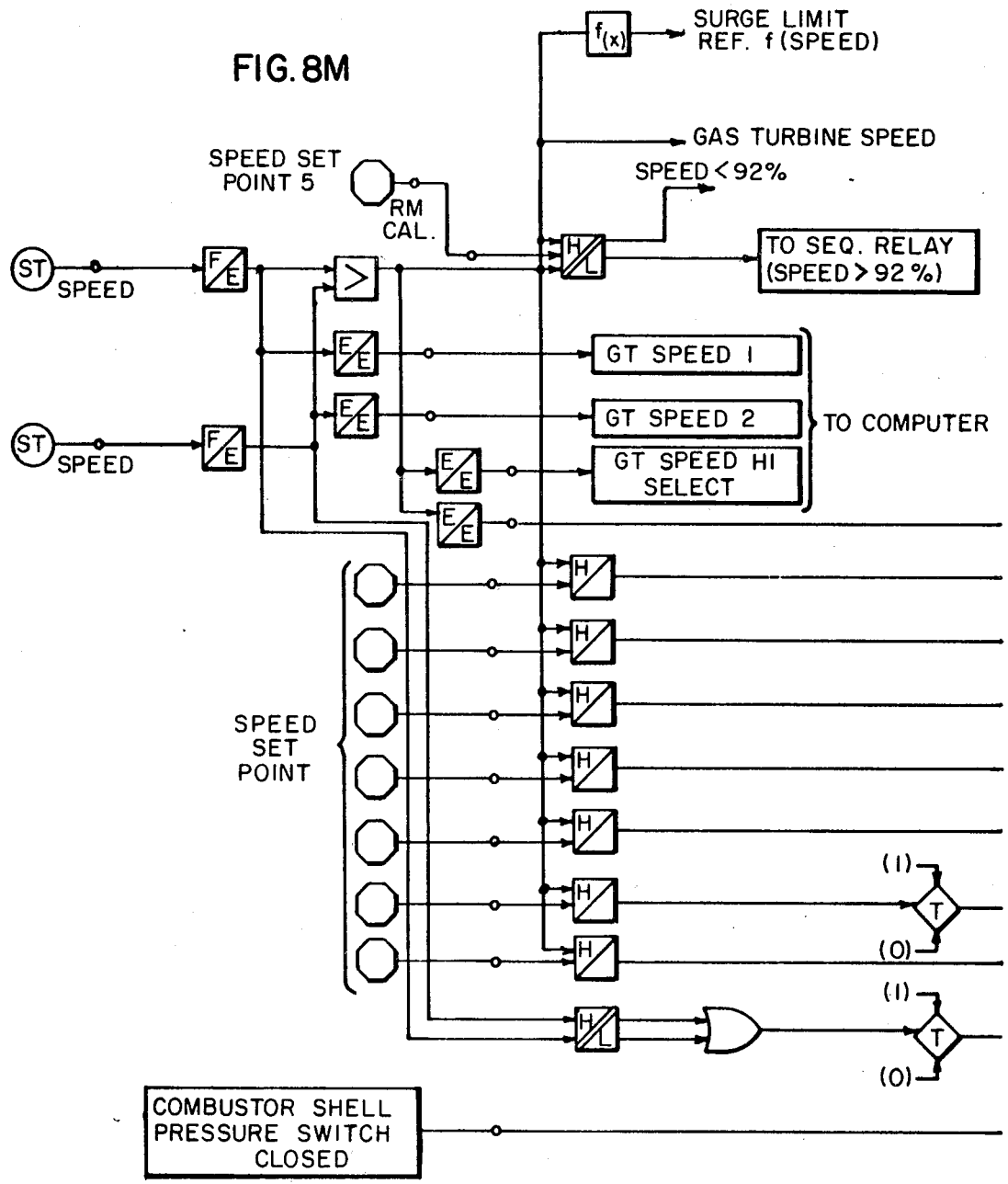
Figure 8N:
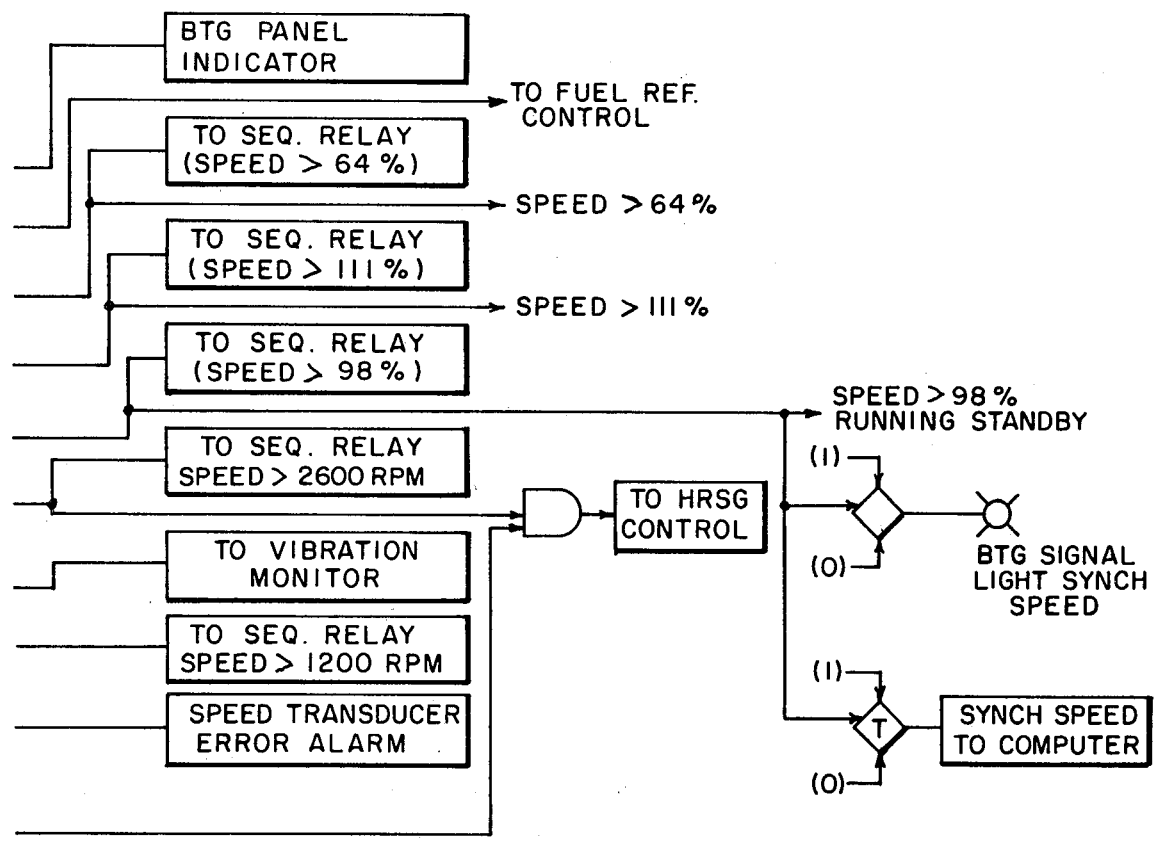

The functional and operational interaction of the various elements of inlet guide vane manual control block 1506G is illustrated in FIGS. 8J and 8K. It will be assumed, for discussion purposes, that the inlet guide vane control apparatus 1500G will be used to manually modulate the position of the guide vanes of gas turbine 12 from startup to base load conditions.

At startup, the operator will actuate manual pushbutton 1550G which is located at the inlet guide vane operator station 1502G. Once depressed or actuated, the manual pushbutton 1550G forwards a logical HI signal to the manual mode gate 1554G. This action sets the output of gate 1554G HI and, in turn, sets the output of OR gates 1556G to a logical HI. When this occurs, the input to the inlet guide vane manual/automatic interface block 1508G is set. This action places the interface block 1508G in a manual mode condition and causes the manual output thereof to be set to a logical HI. When the manual output of the interface block 1508G is set HI, it causes the input to decision block 1560G to be likewise set which, in turn, forwards a logical HI signal to the inlet guide vane automatic control block 1504G (or the control computer) to inform it that the inlet guide vane control apparatus 1500G has been set to operate in the manual mode. At the same time, when the manual output of interface block 1508G is set HI, one input to AND gate 1558G is also set to a logical HI. Another input to AND gate 1558G is set HI through inversion gate 1568G, which reflects the fact that the inlet guide vane control apparatus 1500G has not been set to operate in the automatic mode of operation.

At startup, the analog center forwards a signal to OR gate 1556G, which input reflects the fact that turbine speed is less than 92 percent of synchronous speed. When this condition obtains, the output of OR gate 1556G is set HI, thereby setting the final input to AND gate 1558G to a logical HI. This causes the output of AND gate 1558G to be set HI which sets the inlet guide vane open contact of the interface block 1508G and primes it for subsequent action. In addition, when the output of AND gate 1558G is set HI, the output of the OR clock gate 1570G is also likewise set, which results in the internal clock of interface block 1508G being started. As a result, an analog output signal is generated which varies at a rate determined by the clock rate of the previously mentioned internal clock. The output from the interface block 1508G is passed via voltage-to-voltage isolation block 1572G and line 1517G to the high select block 1514G.

When the output of AND gate 1558G is set HI in the manner previously described, it also causes one input to OR gate 1574G to be similarly set, thereby causing indicator lamp 1564G at the operator station 1502G to be illuminated. This visually informs the operator that the guide vanes are being opened. When the gas turbine reaches 92 percent speed, the input line to OR gate 1556 changes state to a logical LO thereby disabling AND gate 1558G. As a result, the guide vanes will remain at the position they have reached due to the prior action of the open guide vane demand generated for the period between startup and the attainment of 92 percent gas turbine speed. When AND gate 1558G is disabled, it causes the output of OR gate 1574G to be set to a logical LO extinguishing indicator lamp 1564G. At this point then, the operator is aware that the guide vanes have been set to an open position corresponding to the attainment of 92 percent of synchronous speed by the gas turbine. To further open the guide vanes if necessary, the operator can now depress or actuate pushbutton 1562G on the operator's station 1502G.

When pushbutton 1562G is depressed, it causes the other input to OR gate 1556G to be set to a logical HI and as a result, enables AND gate 1558G in the manner previously described. In consequence thereof, the open demand line is set HI, the "open" input to interface block 1508G is set and the internal clock thereof is started. In addition, as also previously described, indicator light 1564G is illuminated by the toggling of OR gate 1574G. It should be noted that as soon as the operator lifts his finger from the pushbutton 1562G, or gate 1556G will be disabled, the open guide vane demand signal will go to zero and the indicating light 1564G will go out. When the upper limit or the fully open position of the inlet guide vanes has been reached, an appropriate signal indicative thereof is generated in the interface block 1508G and is forwarded from the "upper limit" terminal thereof to the other input of OR gate 1574G. This will turn on the indicating light 1564G, even though the pushbutton 1562G has been deactuated. Thus, when the upper limit or fully open position is reached by the inlet guide vanes the operator is made aware of this fact by the continued illumination of lamp 1564G even though pushbutton 1562G is no longer being depressed to call for further opening action.

In the manual mode of operation, unlike the automatic mode of operation, it is the operator's responsibility to close down the inlet guide vanes after synchronization and minimal loading has been achieved. Thus, referring to FIG. G5-16, once the guide vanes have reached their fully open position and the 4 megawatt loading point have been reached, the operator so informed by the previously described indicating meters and/or indicating lamps will start to close down the inlet guide vanes until the 20 megawatt loading point is reached. At that time the operator will manually maintain the inlet guide vanes in a closed position until a point is reached at which the actual blade path temperature increases to within 60° of the blade path temperature reference. This point occurs at approximately 50 megawatts below base load, although this may vary according to ambient conditions.

In order for the operator to close or modulate the inlet guide vanes once the 4 megawatt loading point is reached, he will depress the close pushbutton 1578G which is physically located at the operator station 1502G. When this occurs, one input to AND gate 1578G is set HI, as is a second input thereto by the action of inversion gate 1576G, which action reflects the fact that AND gate 1558G is disabled. The third and final input to AND gate 1578G is set HI by the fact that the manual pushbutton 1550G has been actuated and the inlet guide vane control apparatus 1500G is in the manual mode of operation. With all three inputs set to a logical HI, AND gate 1578G is enabled which triggers the clock gate 1570G in a manner similar to that previously described for the open pushbutton 1562G operation and also sets the "close" input to the interface block 1508G. In addition, when AND gate 1578G is enabled, it sets one input to OR gate 1582G which, in turn, illuminates or turns on the indicating lamp 1580G associated with pushbutton 1578G. This serves as a visual indication to the operator that the requested action of closing the inlet guide vanes is being accomplished. When the lower limit or fully closed position of the inlet guide vanes has been reached, the interface block 1508G generates a signal indicative thereof which is forwarded to OR gate 1582G. Now, also as in the manner previously described with respect to the indicating lamp 1564G, indicating lamp 1580G is maintained in a lit state even though the operator may have lifted pushbutton 1578G. This action visually informs the operator that the lower limit or fully closed position of the inlet guide vanes has been reached and that further depression or actuation of the close pushbutton 1578G is no longer needed.

The manual mode of operation for the inlet guide vane control apparatus 1500G may also result from the enabling of manual mode gate 1554G for a reason other than actuation of the manual pushbutton 1550G. As is shown in FIGS. 8J and 8K, for example, if the inlet guide vanes were being controlled in the automatic mode and a computer failure occured, a computer reject to manual signal would be generated thereby setting one of the inputs to manual mode gate 1554G to a logical HI causing the inlet guide vane control apparatus 1500G to be shifted from the automatic to the manual mode of operation. Similarly, computer failure itself may cause another input of the manual mode gate 1554G to be set to a logical HI also causing a shift from automatic to manual mode of operation. In addition, if the fuel reference or control has been placed in its manual mode of operation, another input to OR gate 1556G is set to a logical HI which again results in a transfer of the inlet guide vane control apparatus 1500G to its manual mode of operation.

The inlet guide vane positioning signal is forwarded from the "analog" output of the interface block 1508G via line 1517G to the high signal select block 1514G. Assuming that this is the higher of the two signals received by HI select block 1514G, it is passed via line 1511G and the voltage-to-current isolating block 1582G to the inlet guide vane actuating mechanism 215. The signal which appears on line 1511G is also fed back to the operator's station 1502G, via the voltage-to-voltage isolation block 1584G. It is received at the operator's station 1502G and utilized to actuate indicator 1586G, which gives the operator a visual indication of the position of the inlet guide vanes since it is calibrated in degrees of position thereof.

Alternatively, at startup, the operator may choose to have the inlet guide vanes positioned automatically. Once he ascertains by reference to the ready light 1594G that automatic control is possible, he will depress the automatic mode pushbutton 1588G. As previously noted in the foregoing discussion of the operation of the inlet guide vane automatic control block 1504G, ready light 1594G is illuminated by the interface block 1508G to visually indicate to the operator that the inlet guide vane control apparatus 1500G can be placed in its automatic mode of operation. Actuation of the automatic mode pushbutton 1588G sets one input of the automatic mode gate 1592G to a logical HI. The other input of the automatic mode gate 1592G has already been set HI by the same signal which enables the ready light 1594G. As a result of this action, the output of the automatic mode AND gate 1592G is set HI causing the "auto" input to interface block 1508G to be set. This action, in turn, causes an auto signal to be generated by the interface block 1508G, which signal is returned to the operator's station 1502G and employed thereat to enable indicating lamp 1590G which visually informs the operator that the inlet guide vane control apparatus 1500G is now operating in its automatic mode.

In automatic operation, if the inlet guide vane automatic control block 1504G (the control computer) does not update the interface block 1508G within a predetermined time period, the control apparatus 1500G is returned to the manual mode of operation by an internal keep alive circuit housed within the interface block 1508G. This return to the manual mode of operation is accomplished in the following manner. When the manual pushbutton 1550G is depressed, in addition to the action previously described as a result thereof, the set input of flip-flop 1591G is actuated causing the output thereof to be set to a logical HI. As a result, signal inversion block 1593G forwards a logical LO to one input of AND gate 1595G. The other input to AND gate 1595G reflects the state or mode of operation of the inlet guide vane control apparatus 1500G. When the keep alive circuit is actuated as a result of not having received an update within the allowed time period, the interface block 1508G outputs a signal on its "manual" line which sets the second input to AND gate 1595 to a logical HI. Simultaneously, the "auto" output of the interface block 1508G is reset from a logical HI to a logical LO. This causes the reset input to flip-flop 1591G to be triggered which, in turn, causes the output thereof to be set to zero or a logical LO. When this occurs, the inversion action of block 1593 sets the other input of AND gate 1595 to a logical HI and enables AND gate 1595G since its other input has previously been set HI by the action of the keep-alive circuit. Once enabled, AND gate 1595G forwards a logical HI signal through decision block 1597G which informs the automatic control block 1504G that an unrequested manual mode call has been made. This alarms the inlet guide vane automatic control block 1504G so that it may be made aware of the fact that transfer to manual mode of operation has occurred. Once the automatic control block 1504G has finished whatever housekeeping chore might have prevented the updating of the interface block 1508G, the inlet guide vane control apparatus is made ready for a return to the automatic mode of operation.

Inlet Guide Vane Control Apparatus-Gas Turbine Exhaust Flow Matching

As previously noted, the design of a combined cycle power generating plant requires proper matching between an included gas turbine and its associated steam generator. One item in connection therewith which requires special attention is that of gas turbine exhaust flow. As is illustrated in FIG. G3-1, for a constant setting of the inlet guide vane position, the mass flow exhausted from the gas turbine increases as the compressor inlet temperature or the ambient temperature decreases. For example, at a 0° setting of the inlet guide vanes, the mass of the exhaust flow will increase at 40° F. from approximately 840 pounds per second to a flow of 1000 pounds per second at −40° F. Since the afterburner firing rate is held constant in the control scheme utilized in the previously described combined cycle plant, the increased mass flow as compressor inlet temperature decreases will result in an increased steam flow from the boiler but with a lower steam temperature. The subsequent downstream effect of such lowered steam temperature will result in the condensation of a portion of the steam and a water problem within the steam turbine.

To avoid this potential problem, the inlet guide vane control apparatus is provided with a gas turbine exhaust flow matching block 1512G (FIG. G4-14) which prevents the occurrence of condensation or water problems in the steam turbine. The gas turbine exhaust flow matching block 1512G operates in the following manner. Referring again to FIGS. 8J and 8K, there is illustrated a compressor average inlet temperature sensor 1559G which forwards via line 1561G a signal indicative of the average compressor inlet temperature. This signal representative of compressor average inlet temperature is characterized in function generator 1563G in accordance with the curve shown in FIG. G3-2. This curve can be approximated by a three straight line function generator or may be made linear or nonlinear depending upon the degree of accuracy desired. Once characterized by the function generator 1563G, the compressor average inlet temperature signal is forwarded to decision block 1567G. If the gas turbine speed is below 92 percent of synchronous speed, decision block 1567G passes a zero signal via line 1515G to the HI signal select block 1514G. Under conditions of less than 92 percent of synchronous speed, the HI select block 1514G will pass the signal it receives from the interface block 1508G to the inlet guide vane positioning mechanism 215. However, once the gas turbine reaches 92 percent of synchronous speed, decision block 1567G will pass an inlet guide vane characterized temperature signal via line 1515G to the HI select block 1514G. When the 92 percent speed condition or higher obtains, the HI select block 1514G will then pass whichever is the higher one of the two signals it receives to the inlet guide vane positioning mechanism 215.

What is claimed is:

1. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having means for controlling the flow of fuel to said gas turbine, digital computer means for generating a fuel control signal during automatic gas turbine operation, a backup analog control for said gas turbine, means for transferring said controlling means between automatic and backup modes of operation, a digital/analog interface circuit for coupling said digital computer means for and said analog control to said fuel flow controlling means, said digital computer means including means for generating a speed control output and a megawatt load control output respectively during automatic speed and load modes of gas turbine operation, said digital computer means further including means for limiting the speed and load outputs to limit blade path temperature, means for generating the computer fuel control signal in response to said speed and load outputs, said analog control including a startup control which applies a fuel control signal to said interface circuit to control speed during startup and to control load during the load mode, a blade path temperature limit control coupled to the input of said interface circuit to hold or run back the fuel control signal output from said interface circuit for blade path temperature limiting and predetermined limit controls being connected between said gas turbine interface circuit and said fuel controlling means to limit the fuel control signal in both the automatic and manual gas turbine modes.

2. A combined cycle electric power plant as set forth in claim 1, wherein said limit controls include a surge limit control.

3. A combined cycle electric power plant as set forth in claim 1 wherein said limit controls include an electrical overspeed protection control.

4. A combined cycle electric power plant as set forth in claim 3 wherein said limit controls further include a surge limit control.

5. A gas turbine electric power plant comprising a compressor section and a turbine section, a plurality of combustors for energizing the driving gas flow for the turbine section, means for generating electric power under the driving power of the turbine, a gas turbine control system including means for controlling the flow of fuel to the turbine combustors, means for generating a fuel control signal in response to the speed error so that the actual turbine speed normally increases from the first speed value to the synchronous value in the fixed time period, digital computer means for generating a fuel control signal during automatic gas turbine operation, a backup analog control for said gas turbine, means for transferring said control system between automatic and backup modes of operation, a digital/analog interface circuit for coupling said digital computer means and said analog control to said fuel flow controlling means, said digital computer means including means for generating a speed control output and a megawatt load control output respectively during automatic speed and load modes of gas turbine operation, said digital computer means further including means for limiting the speed and load outputs to limit blade path temperature, means for generating the computer fuel control signal in response to said speed and load outputs, said analog control including a startup control which applies a fuel control signal to said interface circuit to control speed during startup and to control load during the load mode, said starting control including means for generating a representation of gas turbine speed, means for generating a gas turbine speed reference so that the reference increases from a first predetermined value substantially to the synchronous value normally in a substantially fixed period of time during turbine startup, means for generating a speed error output representing the difference between speed reference and the actual turbine speed, and predetermined limit controls are connected between said gas turbine interface circuit and said fuel controlling means to limit the fuel control signal in both the automatic and manual gas turbine modes, and a blade path temperature limit control coupled to the input of said interface circuit to hold or run back the fuel control signal output from said interface circuit for blade path temperature limiting.

6. A gas turbine electric power plant as set forth in claim 5 wherein said limit controls include a surge limit control and an electrical overspeed protection control.

7. A control system for a gas turbine electric power plant comprising means for controlling the flow of fuel to the gas turbine, digital computer means for generating a fuel control signal during automatic gas turbine operation, a backup analog control for said gas turbine, means for transferring the control system between automatic and backup modes of operation, a digital/analog interface circuit for coupling said digital computer means and said analog control to said fuel flow controlling means, said digital computer means including means for generating a speed control output and a megawatt load control output respectively during automatic speed and load modes of gas turbine operation, said digital computer means further including means for limiting the speed and load outputs to limit blade path temperature, means for generating the computer fuel control signal in response to said speed and load outputs, said analog control including a startup control which applies a fuel control signal to said interface circuit to control speed during startup and to control load during the load mode, and predetermined limit controls are connected between said gas turbine interface circuit and said fuel controlling means to limit the fuel control signal in both the automatic and manual gas turbine modes, and a blade path temperature limit control coupled to the input of said interface circuit to hold or run back the fuel control signal output from said interface circuit for blade path temperature limiting.

8. A control system as set forth in claim 7 wherein said limit controls include a surge limit control and an electrical overspeed protection control.

* * * * *